US 12,168,574 B2

(12) United States Patent
Thurston

(10) Patent No.: US 12,168,574 B2
(45) Date of Patent: Dec. 17, 2024

(54) RECONFIGURABLE OPEN FRAME STORAGE SYSTEM AND COMPONENTS THEREOF

(71) Applicant: Richard A. Thurston, Brookfield, WI (US)

(72) Inventor: Richard A. Thurston, Brookfield, WI (US)

( * ) Notice: Subject to any disclaimer, the term of this patent is extended or adjusted under 35 U.S.C. 154(b) by 0 days.

(21) Appl. No.: 18/111,163

(22) Filed: Feb. 17, 2023

(65) Prior Publication Data

US 2024/0067452 A1 Feb. 29, 2024

Related U.S. Application Data

(63) Continuation-in-part of application No. 17/896,389, filed on Aug. 26, 2022.

(51) Int. Cl.
*B65G 1/14* (2006.01)
*A47B 96/06* (2006.01)
(Continued)

(52) U.S. Cl.
CPC ............... *B65G 1/14* (2013.01); *A47B 96/061* (2013.01); *A47F 5/08* (2013.01); *A47B 57/06* (2013.01);
(Continued)

(58) Field of Classification Search
CPC ........... B65G 1/14; A47B 57/44; A47B 57/18; A47B 47/00; A47B 47/0058;
(Continued)

(56) References Cited

U.S. PATENT DOCUMENTS 464,723 A 12/1891 Pope
1,443,901 A 1/1923 Murray
(Continued)

FOREIGN PATENT DOCUMENTS

DE 202004014355 U1 1/2005
DE 202014007896 U1 2/2015
DE 202021100626 U1 4/2021

OTHER PUBLICATIONS

All In One Wall Shelves Quadrangular Shelves . . . , https://m.made-in-china.com/product/All-in-One-Wall-Shelves-Quadrangular-Shelves-Wall-Mounted-Shelving-Metal-Frame-Rustic-Wood-Modern-Rectangle-Floating-Wall-Shelf-for-Living-Room-Decor-Bathroom-1928575015.html, May 31, 2022 or earlier, 10 pages.
(Continued)

*Primary Examiner* — Devin K Barnett
(74) *Attorney, Agent, or Firm* — Amundsen Davis, LLC

(57) ABSTRACT

Wall-mountable storage systems suitable for holding bulky and/or heavy construction materials such as boards or panels, or the like, are disclosed. Storage structures can include two substantially similar open frame panels attached to each other by spacer bars to define an internal storage space therebetween. Each panel may include two major outer rails and two minor outer rails, with major inner rails disposed between the major outer rails and with minor inner rails disposed between the minor outer rails. The inner rails may have a first center-to-center spacing and each outer rail may have a second center-to-center spacing with its nearest neighbor inner rail, the second spacing being greater than the first spacing. The first spacing may substantially equal a standardized spacing for wall studs. The outer rails may each have a width greater than a width of the inner rails. The storage structure may form a rectangular cuboid.

16 Claims, 32 Drawing Sheets

(51) Int. Cl.
*A47F 5/08* (2006.01)
*A47B 57/06* (2006.01)
*A47B 57/10* (2006.01)
*A47B 57/18* (2006.01)
*A47B 57/30* (2006.01)
*A47B 57/34* (2006.01)
*A47B 57/42* (2006.01)
*A47B 57/46* (2006.01)
*A47B 96/14* (2006.01)

(52) U.S. Cl.
CPC .............. *A47B 57/10* (2013.01); *A47B 57/18* (2013.01); *A47B 57/30* (2013.01); *A47B 57/34* (2013.01); *A47B 57/42* (2013.01); *A47B 57/46* (2013.01); *A47B 96/1408* (2013.01)

(58) Field of Classification Search
CPC ... A47B 47/021; A47B 47/027; A47B 47/028; A47B 57/00; A47B 57/06; A47B 57/08; A47B 57/10; A47B 57/30; A47B 57/32; A47B 57/34; A47B 57/42; A47B 57/46; A47B 57/56; A47B 57/565; A47B 96/00; A47B 96/02; A47B 96/06; A47B 96/061; A47B 96/14; A47B 96/1408; A47F 5/08
See application file for complete search history.

(56) References Cited

U.S. PATENT DOCUMENTS

| | | | |
|---|---|---|---|
| 1,471,465 A | 12/1923 | Hinton | |
| 1,480,345 A * | 1/1924 | Bradley | A47B 57/18 |
| | | | 108/60 |
| 1,488,245 A | 3/1924 | Hinton | |
| 1,521,936 A | 1/1925 | Fadden et al. | |
| 1,814,084 A * | 7/1931 | Goldberg | A47B 57/18 |
| | | | 108/157.13 |
| 2,001,215 A | 5/1935 | Ruppel | |
| 2,126,636 A | 8/1938 | Horne | |
| D165,118 S * | 11/1951 | Strinning | 211/90.04 |
| 2,720,414 A | 10/1955 | Hart | |
| 2,850,172 A * | 9/1958 | Beckner | A47B 55/02 |
| | | | 108/107 |
| 2,951,594 A * | 9/1960 | Strinning | A47B 57/06 |
| | | | 108/106 |
| 2,958,425 A | 11/1960 | Best | |
| 3,007,708 A | 11/1961 | Ochs | |
| 3,045,834 A * | 7/1962 | Seiz | A47B 47/03 |
| | | | 211/182 |
| 3,146,734 A | 9/1964 | Sol et al. | |
| 3,252,434 A | 5/1966 | Young, Jr. | |
| 3,680,712 A | 8/1972 | Jurasek | |
| D230,797 S * | 3/1974 | Slaboden | D6/570 |
| 3,799,072 A * | 3/1974 | Slaboden | A47B 43/00 |
| | | | 108/107 |
| 3,846,002 A * | 11/1974 | Floetotto | F16B 12/46 |
| | | | 403/217 |
| 3,846,944 A * | 11/1974 | Lambert | F16B 12/34 |
| | | | 211/187 |
| 3,892,189 A * | 7/1975 | Killam | A47B 57/404 |
| | | | 211/186 |
| 3,905,483 A * | 9/1975 | Patrick | F16M 11/22 |
| | | | 211/26 |
| 3,915,097 A * | 10/1975 | Young, Jr. | A47F 5/12 |
| | | | 211/187 |
| 3,971,477 A * | 7/1976 | Bruderly | A47F 5/103 |
| | | | 52/264 |
| 3,976,014 A * | 8/1976 | Brown | A47B 47/021 |
| | | | 211/187 |
| 3,997,060 A | 12/1976 | Kunin | |
| 4,450,775 A * | 5/1984 | Brendle | A47F 5/10 |
| | | | 108/107 |
| 4,509,805 A | 4/1985 | Welsch et al. | |
| 4,558,647 A | 12/1985 | Petersen | |
| 4,595,106 A | 6/1986 | Kunze et al. | |
| D288,641 S | 3/1987 | Kester | |
| D290,791 S * | 7/1987 | Kester | D6/675.5 |
| D290,792 S * | 7/1987 | Kester | D6/675.5 |
| 4,678,091 A * | 7/1987 | Konstant | A47B 57/44 |
| | | | 403/388 |
| D292,658 S * | 11/1987 | Kester | D6/675.2 |
| 4,928,833 A * | 5/1990 | Huizenga | A47B 95/008 |
| | | | 211/187 |
| 4,960,214 A * | 10/1990 | Sayers | A47F 5/01 |
| | | | 211/41.12 |
| 4,973,110 A * | 11/1990 | Nyquist | A47B 47/03 |
| | | | 312/265.2 |
| 4,995,323 A * | 2/1991 | Kellems | A47B 96/00 |
| | | | 108/157.13 |
| 5,143,228 A * | 9/1992 | Arnold | A47F 5/08 |
| | | | 211/88.01 |
| 5,191,986 A * | 3/1993 | Huizenga | A47B 61/00 |
| | | | 211/189 |
| 5,253,770 A | 10/1993 | Rosenthal | |
| 5,257,701 A * | 11/1993 | Edelson | A47B 3/10 |
| | | | 482/148 |
| 5,257,794 A | 11/1993 | Nakamura | |
| 5,299,698 A | 4/1994 | Gay | |
| 5,326,337 A | 7/1994 | Pardella | |
| 5,443,167 A * | 8/1995 | Menaged | A47F 5/0823 |
| | | | 211/106.01 |
| 5,495,954 A * | 3/1996 | Schmit | A47F 5/08 |
| | | | 312/246 |
| 5,582,306 A * | 12/1996 | Balter | A47B 61/00 |
| | | | 211/187 |
| 5,788,092 A * | 8/1998 | Teeney | B25H 3/04 |
| | | | 211/70.6 |
| 5,797,502 A * | 8/1998 | Brady | A47B 57/40 |
| | | | 211/183 |
| 5,819,933 A | 10/1998 | Hernandez | |
| 5,819,958 A * | 10/1998 | Dement | A47B 95/008 |
| | | | 211/90.04 |
| 5,938,302 A * | 8/1999 | Anderson | H02B 1/301 |
| | | | 312/265.3 |
| 6,241,107 B1 | 6/2001 | Boyer | |
| 6,354,758 B1 | 3/2002 | Chaulk | |
| 6,663,139 B1 | 12/2003 | Smith | |
| 6,681,941 B1 * | 1/2004 | Johnson | A47B 57/00 |
| | | | 211/90.04 |
| 6,811,163 B1 | 11/2004 | Gurule et al. | |
| 7,017,299 B1 | 3/2006 | Speed et al. | |
| 7,296,697 B2 | 11/2007 | Costa et al. | |
| 7,334,692 B2 | 2/2008 | Black | |
| 7,611,020 B2 | 11/2009 | Prest | |
| 7,866,491 B2 | 1/2011 | Newman | |
| 7,891,507 B2 * | 2/2011 | Shetler | A47B 55/00 |
| | | | 211/135 |
| 7,938,279 B2 * | 5/2011 | Kaplan | A47K 3/281 |
| | | | 248/304 |
| 8,025,164 B2 * | 9/2011 | Humberto | A47B 61/00 |
| | | | 211/186 |
| 8,042,477 B2 * | 10/2011 | Lee | A47B 57/54 |
| | | | 108/147.12 |
| 8,579,127 B2 * | 11/2013 | Dyck | A47B 96/068 |
| | | | 211/103 |
| D699,414 S * | 2/2014 | Poplawski | D34/27 |
| D713,188 S * | 9/2014 | Gokhale | D6/705.6 |
| 8,905,247 B2 | 12/2014 | Artigues et al. | |
| D746,089 S * | 12/2015 | Hsu | D6/683 |
| D763,533 S | 8/2016 | Nyholm | |
| D776,465 S * | 1/2017 | Basch | D6/675 |
| 9,655,448 B2 | 5/2017 | Tillikainen | |
| 9,730,530 B2 | 8/2017 | Marler et al. | |
| D813,787 S | 3/2018 | Thomas | |
| 10,575,634 B1 * | 3/2020 | Antonelli | A47G 25/0692 |
| D890,555 S * | 7/2020 | Hostler | D6/683.1 |
| 10,750,859 B1 * | 8/2020 | Fickett | A47F 5/083 |
| 10,836,576 B2 | 11/2020 | Duppong | |
| 10,905,235 B2 * | 2/2021 | Chiao | A47B 61/00 |
| 10,905,239 B2 * | 2/2021 | Newman | A47B 96/028 |

(56) References Cited

U.S. PATENT DOCUMENTS

| | | | |
|---|---|---|---|
| 10,968,039 B2 | 2/2021 | Duppong | |
| D939,253 S * | 12/2021 | Huang | D6/675.2 |
| 11,390,460 B2 | 7/2022 | Iellimo et al. | |
| 11,412,844 B1 * | 8/2022 | Tham | A47B 13/08 |
| 2002/0190019 A1 | 12/2002 | Reddig | |
| 2004/0124160 A1 | 7/2004 | Vitale | |
| 2005/0161419 A1 * | 7/2005 | Lawson | A47F 5/12 |
| | | | 211/189 |
| 2006/0145037 A1 * | 7/2006 | Sloan | A47B 47/00 |
| | | | 248/235 |
| 2006/0169659 A1 * | 8/2006 | Robinson | A47B 57/30 |
| | | | 211/187 |
| 2007/0119805 A1 * | 5/2007 | Nawrocki | A47B 55/02 |
| | | | 211/119 |
| 2007/0125737 A1 * | 6/2007 | O'Reilly | A47B 57/44 |
| | | | 211/186 |
| 2007/0131635 A1 | 6/2007 | Shieh | |
| 2007/0175371 A1 | 8/2007 | Wyatt et al. | |
| 2008/0011920 A1 * | 1/2008 | Sloan | A47B 43/003 |
| | | | 248/235 |
| 2010/0116762 A1 * | 5/2010 | Piersant | A47B 95/008 |
| | | | 211/90.01 |
| 2010/0155353 A1 * | 6/2010 | McAllister | A47B 96/028 |
| | | | 211/153 |
| 2010/0181274 A1 * | 7/2010 | Vargo | A47B 47/021 |
| | | | 211/187 |
| 2011/0025180 A1 * | 2/2011 | Ilich | A47B 95/008 |
| | | | 29/428 |
| 2011/0025181 A1 * | 2/2011 | Vinke | A47B 67/04 |
| | | | 439/577 |
| 2011/0062301 A1 * | 3/2011 | Sloan | A47B 47/00 |
| | | | 248/323 |
| 2011/0074256 A1 * | 3/2011 | Boice | A47B 81/00 |
| | | | 312/213 |
| 2011/0186533 A1 * | 8/2011 | Thrush | A47B 96/025 |
| | | | 211/113 |
| 2011/0266237 A1 * | 11/2011 | Artigues | A47B 45/00 |
| | | | 211/90.04 |
| 2013/0056434 A1 * | 3/2013 | Artigues | A47B 96/025 |
| | | | 211/153 |
| 2014/0138333 A1 * | 5/2014 | Thrush | F16M 13/027 |
| | | | 211/113 |
| 2014/0224753 A1 * | 8/2014 | Shadwell | A47F 5/0838 |
| | | | 211/86.01 |
| 2015/0053635 A1 * | 2/2015 | Ahart | A47B 96/06 |
| | | | 211/206 |
| 2015/0313357 A1 * | 11/2015 | David | A47B 47/027 |
| | | | 211/187 |
| 2016/0055447 A1 | 2/2016 | Sehmer et al. | |
| 2016/0235195 A1 * | 8/2016 | Ahart | A47B 96/024 |
| 2017/0172295 A1 | 6/2017 | Tropper | |
| 2018/0206421 A1 | 7/2018 | Scott et al. | |
| 2019/0059240 A1 | 2/2019 | Scott et al. | |
| 2020/0323340 A1 | 10/2020 | Nilsson et al. | |
| 2021/0219722 A1 * | 7/2021 | Hu | A47B 96/06 |
| 2021/0315388 A1 * | 10/2021 | McMurtry | A47C 19/025 |
| 2022/0095790 A1 * | 3/2022 | Chiao | A47B 61/02 |
| 2024/0065435 A1 * | 2/2024 | Thurston | A47B 45/00 |

OTHER PUBLICATIONS

Amazon 5-Bay Vertical . . . https://www.amazon.com/5-Bay-Vertical-Sheet-Substrate-Storage/dp/B08BJ454ZC, May 31, 2022 or earlier, 3 pages.

Custom wall-mounted hurricane plywood storage rack | Kurt's Blog, https://www.pinterest.com/pin/516577019736329055/, May 31, 2022 or earlier, 2 pages.

Hiba 2-Shelf Wall Storage Unit, https://www.laredoute.com/ppdp/prod-350139314.aspx, May 31, 2022 or earlier, 3 pages.

Made a plywood/sheet good storage rack for my shop, https://www.reddit.com/r/woodworking/comments/e0ke8n/made_a_plywoodsheet_good_storage_rack_for_my_shop/, 2019, 13 pages.

Plywood Storage Rack, https://3dwarehouse.sketchup.com/model/961d1731-9736-45b4-a4dc-0e88e0300d4a/Plywood-Storage-Rack?hl=en, May 31, 2022 or earlier, 1 page.

The Server Rack FAQ, Selecting a Wall Mount Rack, https://www.server-racks.com/selecting-a-wall-mount-rack.html, Jan. 26, 2011, 4 pages.

Triple-Threat Storage for Lumber, Scraps, and Sheet Goods . . . , https://www.woodmagazine.com/project-plans/workshop-jig/shop-cabinets-storage-organizers/triple-threat-storage-for-lumber-scraps, May 31, 2022 or earlier, 2 pages.

Vertical Sheet Rack (GVR01), https://www.premier-storage.co.uk/vertical-sheet-rack-gvr01.html, May 31, 2022 or earlier, 1 page.

Wall Mount Racks, https://www.kendallhoward.com/product-category/racks-and-cabinets/wall-mount-racks/, May 31, 2022 or earlier, 3 pages.

WGX The Industrial Metal Wall Decor Display Shelf Box 3 Shelves . . . , https://www.amazon.ca/WGX-Industrial-Display-Shelves-Floating/dp/B0714HK6W8 , May 31, 2022 or earlier, 3 pages.

WikiHow—How to Store . . . , https://www.wikihow.com/Store-Plywood-in-a-Garage, May 31, 2022 or earlier, 2 pages.

\* cited by examiner

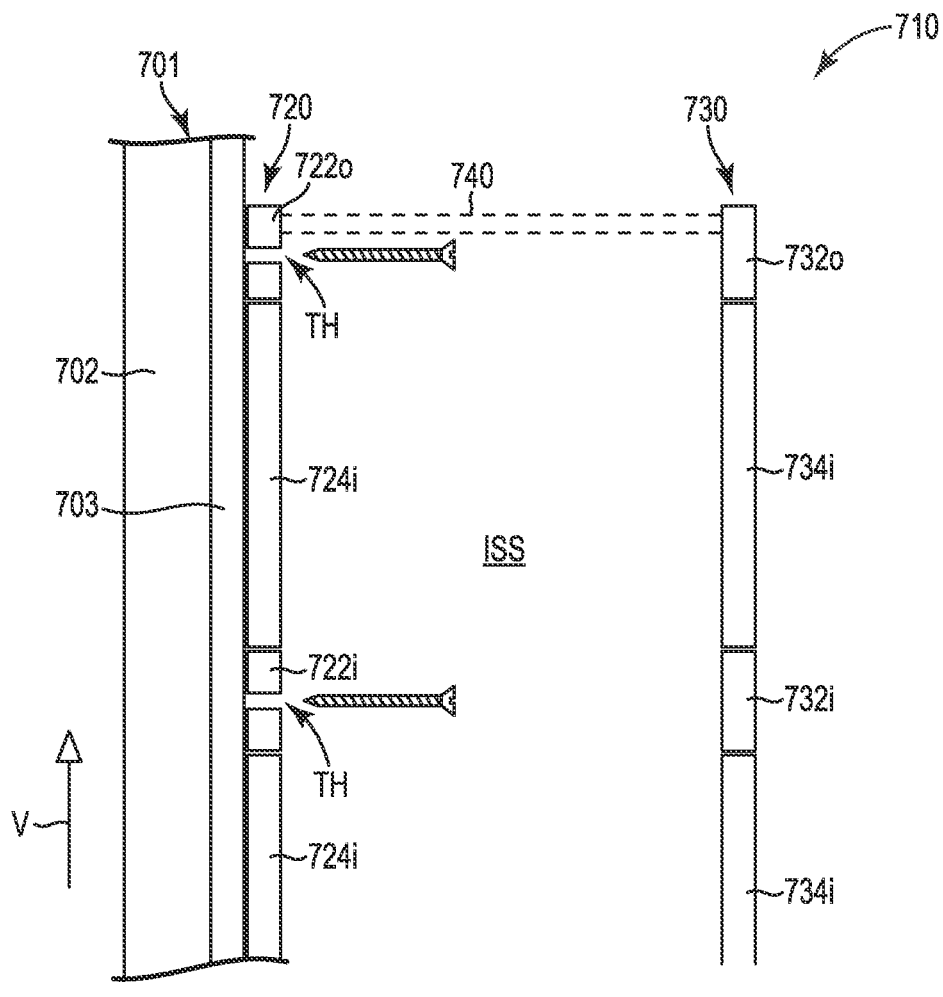
FIG. 7
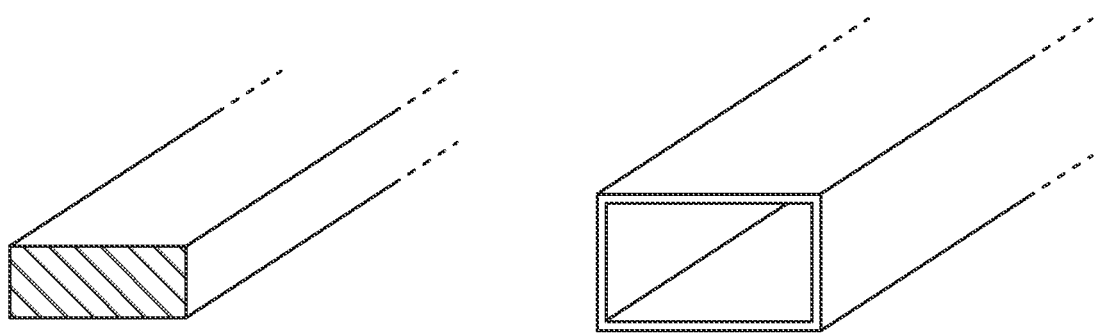
FIG. 8a   FIG. 8b

RECONFIGURABLE OPEN FRAME STORAGE SYSTEM AND COMPONENTS THEREOF

CROSS REFERENCE TO RELATED APPLICATIONS

This application is a continuation-in-part of U.S. patent application Ser. No. 17/896,389, filed on Aug. 26, 2022, currently pending.

FIELD OF THE INVENTION

The present disclosure relates to storage structures and systems, with particular application to such structures and systems configured for being mounted to a generally vertical surface, e.g., wall, and for holding large and/or heavy objects such as construction materials. The disclosure also pertains to related methods, systems, and articles.

BACKGROUND

Numerous types of storage systems, including wall-mountable storage systems, are known. See, for example, U.S. Pat. No. 7,296,697 (Costa et al.), U.S. Pat. No. 7,866,491 (Newman), U.S. Pat. No. 8,905,247 (Artigues et al.), U.S. Pat. No. 10,905,239 (Newman), and U.S. Pat. No. 4,181,771 (Hanson et al,), and patent application publications US 2002/0190019 (Reddig) and US 2020/0323340 (Nilsson et al.).

Costa '697 describes an adjustable closet organizer system, including a length-adjustable top rail, length-adjustable vertical uprights, and mounting brackets attachable to the uprights.

Shelf width is said to be adjustable to virtually any width from a minimum single shelf width by using two or more shelves.

Newman '491 describes a wall hanging garage shelf and rack storage system, said to be capable of a variety of configurations and adaptations. The device is said to include at least two triangular shaped braces, square shaped tubular rails, and a variety of attachment devices.

Artigues '247 describes a universal storage and shelving system that includes certain molded panels that can be hanged on a hangar track, which in turn is mounted on a vertical wall. Wardrobe hooks are defined in the fronts of the panels.

Newman '239 describes a wall hanging garage shelf and rack storage system, wherein a kit includes rod supports, three shelf bases, and two shelf supports that are separate from the three shelf bases.

Reddig '019 describes an upright file storage unit including an open-frame defined by a pair of upright frame members and upper and lower cross frame members. The lower end of the unit is supported on a floor, and an upper end is supported on an upright wall.

Nilsson '340 describes a wall-mounted configurable storage system in which vertical standards are mounted to a wall using cleats arranged in vertical columns and horizontal rows.

These and other known storage systems have limited usefulness for holding bulky and/or heavy materials, such as construction materials and/or large format goods that are extended in length along only one direction (e.g. long, rigid boards, pipes, tubes, rods, or the like) or along two orthogonal directions (e.g. rigid panels of plywood, sheet rock, glass, countertop material, or the like).

SUMMARY

The storage system and components of the present disclosure address at least one or more of the problems with prior, existing storage systems. In an embodiment, the storage systems have particular utility in the storage of large format goods, although they are not necessarily limited to such goods.

In an embodiment, the systems are tailored to be wall-mountable above the floor of a garage, warehouse, or other dwelling to maximize the useable floor space of such dwelling. The systems are also preferably tailored to be reconfigurable. One aspect of this reconfigurability is the ability to easily secure the storage structure to a wall in one of two orthogonal orientations, a horizontal/landscape orientation or a vertical/portrait orientation. Some embodiments are also reconfigurable by incorporating detachable connecting elements referred to as spacer bars, which can then be added or removed to change the configuration of, and accessibility to, the interior storage space. Some embodiments are also reconfigurable by using spacer bars that are extensible such that the interior storage space can be made larger or smaller.

In many embodiments, the storage structures of the disclosed storage systems include two open frame panels connected together but spaced from each other to form a rectangular cuboid with an interior storage space defined between the panels. In some cases, a third panel can also be included to define two adjacent interior storage spaces.

Therefore, disclosed herein, among other things, are storage systems that include a first open frame panel, a second open frame panel, and first spacer bars that connect the first panel to the second panel to define an interior storage space therebetween. The first panel may be generally rectangular in shape, and may include first major rails and first minor rails, the first major rails being mutually parallel and including first major inner rails disposed between two first major outer rails, the first minor rails being mutually parallel and including first minor inner rails disposed between two first minor outer rails. The second panel may also be generally rectangular in shape, and may include second major rails and second minor rails, the second major rails being mutually parallel and including second major inner rails disposed between two second major outer rails, the second minor rails being mutually parallel and including second minor inner rails disposed between two second minor outer rails. The first major interior rails may be arranged to have a center-to-center spacing SP1, and the first minor interior rails may be arranged to have a center-to-center spacing sp1 substantially equal to SP1.

The spacings SP1 and sp1 may be substantially equal to a standardized spacing for wall studs. The second major inner rails may be arranged to have a center-to-center spacing SP2, and the second minor inner rails may be arranged to have a center-to-center spacing sp2 substantially equal to SP2.

The spacing between each first major outer rail and its nearest neighbor first major inner rail may be SP1', greater than SP1. A ratio of SP1'/SP1 may be in a range from 1.01 to 1.2. The first major outer rails may have a width $WD1o$ and the first major inner rails may have a width $WD1i$, and $WD1o$ may be greater than $WD1i$.

The first major rails and the first minor rails may comprise hollow tubes. The outer rails of the first panel may define four corners of the first panel, and the outer rails of the second panel may define four corners of the second panel, and the first spacer bars may include one spacer bar disposed at each of the four corners of each panel. The first spacer bars may be extensible such that the storage system defines an interior storage space of an adjustable volume.

The storage system may also include a third open frame panel disposed such that the second open frame panel is between the first open frame panel and the third open frame panel. The third open frame panel may be generally rectangular in shape and may include third major rails and third minor rails, the third major rails being mutually parallel and including third major inner rails disposed between two third major outer rails, the third minor rails being mutually parallel and including third minor inner rails disposed between two third minor outer rails. Second spacer bars may connect the third panel to the second panel.

Also disclosed are storage systems that include a first generally rectangular panel, a second generally rectangular panel, and spacer bars connecting the first panel to the second panel to define an interior storage space therebetween. The first panel may include first major rails and first minor rails, the first major rails being mutually parallel and including first major inner rails disposed between two first major outer rails, the first minor rails being mutually parallel and including first minor inner rails disposed between two first minor outer rails. The first major inner rails may be arranged to have a center-to-center spacing SP1, and the first minor inner rails may be arranged to have a center-to-center spacing sp1 substantially equal to SP1. The spacing between each first major outer rail and its nearest neighbor first major inner rail may be SP1', greater than SP1. A spacing between each first minor outer rail and its nearest neighbor first minor inner rail may be sp1', greater than sp1.

The values SP1 and sp1 may be substantially equal to a standardized spacing for wall studs. The ratio SP1'/SP1 may be in a range from 1.01 to 1.2. The ratio of sp1'/sp1 may be in a range from 1.01 to 1.2. The first major outer rails may have a width WD1$o$ and the first major inner rails may have a width WD1$i$, and WD1$o$ may be greater than WD1$i$.

The spacing SP1' and the width WD1$o$ may be tailored such that each of the first major outer rails overlaps a reference line that is parallel to such first major outer rail and spaced from the nearest neighbor first major inner rail by a distance SP1. The first major rails and the first minor rails may comprise hollow tubes. The outer rails of the first panel may define four corners of the first panel, and the second panel may also has four corners, and the first spacer bars may include one spacer bar disposed at each of the four corners of each panel. The first spacer bars may be extensible such that the storage system defines an interior storage space of an adjustable volume. The storage system may also include a third panel disposed such that the second panel is between the first panel and the third panel, the third panel being generally rectangular in shape. A second set of second spacer bars may connect the third panel to the second panel.

Also disclosed herein is a storage system that includes at least two hanger brackets. Hanger brackets are generally rectangular in shape and having major rails and minor rails. The major rails are mutually parallel and include at least one major inner rail disposed between two major outer rails. The minor rails are mutually parallel and include a plurality of minor inner rails disposed between minor outer rails. The major and minor rails are perpendicular to one another. The minor inner rails are spaced generally vertically from one another and extend between one of the major outer rails and the at least one major inner rail. One of the major outer rails has a substantially planar outer surface and a plurality of through-holes. In an embodiment, the center-to-center spacing of a first major outer rail and an adjacent major inner rail is different than a center-to-center spacing of a second major outer rail and the adjacent major inner rail. In an embodiment, the minor inner rails are evenly spaced between minor outer rails. In some embodiments, the minor inner rails are adjustably spaced between minor outer rails. The at least two brackets define parallel planes. In embodiments, when the at least two hanger brackets are secured in position, the minor inner rails of a first of the at least two hanger brackets are each parallel and coplanar with a corresponding one of the minor inner rails of the second of the at least two hanger brackets.

The hanger brackets disclosed herein are intended to be secured to a generally vertical surface, such as a wall or other surface of a structure, side of a vehicle, or the like. In other embodiments, the generally vertical surface is one or more open frame panels in accordance with any embodiment or combination of embodiments described herein.

Also disclosed are related methods, systems, and articles, many of which are summarized in the items list provided below near the end of the Detailed Description section.

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

The inventive articles, systems, and methods are described in further detail with reference to the accompanying drawings, of which:

FIG. 3$b$ is a perspective view similar to FIG. 3$a$ but where extensible spacer bars are used to connect the two panels;

FIG. 7 is a schematic side view of a storage structure disposed against a wall to which it may be secured;

FIGS. 8$a$ and 8$b$ are schematic perspective views of different rails that may be used in the construction of an open frame panel;

FIG. 9$b$ is a schematic view similar to FIG. 9$a$ but where the stud spacing of the wall is different than that of FIG. 9$a$;

In the figures, like reference numerals designate like elements.

DETAILED DESCRIPTION OF ILLUSTRATIVE EMBODIMENTS

As noted above, we have developed a new family of storage systems that have particular utility in the storage of large format goods, including construction materials. The systems may be tailored to be wall-mountable above the floor of a garage, warehouse, or other dwelling. The systems may also be tailored to be reconfigurable. The storage structure may be securable to a wall in a horizontal/landscape orientation or a vertical/portrait orientation. The storage structure may also incorporate detachable connecting spacer bars to change the configuration of, and accessibility to, an interior storage space. In some cases the spacer bars may be extensible to allow the interior storage space to be made larger or smaller. The disclosed storage structures may include two open frame panels connected together but spaced from each other to form a rectangular cuboid with an interior storage space defined between the panels. A third panel may also be added to define two adjacent interior storage spaces.

Figure 1:
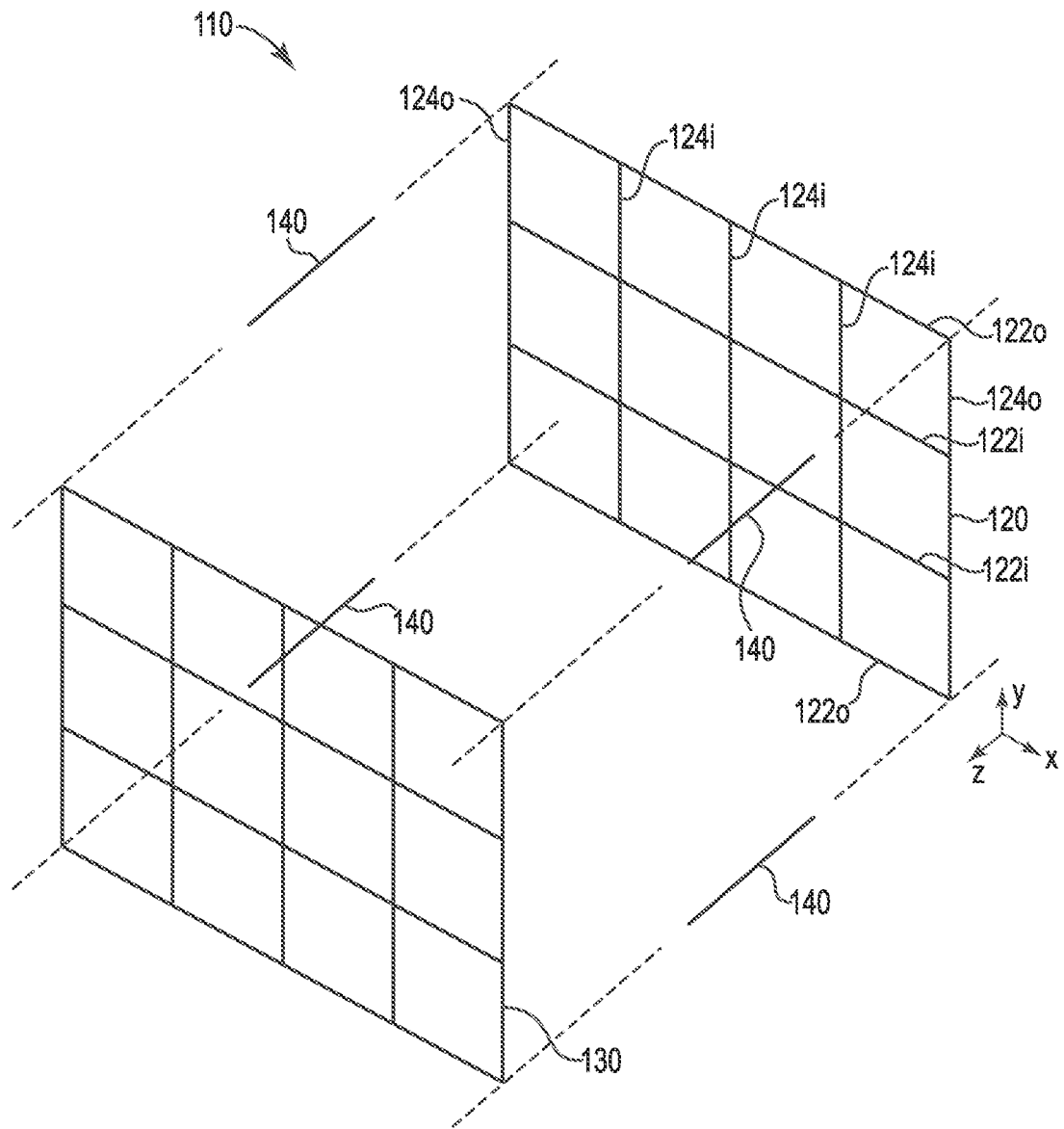
FIG. 1 is a schematic perspective exploded view of an open panel storage structure.

Turning then to FIG. 1, we see in a schematic exploded view some major elements of a storage structure 110. The structure includes a first open frame panel 120, a second open frame panel 130, and a plurality of spacer bars 140 to hold the two panels together in a fixed spatial relationship to define a storage space therebetween. The panels 120, 130 are preferably generally rectangular in shape, each one lying in or extending along a reference plane. In the figure, a Cartesian coordinate system x-y-z is provided for reference. Each panel 120, 130 may define a reference plane parallel to the x-y plane. The spacer bars 140 may extend along respective axes that are all parallel to the z-axis.

The first panel 120 may be tailored or suitable for securing to the wall of a garage, warehouse, or other dwelling, and the second panel 120 may then be used as the front side of the storage structure. The panel 120 may have a substantially open frame design, composed of transversely oriented rails spaced apart from each other in the plane of the panel by distances that are large compared to the width of the rails, to create an array of openings or apertures. The open frame construction helps reduce weight and cost, and is suitable for large format goods such as boards or panels, which are large enough to avoid falling or passing through such openings.

The generally rectangular shape of the panel 120 defines a long dimension, along the x-axis, and a short dimension, along the y-axis. The rails that make up the panel 120 fall into one of two groups: long rails that extend generally parallel to the x-axis, and short rails that extend generally perpendicular to the long rails, i.e., the short rails extend generally parallel to the y-axis. We refer to the long rails as major rails, and the short rails as minor rails. In the embodiment of FIG. 1, the first panel of the storage structure has four mutually parallel major rails, and five mutually parallel minor rails. The major rails are identified with reference numbers 122, but we further designate the two major rails at the outer edges of the rectangular structure as major outer rails 122o. The remaining major rails lie between the two outer rails, and are designated major inner rails 122I. Similarly, the minor rails are identified with reference numbers 124, but we further designate the two minor rails at the outer edges of the rectangular structure as minor outer rails 124*o*. The remaining minor rails lie between the two outer rails, and are designated minor inner rails 124*i*. The major rails 122 and minor rails 124 are preferably securely and permanently attached to each other at their points of intersection, such as by welding or the like, to provide the panel 120 with a sturdy, robust structural integrity.

The second panel 130 is also preferably generally rectangular in shape and is also composed of rails arranged transversely to each other to provide an open frame design. The second panel 130 may in fact be substantially the same or similar in design to the first panel 120, with the same numbers of major rails and minor rails, and the same or similar distances, spacings, and orientations of such rails relative to those of the first panel 120. The second panel 130 may also have substantially the same or similar overall length and width as the first panel 120.

The first and second panels 120, 130 are held together in a spaced-apart relationship by means of spacer bars 140. The spacer bars may extend orthogonally to the plane of each panel, i.e., they may extend parallel to the z-axis shown in the figure. In that orientation, the spacer bars and panels provide the storage structure 110 with the shape of a rectangular cuboid. Typically, one of the spacer bars 140 is provided at each of the four corners of the panels 120, 130, such that there are at least four spacer bars as shown in the figure. However, we also contemplate embodiments where one or more of the corners of the panels are not provided with a spacer bar 140. Many other configurations are also contemplated, as discussed further below.

When the spacer bars of FIG. 1 are attached at both ends to the panels so the panels are firmly connected together, a storage structure 210 is obtained. The figure shows the storage structure 210 in a highly schematic fashion, or the outer envelope of such structure. The storage structure 210 or its outer envelope has the general shape of a rectangular cuboid, since the first and second panels are generally rectangular and the spacer bars 240 extend perpendicular to both panels. The panels each extend parallel to an x-y plane, and are separated from each other along a perpendicular z-direction. The first panel has opposed major outer rails 222*o*, 222*o* and opposed minor outer rails 224*o*, 224*o*. The second panel has opposed major outer rails 232*o*, 232*o* and opposed minor outer rails 234*o*, 234*o*. For simplicity, the transverse major inner rails and minor inner rails are not shown in the figure, but their points of attachment to the appropriate major outer rails and minor outer rails are represented in the figure with small dark dots.

The rectangular cuboid formed by the storage structure 210 has six faces: a front face 210*a*, a rear face 210*b*, and four side faces, 210*c*, 210*d*, 210*e*, 210*f*. These may also be referred to simply as a front 210*a*, rear 210*b*, and sides 210*c*, 210*d*, 210*e*, 210*f* of the storage structure 210. The sides 210*c*, 210*d* may be referred to as minor sides, while the sides 210*e*, 210*f* may be referred to as major sides. The term "side" in relation to these four features should not be meant to imply or require a solid, planar physical surface, since many or most embodiments employ an open frame design wherein a given "side" may be a reference plane defined by the gap or aperture formed between two given outer rails and the outermost spacer bars (at the corners of the panels) that connect them.

The overall dimensions of the storage structure 210 or its outer envelope are shown as a length L, a width W, and a depth D. These dimensions can be selected as desired to satisfy a given application. However, in order for the storage structure to be suitable for holding at least some kinds of storage materials or other large format materials, L and W are each typically at least about 32 inches, more preferably at least 48 inches, and L is typically greater than W. The depth D is typically at least about 6 inches, and preferably at least 10, or 15, or 20 inches.

Figure 3A:
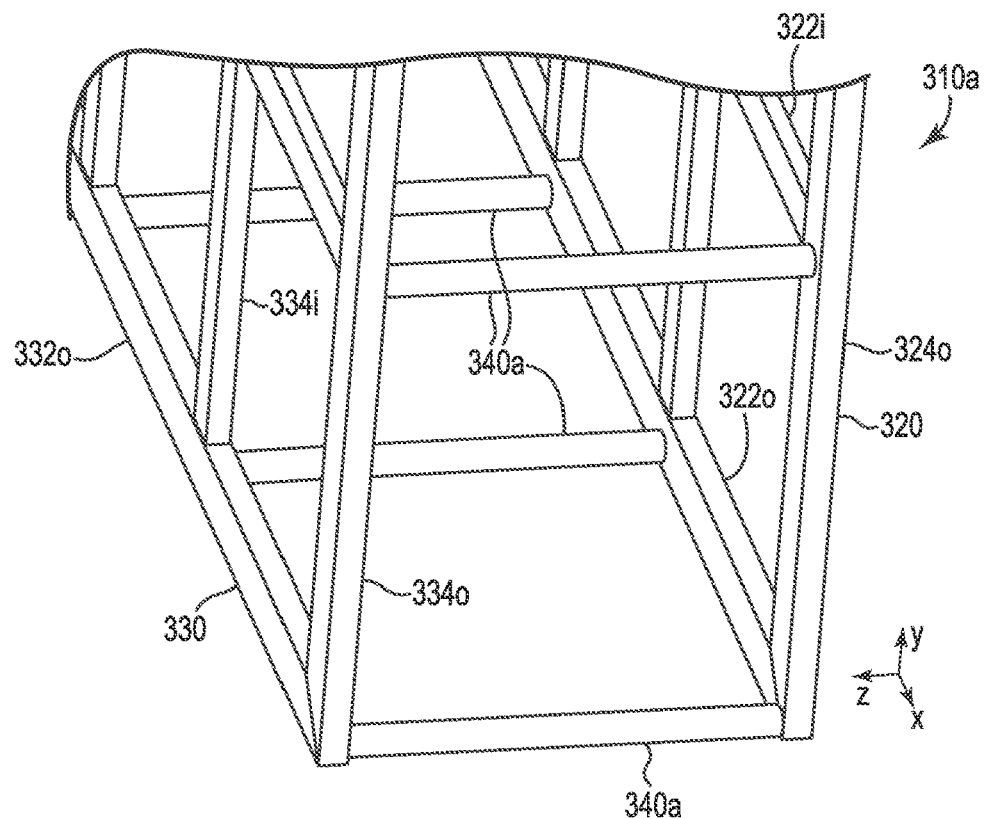
FIG. 3$a$ is a perspective view of a portion of a storage structure to illustrate the use of fixed type spacer bars to connect the two panels.

In FIG. 3A, we see a portion of a storage structure 310*a*, which may be the same as or similar to those discussed above. The storage structure has a first open frame panel 320, a second open frame panel 330, and spacer bars 340*a* connecting the two panels and holding them firmly in a fixed, spaced-apart relationship. The panels each include a set of mutually parallel major rails, and a set of mutually parallel minor rails perpendicular to the major rails. The panel 320 thus includes a major outer rail 322*o*, a major inner rail 322*i*, a minor outer rail 324*o*, and some minor inner rails (not labeled). The panel 330 similarly includes a major outer rail 332*o*, a minor outer rail 334*o*, and other rails including minor inner rails 334*i*. The various rails 322, 324, 332, 334 are shown as having flat outer surfaces and a rectangular cross-sectional shape perpendicular to their length. The rails of a given panel 320, 330 are preferably held together permanently such as by welding and held in positions such that corresponding flat surfaces of most or all the rails in the panel are substantially coplanar. This facilitates placing one of the panels, such as the first panel 320, against a flat vertical wall or the like for mounting.

The spacer bars 340*a* are simple, straight, fixed-length bars, rods, pipes, or the like, whether solid or hollow. The spacer bars 340*a* are shown as having a round (circular) cross sectional shape perpendicular to their length, but other cross-sectional shapes are also contemplated, such as rectangular or square. They are preferably sturdy enough to fully support the weight of the second panel 330 when the first panel 320 is affixed to a wall. The spacer bars 340*a*, as well as the various rails 322, 324, 332, 334 are preferably made of a metal or metal alloy such as steel, stainless steel, aluminum, alloys thereof, or other suitable metals. Alternative materials are however also contemplated, including suitably sturdy or robust woods or even polymer materials (plastics). The spacer bars 340*a* are all of equal length in order to hold the two panels parallel to each other. The spacer bars 340*a* are welded or otherwise permanently affixed to the two panels at the ends of the spacer bars. Thus, the spacer bars 340*a* may be said to be permanently affixed to the panels, and non-extensible.

Figure 3B:
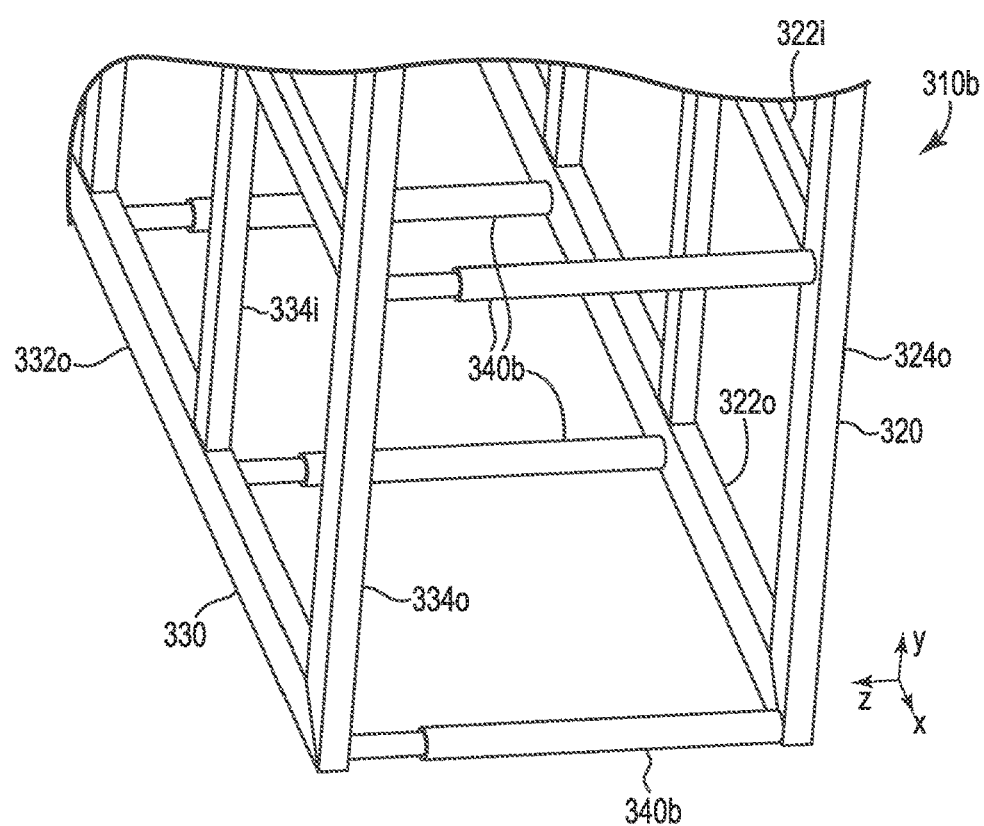

Another storage structure 310*b* is shown in FIG. 3*b*. The structure 310*b* may be similar to or the same as that of FIG. 3*a*, except for the use of different spacer bars 340*b*. Like the spacer bars 340*a*, the spacer bars 340*b* are permanently affixed at each end thereof to one of the panels 320, 330. But unlike the spacer bars 340*a*, the spacer bars 340*b* are extensible, i.e., adjustable in length in a telescoping manner. In the depicted embodiment, each spacer bar 340*b* is made up of two separable pieces or components that slidingly engage with each other: a small diameter barand a larger diameter bar, the smaller bar sized and configured to slip-fit into the larger, hollow bar. Thus the spacer bar 340*b* can be made longer or shorter by sliding the smaller bar back or forth within the larger bar. Transverse alignment holes can also be provided to allow a removeable locking pin to be inserted through both bars to hold them in place temporarily, e.g. at one of a series of desired lengths associated with a series of alignment holes. The extensible spacer bars 340*b* are shown to have a round or circular cross-sectional shape, but in alternative embodiments the cross-sectional shape can be different, e.g. square or rectangular.

When extensible spacer bars such as those of FIG. 3b are used, every spacer bar that connects the first panel to the second panel is preferably extensible, so that the two panels can be easily pushed closer together or pulled farther apart in order to make the interior storage space between the panels smaller or larger, respectively. In reference to the dimensions L, W, and D of FIG. 2, the use of extensible spacer bars allow D to be adjusted while keeping L and W fixed.

Figure 4A:
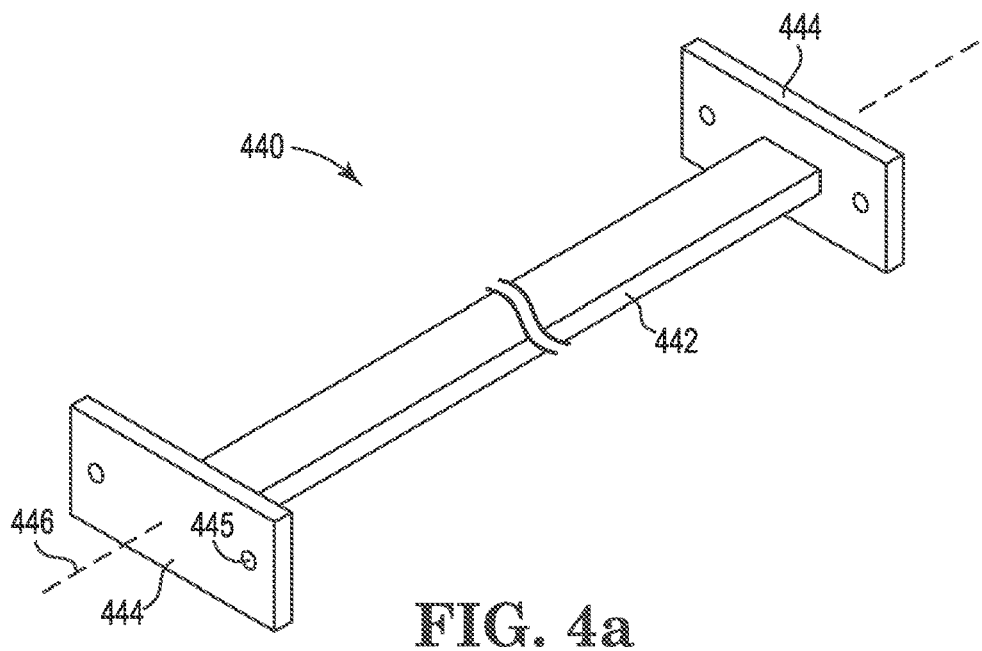
FIG. 4$a$ is a schematic perspective view of a fixed length but detachable spacer bar, and FIG. 4$b$ is a schematic plan view of the same spacer bar.
Figure 4B:
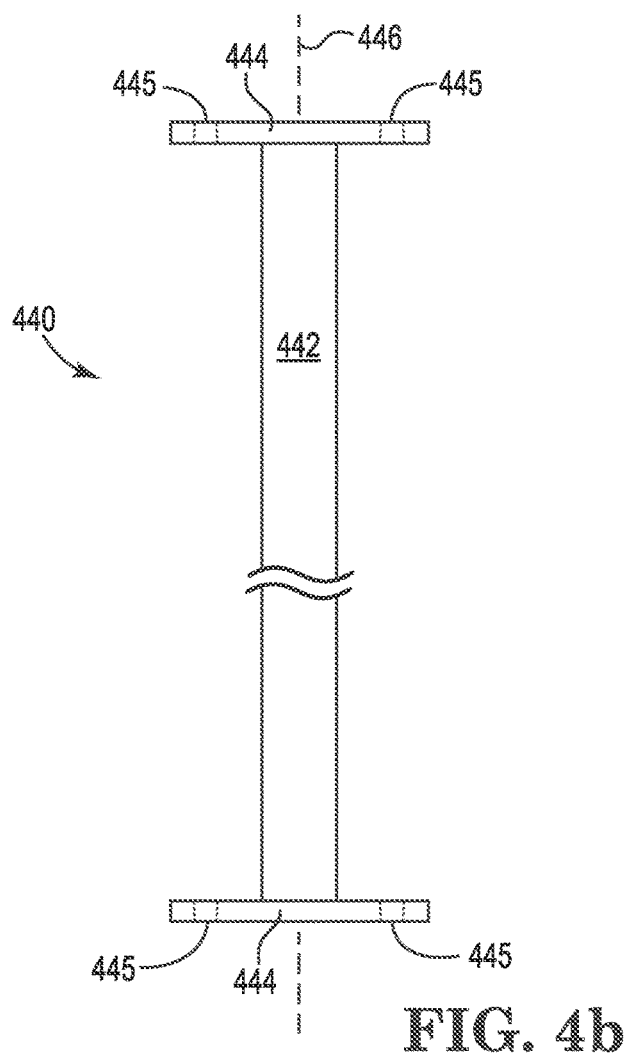

Another type of spacer bar that may be used to hold the two panels of the storage structure in a spaced-apart, parallel relation is shown in FIGS. 4a and 4b. The spacer bar 440 of these figures is made up of three components: an extended member 442 attached at each end to a mounting flange 444. The overall length of the spacer bar 440 is thus equal to the length of the member 442 plus the thickness of both mounting flanges 444. Each mounting flange 444 is provided with through-holes 445 to allow bolts or other suitable attachment mechanisms to pass through so as to secure the flange, and thus the spacer bar, to a given panel of the storage structure. By using removeable bolts, screws, or the like as the attachment mechanism to secure the spacer bar to the panel, the spacer bar 440 can be readily added to or removed from a given storage structure. The spacer bar 440 may thus be said to be of the type that is detachably connectable to the panels, and of fixed length.

The extended member 442 is shown to have a rectangular shape in cross-section, but it may have other shapes as desired, such as circular or square.

Figure 5A:
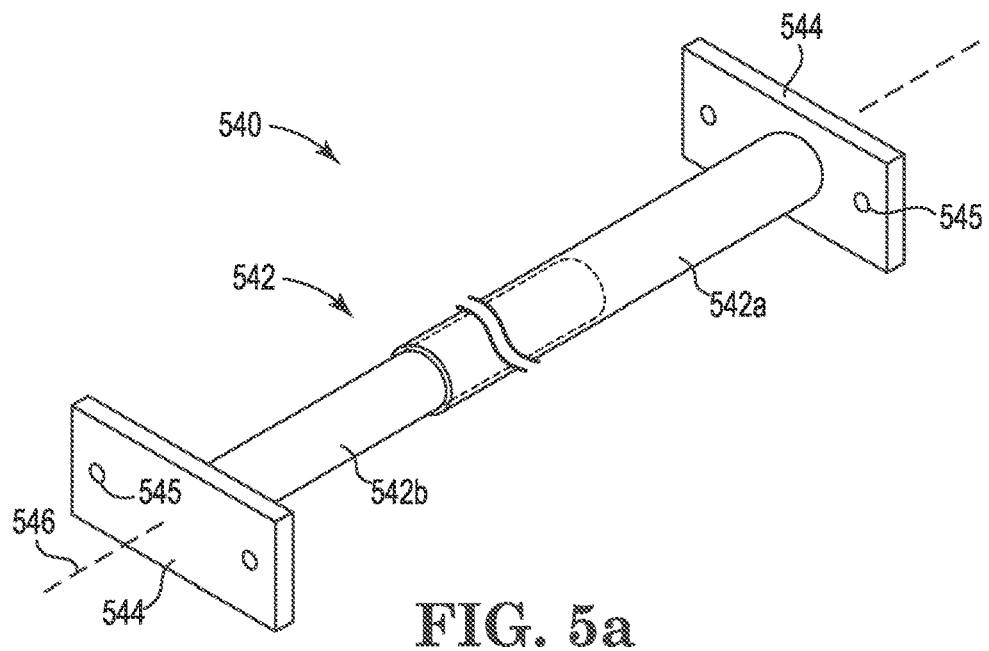
FIG. 5$a$ is a schematic perspective view of a detachable and extensible spacer bar, and FIG. 5$b$ is a schematic plan view of the same spacer bar.
Figure 5B:
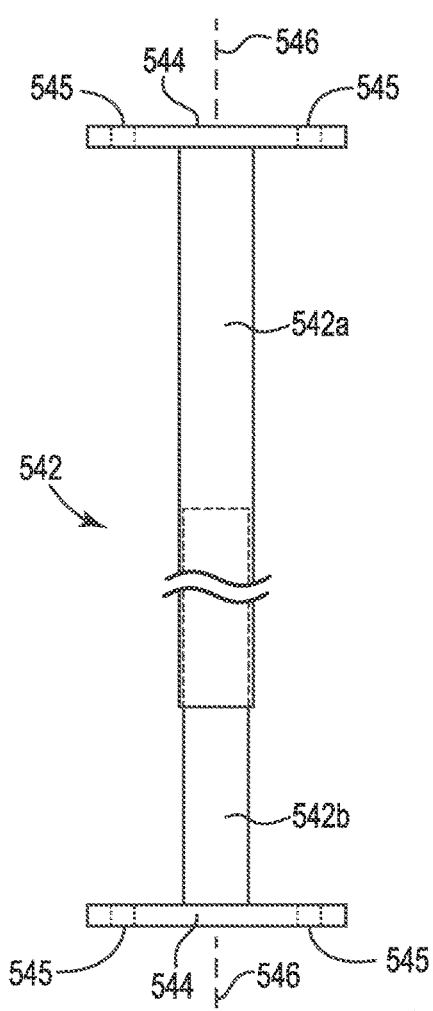

Still another type of spacer bar that may be used to hold the two panels of the storage structure in a spaced-apart, parallel relation is shown in FIGS. 5a and 5b. The spacer bar 540 of these figures is made up of four components: a larger bar 542a, a smaller bar 542b, and two mounting flanges 544. The smaller bar 542b fits within an axial cavity of the larger bar 542a, the two bars being in sliding engagement to permit a range of length adjustment. One end of the smaller bar 542b is attached to one flange 544, and one end of the larger bar 542a is attached to the other flange 544. The overall length of the spacer bar 540 is thus equal to the length of the combination larger bar/smaller bar plus the thickness of both mounting flanges 544. Similar to the flanges 444 discussed above, each mounting flange 544 is provided with through-holes 545 to allow bolts or other suitable attachment mechanisms to pass through so as to secure the flange, and thus the spacer bar, to a given panel of the storage structure. By using removeable bolts, screws, or the like as the attachment mechanism to secure the spacer bar to the panel, the spacer bar 540 can be readily added to or removed from a given storage structure. The spacer bar 540 may thus be said to be of the type that is both extensible, and detachably connectable to the panels.

Figure 6:
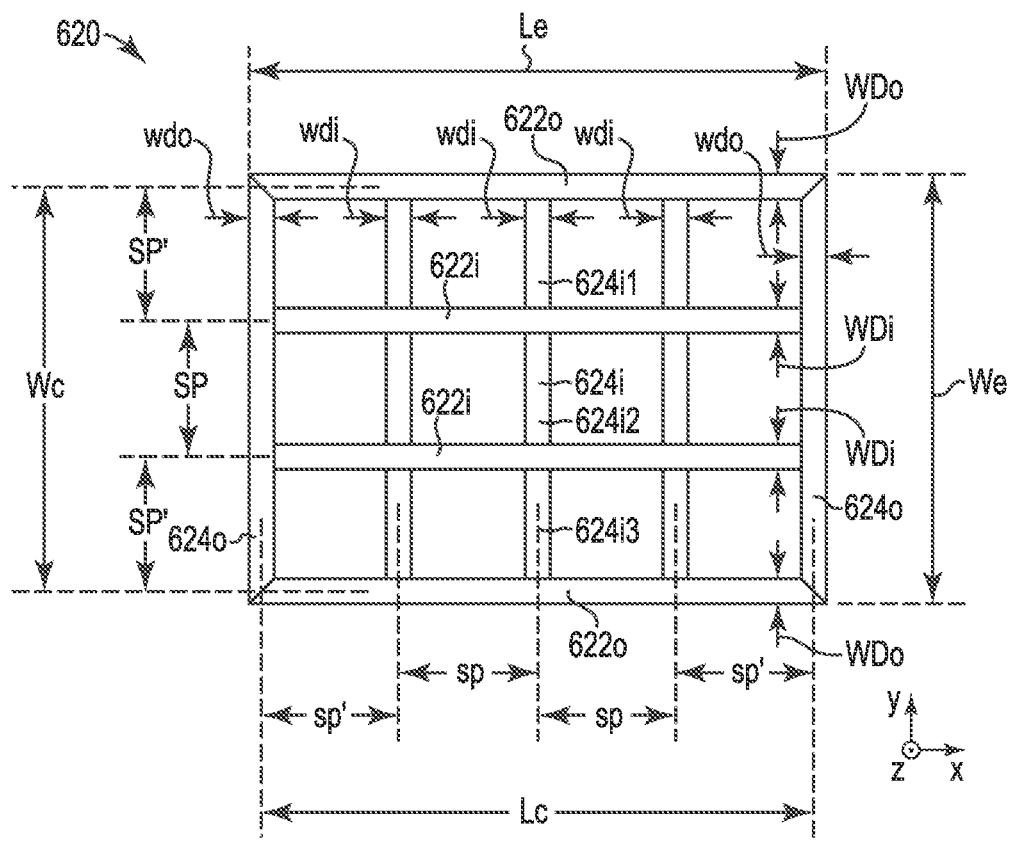
FIG. 6 is a schematic front view of an open frame panel.

A schematic front view of an exemplary open frame panel 620 useable with the disclosed storage structures is shown in FIG. 6. The panel 620 may be useable as either or both the first panel (e.g. the panel to be mounted against a wall, at the back of the storage structure) and/or the second panel (e.g. the panel that extends into the room away from the wall, at the front of the storage structure) of the embodiments discussed above. The panel 620 includes, or may consist essentially of, two groups of rails connected to each other to form a generally rectangular grid. The rails in each group of rails are mutually parallel to each other, but the two groups are oriented perpendicular to each other. The group of rails that extend parallel to the longer side of the rectangular shape of the panel (along the x-axis) are referred to as major rails 622. The group of rails that extend parallel to the shorter side of the rectangular shape of the panel (along the y-axis) are referred to as minor rails 624. The outermost ones of the major rails 622 are designated major outer rails 622o, 622o. The major rails between and parallel to those outer rails are designated major inner rails 622i. The outermost ones of the minor rails 624 are designated minor outer rails 624o, 624o. The minor rails between and parallel to those outer rails are designated minor inner rails 624i.

For ease of manufacture, the major inner rails 622i are preferably each a single, unitary piece of metal or other suitable material, stretching continuously from the inner edge of one of the minor outer rails 624o to the inner edge of the other minor outer rail 624o. Attachment at those points of intersection may be by welding or other suitable permanent means. The two major outer rails 622o and the two minor outer rails 624o are also preferably each a single, unitary piece of metal or other suitable material. The ends of these outer rails may be cut at 45 degrees or as otherwise desired so that adjacent rails fit together to form corners of the panel, such pieces being welded or otherwise joined (whether permanently or not) along such angled edges.

In contrast, the minor inner rails are preferably constructed with a plurality of individual rail components. A given minor inner rail 624i may thus comprise rail components 624i1, 624i2, 624i3, placed in alignment with each other, and each welded in place between adjacent major rails, so as to form what we refer to as a minor inner rail 624i. The panel 620 has three such minor inner rails 624i.

The outer edges of the two major outer rails 622o are designated in the figure with two horizontal dashed lines, between which is defined an edge-to-edge width We of the panel 620. The outer edges of the two minor outer rails 624o are designated with two vertical dashed lines, between which is defined an edge-to-edge length Le of the panel 620. The remaining vertical and horizontal dashed lines in FIG. 6 designate the center lines of the various major and minor rails.

Thus, the dimension Wc represents the center-to-center width of the panel 620, i.e., the perpendicular distance between the center lines of the two major outer rails 622o. Likewise, Lc represents the center-to-center length of the panel 620, i.e., the perpendicular distance between the center lines of the two minor outer rails 624o.

Other dimensions of significance are the various center-to-center spacings of the various rails, and the widths in the plane of the panel of the various rails. The widths of the major outer rails 622o are WDo. The widths of the minor outer rails 624o are wdo. The widths of the major inner rails 622i are WDi. The widths of the minor inner rails 624i are wdi. In some embodiments, the widths WDo, wdo, WDi, wdi are all substantially the same. (Here and elsewhere in this document, when we refer to two or more dimensions being substantially the same or substantially equal, we mean they differ by no more than ordinary manufacturing tolerances.) In other embodiments, WDo and wdo may be substantially equal to each other, but greater than WDi and wdi, which may also be substantially equal to each other. In still other embodiments, it is possible to make WDo and wdo substantially equal to each other, but less than WDi and wdi, which may again be substantially equal to each other.

The center-to-center spacings are also of consequence. The center-to-center spacing between two adjacent major inner rails 622i is SP. The center-to-center spacing from a given major outer rail 622o and its nearest neighbor major rail (major inner rail 622i) is SP'. The center-to-center spacing between two adjacent minor inner rails 624i is sp. The center-to-center spacing from a given minor outer rail 624o and its nearest neighbor minor rail (minor inner rail 624i) is sp'. In some embodiments, SP, SP', sp, and sp' are all substantially the same. In other embodiments, SP' and sp' are substantially the same, but substantially different from (less than) SP and sp, which may be substantially the same. Note that in cases where SP and SP' are equal, then the lengths of the minor rail components 624i1, 624i2, and 624i3 will be substantially the same. However, in cases where SP' is greater than SP, the minor rail components will not all be equal, in particular, the length of 624i1 will substantially equal that of 624i3, but those lengths will be substantially greater than that of 624i2.

These relationships of lengths and widths also have ramifications to the shapes of the generally square-looking (but in some cases actually rectangular) open spaces (gaps or apertures) between each group of four adjacent rails. For example, in a case where the widths WDo, wdo, WDi, wdi are all the same, and the spacings SP, SP', sp, and sp' are all the same, the 12 apertures formed by the rails will all be squares of equal size. However, if SP' and sp' are then increased but equal to each other (and greater than SP and sp), the two apertures in the center of the panel will be squares of the original size, the four apertures at the corners of the panel will also be square but larger than the original size, and the remaining six apertures will be rectangular. The reader will understand that other combinations are possible in view of the other teachings herein regarding other possible designs of the panels.

Turning now to FIG. 7, we see there a schematic side view of a storage structure 710 placed against a wall 701 to which it is to be secured. The wall 701 may be vertical, as indicated by the vertical axis V. The storage structure 710 may be the same as or similar to those discussed above, and may incorporate two open frame panels the same as or similar to those discussed in FIG. 6 above, or elsewhere herein. The storage structure 710 includes a first open frame panel 720 and a second open frame panel 730, each composed of a set of major rails and a perpendicular set of minor rails. A set of spacer bars 740 connect the two panels together, and fully support the second panel 730 which forms the front of the storage structure 710. The space between the panels defines an interior storage space ISS, where construction materials or other large format materials may be stored.

The view of FIG. 7 cuts through the storage structure 710 along one of the minor inner rails of the first and second panels. Thus, in the figure we see, as part of the first panel 720, a major outer rail 722o, a major inner rail 722i, and a minor inner rail 724i (in piece parts). We also see, as part of the second panel 730, a major outer rail 732o, a major inner rail 732i, and a minor inner rail 734i (in piece parts). Through holes TH are provided in the major rails 722o, 722i so that the first panel 720 (and hence the storage structure 710) can be fastened to the wall via screws, nails, or other suitable fasteners. The wall includes an outer drywall layer 703 and a sturdy wall stud 702. The screws or other fasteners are long enough to embed themselves in the stud 702. Through holes (with corresponding mounting screws) may also be provided in other rails, including the minor inner rail 724i.

The ability to fasten the storage structure to the studs of the wall is of some significance for many if not most of the disclosed embodiments. The storage structure 710 itself typically has a significant mass or weight, e.g., at least 25, 50, or 75 pounds, some embodiments weighing from 50 to 500, or 50 to 250 pounds. Beyond that, construction materials which it may be required to hold can easily weight several hundred pounds. The total weight of the storage structure 710 and the construction materials may thus be hundreds of pounds in weight or mass. The connection from the first panel 720 to the wall 701 therefore often needs to be solid, firm, and reliable to prevent the storage structure from separating from or falling off the wall when the storage structure is fully loaded. This means that the mounting screws that hold the first panel 720 to the wall 701 should be firmly embedded in the wall studs 702. To support heavy weights, numerous such mounting screws are often used.

FIGS. 8a and 8b are schematic perspective views of some of the different types of rails that may be used in the construction of the disclosed open frame panels. The rails in both of these figures have flat outer surfaces, which is advantageous so that a panel built from such rails can present a substantially flat, planar face (via substantially coplanar, flat surfaces of the individual rails that make up the panel) for mounting to a flat wall, or for presenting as the front face of the storage structure.

The rail of FIG. 8a is solid, whereas the rail of FIG. 8b is hollow. Although either may be used, the hollow version of FIG. 8b typically provides the advantage of being lighter. Furthermore, in cases where threaded holes are desired in the rails, the hollow version of FIG. 8 conveniently allows for threaded rivets to be embedded in the rail, to provide a threaded path (to receive the end of a bolt) that is longer than could be provided by a solid rail of practical dimensions. Typical dimensions of the cross-sectional shape of rails such as those of FIG. 8a or 8b may be, for example, 1×1 inch (square), 1×2 inches (rectangular), ¾×1.5 inches (rectangular), or other suitable sizes. Alternative rail designs to those of FIGS. 8a and 8b are also contemplated, e.g., round solid or round hollow rails, but are not preferred for most applications.

Figure 9A:
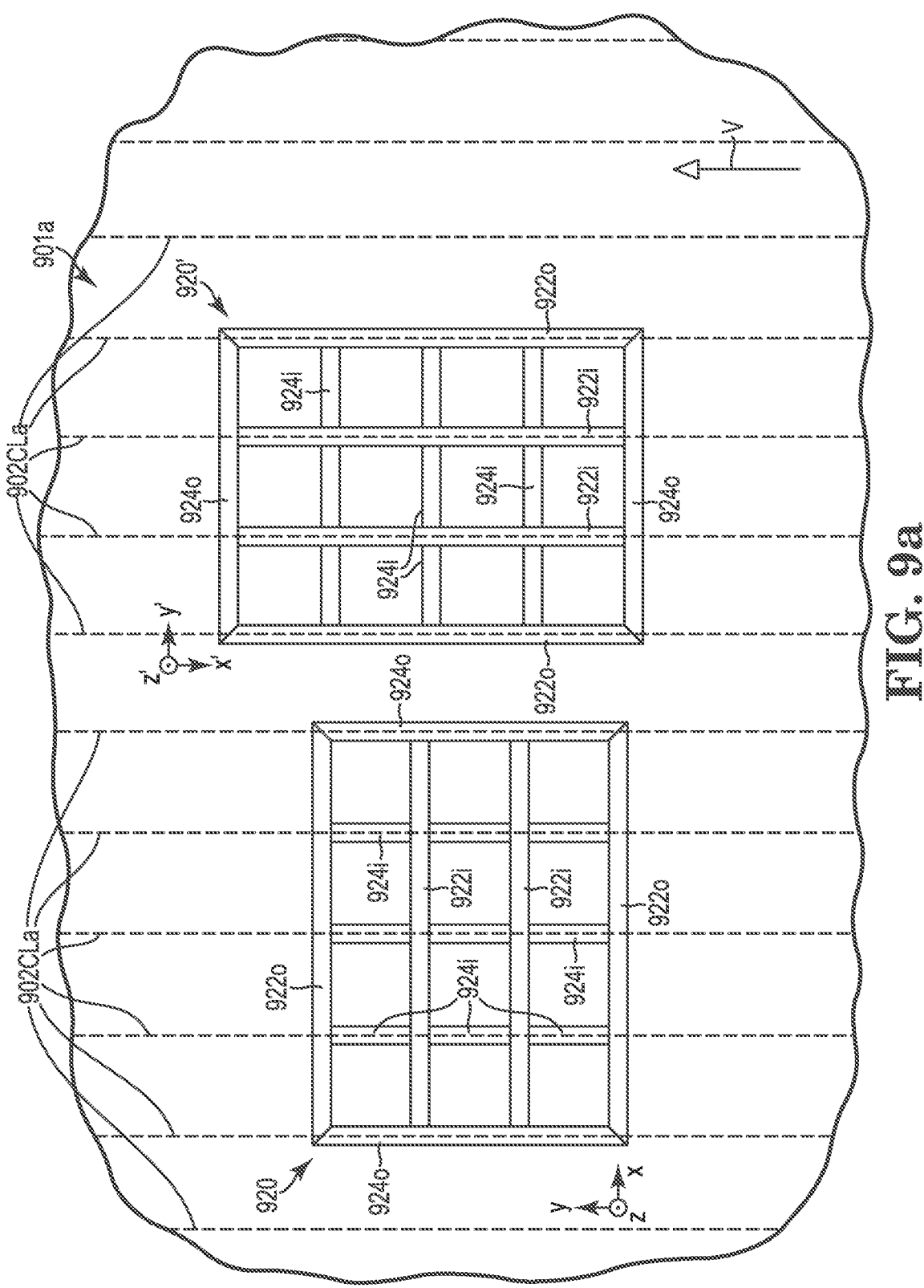
FIG. 9$a$ is a schematic front view of a studded wall and a storage structure that may be secured to such wall in either of two orthogonal orientations.
Figure 9B:
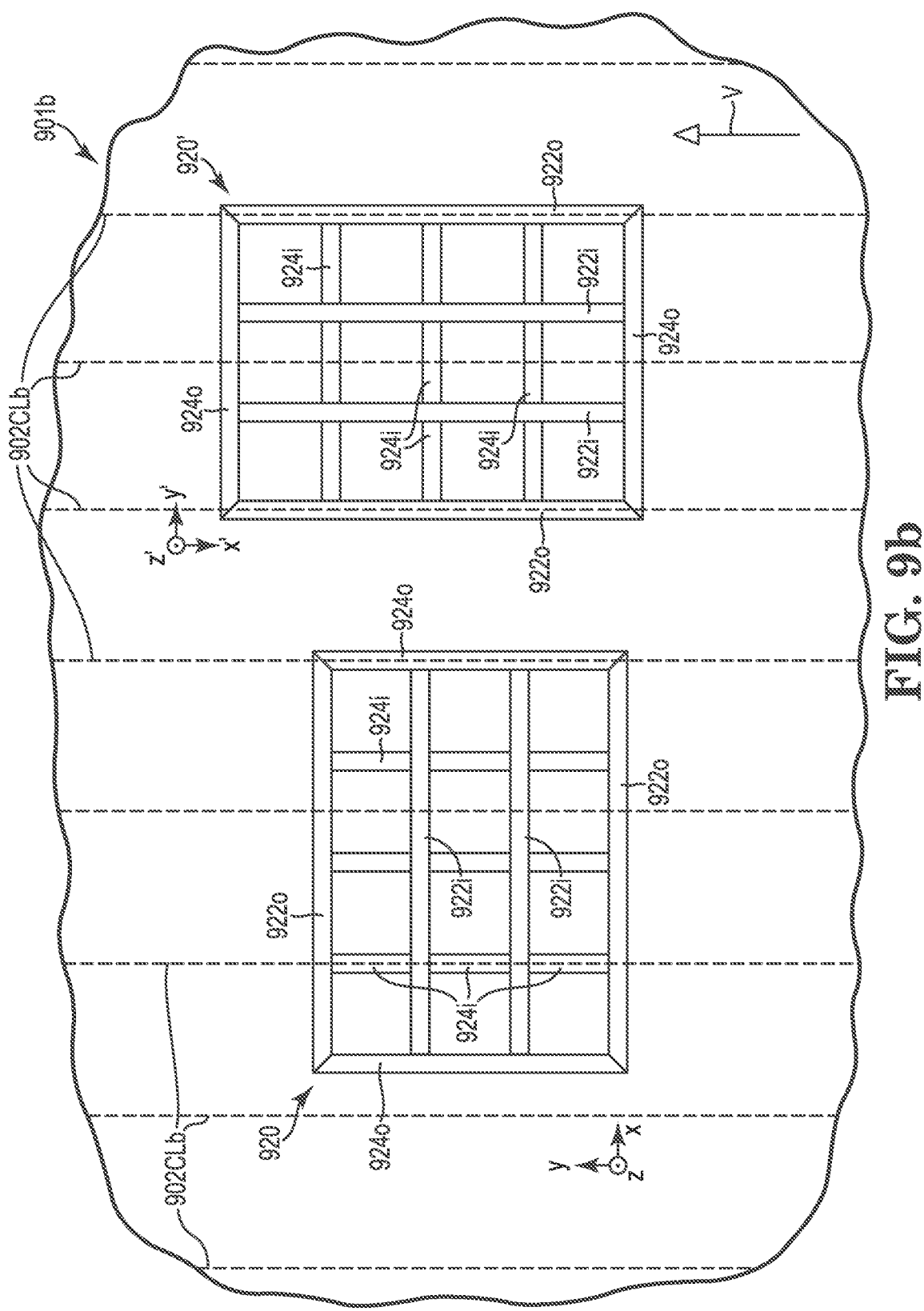

One aspect of the reconfigurability of the disclosed storage structures is illustrated in FIGS. 9a and 9b. This aspect relates to the ability of the storage structure to be mounted to the wall in either a horizontal, landscape orientation, or a vertical, portrait orientation. This ability is associated with the spacing used for at least some of the rails that make up the panels, especially the panel that is secured directly to the wall, sometimes referred to herein as the first panel. FIG. 9a shows such a first panel 920 mounted directly to a wall 901a via fasteners (not shown in FIG. 9a) as described in connection with FIG. 7. For ease of illustration, the second panel and other components that would make up the complete storage structure are not shown, but the reader will understand that they would also be present. The wall 901a includes wall studs, whether made of wood or metal, the wall studs being uniformly spaced with a center-to-center spacing of 16 inches, a common stud spacing for homes in the United States. The dotted vertical lines 902CLa represent the center lines for the studs. The vertical direction is indicated in the figure by the axis V.

The first panel 920 may be the same as or similar to the other open frame panels discussed herein. Thus, the panel 920 includes major rails 922, including major outer rails 922o and major inner rails 922i. The panel 920 also includes minor rails 924, including minor outer rails 924o and minor inner rails 924i. The orientation of the panel 920 is indicated by the local Cartesian coordinates x, y, z, where the x-axis extends parallel to the major rails and the y-axis extends parallel to the minor rails. The center-to-center spacings of the various rails of the panel 920 are selected to allow not just for wall mounting, but for wall mounting in either of two orthogonal orientations. We describe the desired spacing using the terms SP, SP', sp, and sp' in the same manner as in FIG. 6, along with the terms WDo, WDi, wdo, wdi as also used therein. In the embodiment of panel 920, we assume all the rails have the same or similar widths, e.g., WDo WDi wdo wdi, and then we make sp substantially equal to sp', and set both of them to be substantially equal to the stud spacing, in this case 16 inches. By doing so, we are able to line up the panel 920 against the wall 901*a* such that each one of the minor rails, both the inner ones and the outer ones, is lined up with one of the wall studs. Through holes may thus be provided in the minor rails and screws or other fasteners used to firmly secure the panel (and storage structure) to the wall studs, and thus to the wall 901*a*.

Next, we try mounting the panel 920 to the same wall 901*a* again, but this time rotating it so that its major rails extend along the vertical direction V. With this change of orientation, we relabel the panel as 920', and we relabel the rotated coordinate axes as x', y', z'. But otherwise the panel 920' is the same as panel 920. Now, we select the spacings of the major rails, i.e., SP and SP', to be substantially equal to each other, and substantially equal again to the stud spacing, in this case 16 inches. By doing so, we are able to position the panel 920 against the wall 901*a* such that each one of the major rails, both the inner ones and the outer ones, is lined up with one of the wall studs. Through holes may thus be provided in the major rails and screws or other fasteners used to firmly secure the panel (and storage structure) to the wall studs, and to the wall.

In summary, FIG. 9*a* shows us that if we select the center-to-center spacing of both the major rails and the minor rails to equal the wall stud spacing, the panel 920, and thus also the storage structure of which it is a part, can be solidly anchored to a wall in either a horizontal or vertical orientation due to the alignment of all of the major rails (in one orientation), or all of the minor rails (in the other orientation), with the wall studs.

In the United States, there is another standard used for stud spacing, namely, 24 inches rather than 16 inches. FIG. 9*b* illustrates how the very same panel 920 from FIG. 9*a* performs when used with a wall with that different (larger) stud spacing. FIG. 9*b* thus provides a wall 901*b* and the panel 920, where like reference numbers relative to FIG. 9*a* refer to like elements, with no further explanation of those elements being needed. The wall 901*b* may be substantially the same as wall 901*a* except that the studs of wall 901*b* are uniformly spaced with a center-to-center spacing of 24 inches, drawn to scale relative to FIG. 9*a* and to the panel 920. The dotted vertical lines 902CL*b* thus represent the center lines for the studs of the new wall.

The figure shows us that when we maintain the same rail spacings of the panel 920 as in FIG. 9*a*, i.e., when we select the center-to-center spacing of both the major rails and the minor rails to equal the other 16 inch wall stud spacing, the panel 920 can still benefit from this spacing compared to an arbitrary rail spacing, because one out of every three neighboring rails (one out of every three minor rails in the horizontal/landscape orientation, and one out of every three major rails in the vertical/portrait orientation) can be aligned with one of the wall studs. One can also describe and compare the situations in FIGS. 9*a* and 9*b* in terms of a ratio of the rail spacing of the panel to the stud spacing of the wall. In FIG. 9*a*, that ratio is 1:1. In FIG. 9*b*, that ratio is 2:3.

Figure 10:
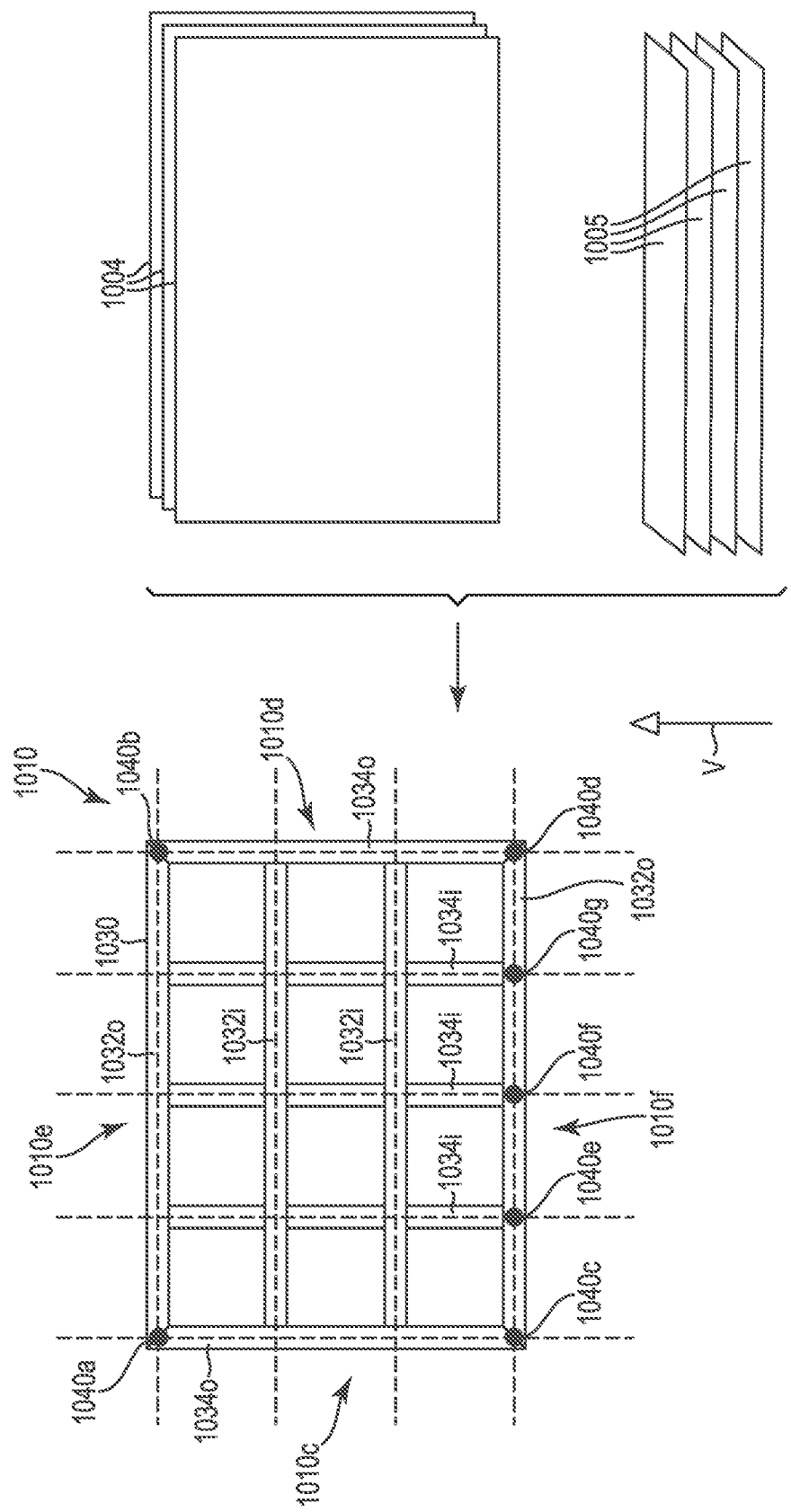
FIG. 10 is a schematic front view of a storage structure mounted to a wall horizontally, the figure also showing large format goods that may be inserted into the storage structure.
Figure 11:
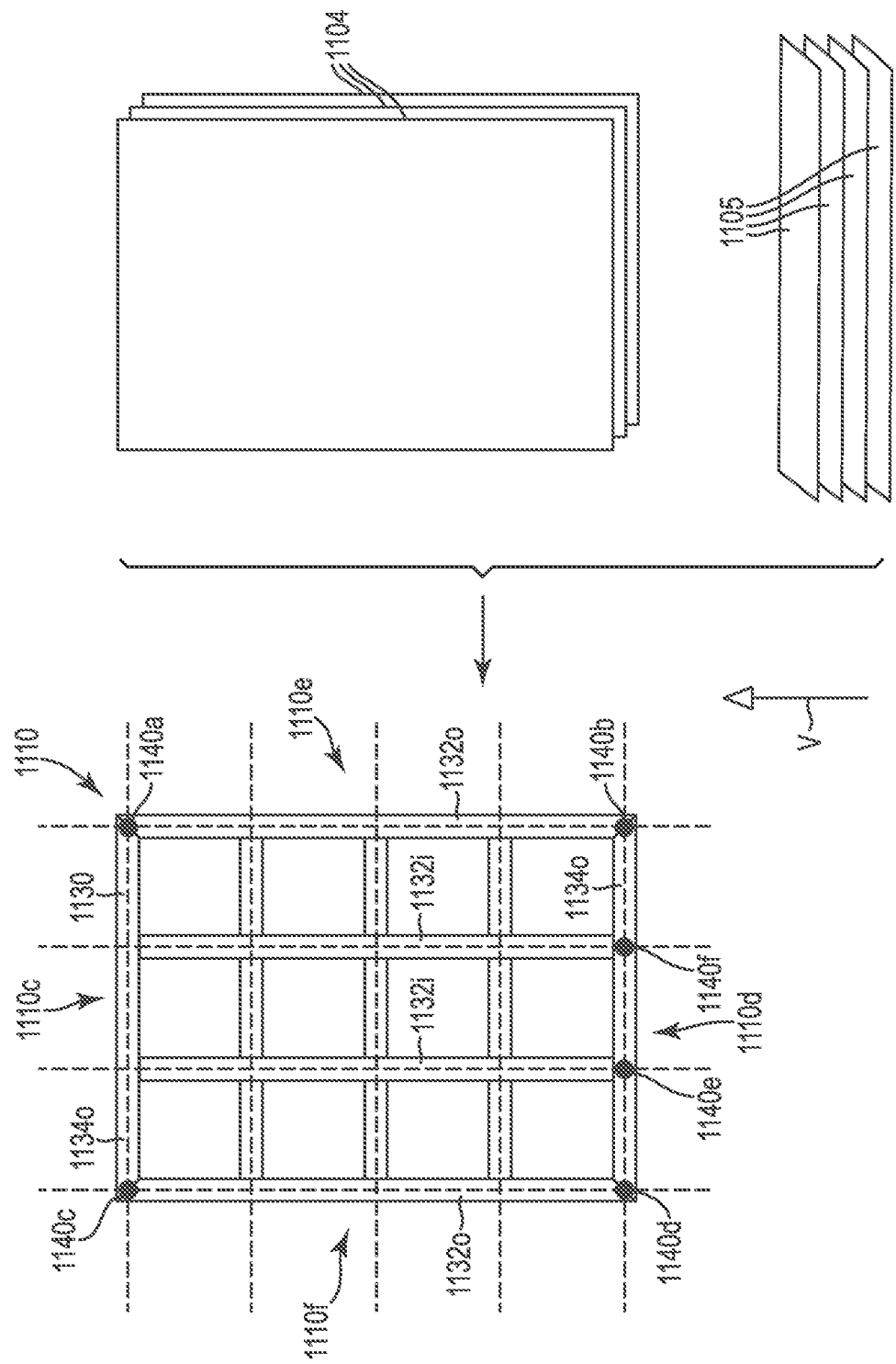
FIG. 11 is a schematic front view similar to FIG. 10, but where the storage structure is mounted to the wall vertically.

FIGS. 10 and 11 illustrate different ways the disclosed storage structures can be used to store or hold large format goods, such as construction materials. In FIG. 10, a storage structure is shown mounted in a horizontal or landscape orientation, while in FIG. 11, a similar storage structure is shown mounted in an orthogonal, portrait orientation. The figures also show how spacer bars can be selectively included or omitted along the outer rails (between the corner positions, which are typically each provided with a spacer bar) as a function of the storage structure's orientation. Thus, in FIG. 10, we see the front view of a storage structure 1010 as mounted to a wall in a landscape orientation. The storage structure 1010 may be the same as or similar to other storage structures described herein. The first and second open frame panels of the storage structure 1010 are assumed to be substantially the same overall size, and assumed to have the same number, same size, and same orientations of rails. Our view in FIG. 10 of the storage structure 1010 thus allows us to see the second panel 1030, but not the first panel because it is blocked by the second panel. The second panel 1030 includes major rails 1032 and minor rails 1034, the major rails including major outer rails 1032*o* and major inner rails 1032*i*, and the minor rails including minor outer rails 1034*o* and minor inner rails 1034*i*.

The dashed vertical lines in FIG. 10 represent both the center lines of the various minor rails, as well as the center lines of the wall studs, since the storage structure 1010 has been mounted on the wall such that those two groups of center lines are aligned with each other. The dashed horizontal lines in FIG. 10 represent the center lines of the various major rails. The spacing of the dashed horizontal lines is equal to the spacing of the dashed vertical lines.

The intersections of the four outer rails 1032*o*, 1034*o* define four corners of the panel 1030. At (i.e., near or next to) each of these corners, a spacer bar is provided to connect the second panel 1030 to the first panel, which is assumed to be anchored to the wall by screws or other suitable attachment devices embedded in the wall studs, as described elsewhere herein. The spacer bars—which would actually not be visible in this front view of the storage structure since they are located behind the second panel—are represented schematically in the figure by solid black dots. Thus, the spacer bars 1040*a*, 1040*b*, 1040*c*, 1040*d* firmly connect the two panels together at their respective corners. Three other spacer bars are included in the storage structure 1010: spacer bars 1040*e*, 1040*f*, and 1040*g*. These attach the lower major outer rail 1032*o* to its counterpart major outer rail of the first panel. The spacer bars 1040*e*, 1040*f*, and 1040*g* are preferably aligned with the center lines of their associated minor rails 1034*i*. Thus, the center-to-center spacing of the spacer bars 1040*e*, 1040*f*, 1040*g* is sp (see FIG. 6), the same as the spacing of the minor inner rails.

The first and second panels define an interior storage space of the storage structure 1010. The storage space is bounded by front, back, and side faces as discussed in connection with FIG. 2. In FIG. 10, we label the four side faces: opposing faces 1010*c* and 1010*d*, and opposing faces 1010*e* and 1010*f*. In this landscape orientation of the storage structure 1010, the spacer bars 1040*e*, 1040*f*, 1040*g* are provided along the bottom outer rail in such a way as to block or obstruct the bottom face 1010*f*. Meanwhile, the other faces 1010*c*, 1010*d*, 1010*e* are provided with no such blocking or obstructing spacer bars along their respective outer rails, except at the corners. With this configuration of spacer bars, large format goods, such as panel-type goods 1004 and/or board-type goods 1005, may be loaded into the interior storage space through either the left or right side or the top, i.e., through any of the faces 1010*c*, 1010*d*, 1010*e*. The weight of such goods is supported in a distributed fashion, shared among the lower spacer bars 1040*e*, 1040*f*, 1040*g* along with the lower corner spacer bars 1040*c*, 1040*d*.

FIG. 11 shows a front view of a storage structure 1110 similar to that of FIG. 10 except that the storage structure 1110 is mounted to the wall in a vertical, portrait orientation. The storage structure 1110 may be the same as or similar to other storage structures described herein. Similar to FIG. 10, our view in FIG. 11 allows us to see the second panel 1130, but not the first panel of the storage structure 1110. The second panel 1130 includes major rails 1132 and minor rails 1134, the major rails including major outer rails 1132*o* and major inner rails 1132*i*, and the minor rails including minor outer rails 1134*o* and minor inner rails (not labeled).

Like in FIG. 10, the dashed vertical lines in FIG. 11 represent both the center lines of the various minor rails, and the center lines of the wall studs. The dashed horizontal lines in FIG. 11 represent the center lines of the various major rails, such spacing being equal to that of the dashed vertical lines.

The intersections of the four outer rails 1132*o*, 1134*o* define four corners of the panel 1130. At (i.e., near or next to) each of these corners, a spacer bar is provided to connect the second panel 1130 to the first panel. The spacer bars 1140*a*, 1140*b*, 1140*c*, 1140*d*, again represented schematically by solid black dots, firmly connect the two panels together at their respective corners. Two other spacer bars are included in the storage structure 1110: spacer bars 1140*e* and 1140*f*. These attach the lower minor outer rail 1134*o* to its counterpart minor outer rail of the first panel. The spacer bars 1140*e*, 1140*f* are preferably aligned with the center lines of their associated major rails 1132*i*. Thus, the center-to-center spacing of the spacer bars 1140*e*, 1140*f* is SP (see FIG. 6), the same as the spacing of the major inner rails.

The first and second panels define an interior storage space of the storage structure 1110. The storage space is bounded by front, back, and side faces as discussed in connection with FIG. 2. In FIG. 11, we label the four side faces: opposing faces 1110*c* and 1110*d*, and opposing faces 1110*e* and 1110*f*. In this portrait orientation of the storage structure 1110, the spacer bars 1140*e*, 1140*f* are provided along the bottom outer rail in such a way as to block or obstruct the bottom face 1110*d*. Meanwhile, the other faces 1110*c*, 1110*e*, 1110*f* are provided with no such blocking or obstructing spacer bars along their respective outer rails, except at the corners. With this configuration of spacer bars, large format goods, such as panel-type goods 1104 and/or board-type goods 1105, may be loaded into the interior storage space through either the left or right side or the top, i.e., through any of the faces 1110*c*, 1110*e*, 1110*f*. The weight of such goods is supported in a distributed fashion, shared among the lower spacer bars 1140*e*, 1140*f* along with the lower corner spacer bars 1140*b*, 1140*d*.

FIGS. 10 and 11 demonstrate why it is sometimes desirable to have different configurations of spacer bars between the first and second panels. In some cases, the storage structures can be constructed or made to order to the end-user's specifications. For an end-user who intends to mount the storage structure horizontally, seven spacer bars as shown in FIG. 10 may be permanently welded into place between the first and second panels. For an end-user intending to mount the storage structure vertically, six spacer bars as shown in FIG. 11 may be permanently welded into place. Alternatively, the storage structure may be sold as a base unit with optional piece parts that the user can add as needed. The optional piece parts may be removeable or detachable spacer bars such as described in connection with FIGS. 4*a*, 4*b*, 5*a*, and 5*b*. Thus, the base unit may be a storage structure with a first and second panel, connected by exactly (only) four spacer bars, each permanently attached at the corners of the panels. The user then has the freedom to add more spacer bars, for example two more or three more as shown in FIGS. 10 and 11, depending on what orientation (horizontal or vertical) is desired. In still another alternative, the storage structure may be sold as a pair of open frame panels unconnected to each other (with no permanently attached spacer bars), but with detachable spacer bars. The user can then attach the spacer bars himself or herself at some or all of the corners and at other locations as desired. Such an approach has certain advantages in terms of shipping, ordering, and inventory.

Figure 12A:
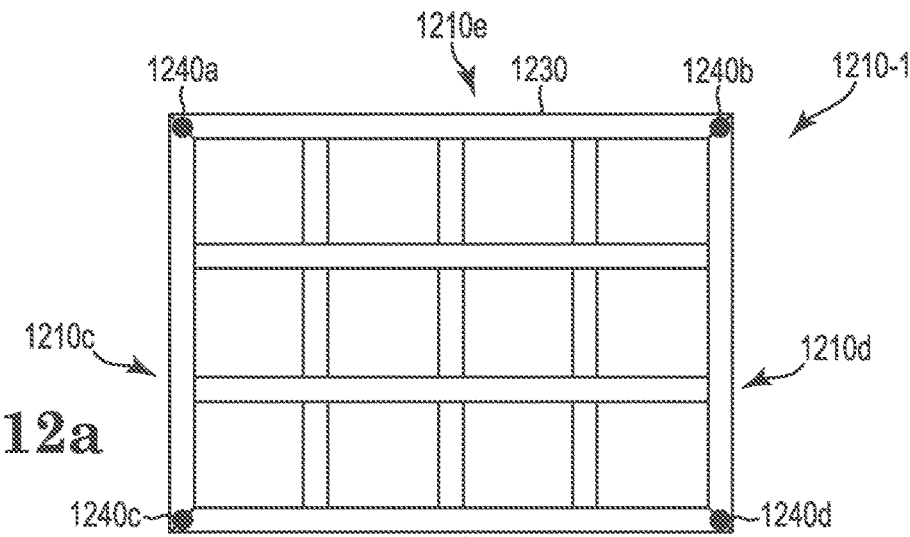
FIGS. 12a, 12b, and 12c are schematic front views of storage structures having different configurations of spacer bars.
Figure 12B:
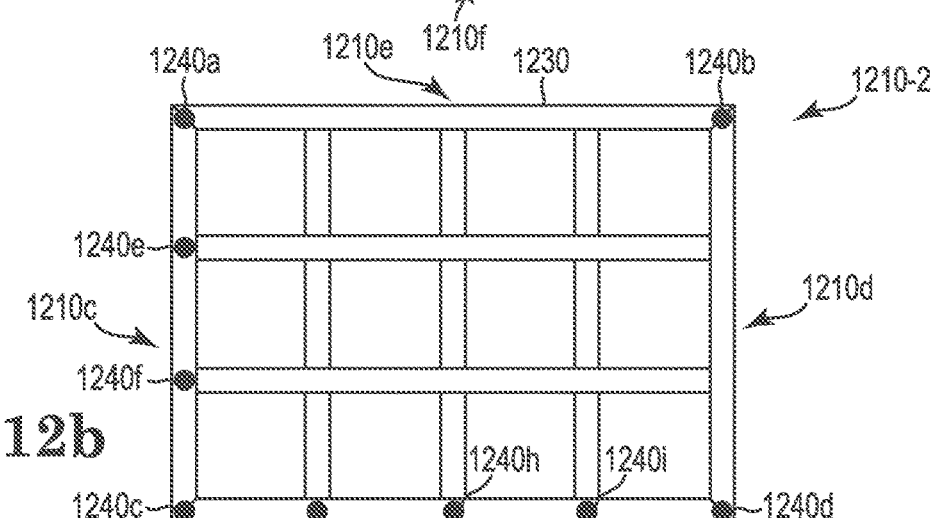
Figure 12C:
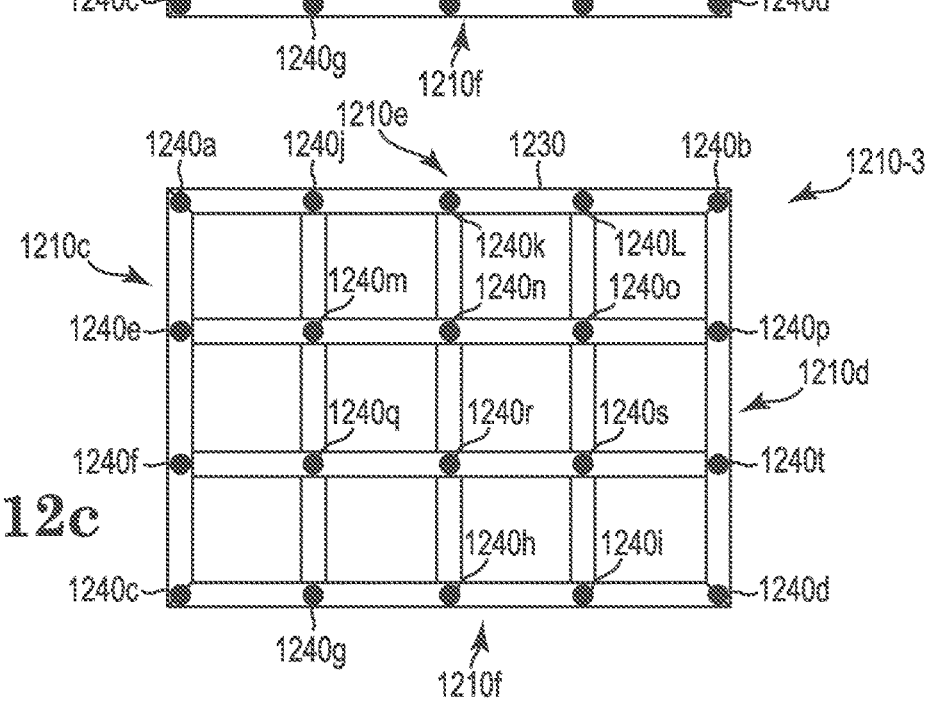

FIGS. 12*a*, 12*b*, and 12*c* illustrate a few of the many other possible configurations of spacer bars. Like reference numbers designate like elements. The figures depict the front view of a storage structure, it being understood that only the front (second) open frame panel is visible, and the spacer bars are only shown schematically by solid black dots.

FIG. 12*a* shows the simple case of a storage structure 1210-1 having spacer bars only at the four corners of the panels. The front or second panel 1230 is shown, and can be the same as or similar to other open frame panels discussed herein. Four spacer bars 1240*a*, 1240*b*, 1240*c*, 1240*d*, which may be permanent or detachable, fixed length or extensible, are provided at the corners of the panels. None of the side faces 1210*c*, 1210*d*, 1210*e*, 1210*f* of the interior storage space or the storage structure 1210-1 are obstructed or blocked by any spacer bars between the corners. Of course, in order for large format goods to be stored or held in the storage structure, they would need to be large enough or long enough to rest on or across the spacer bars at two opposed corners, e.g., spacer bars 1240*c*, 1240*d* if the storage structure is mounted horizontally, or spacer bars 1240*a*, 1240*c* if mounted vertically.

In FIG. 12*b*, a storage structure 1210-2 has spacer bars at the four corners, but also has spacer bars along only one of the major outer rails (between the corners), and along only one of the minor outer rails (between the corners). Thus, the spacer bars of FIG. 12*a* are maintained, and more spacer bars 1240*e*, 1240*f* are then added along the minor outer rail at side face 1210*c*, and spacer bars 1240*g*, 1240*h*, 1240*i* are added along the major outer rail at side face 1210*f*. Side faces 1210*c* and 1210*f* are therefore blocked or obstructed by spacer bars, but side faces 1210*d*, 1210*e* are not. This arrangement of spacer bars is noteworthy. It leaves one of the side faces unobstructed, thus capable of loading large panel-type goods through it, for each of the two orthogonal mounting orientations (horizontal and vertical) of the storage structure. And for each of those two orientations, it provides a regularly spaced, orderly arrangement of spacer bars between the corners to support the weight of the loaded goods in a distributed fashion. In a horizontal orientation, large format goods can be loaded into (unobstructed) side face 1210*d* and then be supported in a distributed fashion along (obstructed) side face 1210*f*. In a vertical orientation, large format goods can be loaded into (unobstructed) side face 1210*e* and then be supported in a distributed fashion along (obstructed) side face 1210*c*. The large format goods in these cases need only be large enough or long enough to rest on or across two adjacent spacer bars, e.g., spacer bars 1240*g*, 1240*h*, whose spacing is sp, or spacer bars 1240*e*, 1240*f*, whose spacing is SP.

In FIG. 12*c*, a storage structure 1210-3 has spacer bars at the four corners, as well as the additional spacer bars described in connection with FIG. 12*b*, but then also adds even more spacer bars: (1) a group or series along each of the previously unobstructed outer rails (spacer bars 1240*j*, 1240*k*, 1240L along the upper major outer rail, and spacer bars 1240*p*, 1240*t* along the left minor outer rail), and (2) one spacer bar at each intersection point of the major inner rails with the minor inner rails (spacer bars 1240*q*, 1240*r*, 1240*s*, 1240*m*, 1240*n*, 1240*o*). Unlike the embodiments of FIGS. 12*a* and 12*b*, the storage structure 1210-3 provides an interior storage space that is itself obstructed, and therefore not capable of storing panel-type goods such as sheets of plywood, which are long or extended not just in one direction (as with board-type goods) but in two orthogonal directions. Nevertheless, the storage structure 1210-3 is still fully capable of storing board-type goods, and it can store such goods in separate portions (sub-spaces) of the interior storage space, unlike the fully unobstructed interior storage spaces of FIGS. 12*a* and 12*b*. The large format (e.g. board-type) goods that can be stored in the storage structure 1210-3 need only be large enough or long enough to rest on or across two adjacent spacer bars, e.g., spacer bars 1240*m*, 1240*n*, whose spacing is sp, or spacer bars 1240*n*, 1240*r*, whose spacing is SP.

Figure 13A:
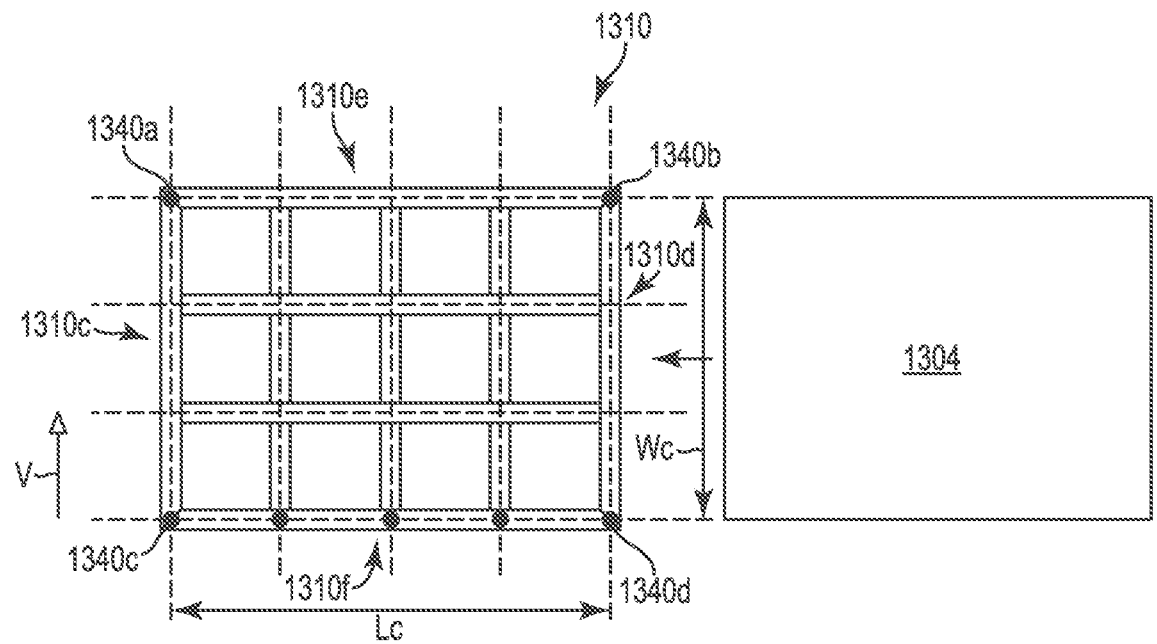
FIGS. 13a and 13b are schematic front views of a storage structure mounted horizontally (13a) and vertically (13b), these figures illustrating a problem encountered when a large format panel has dimensions that are integer multiples of the wall stud spacing.
Figure 13B:
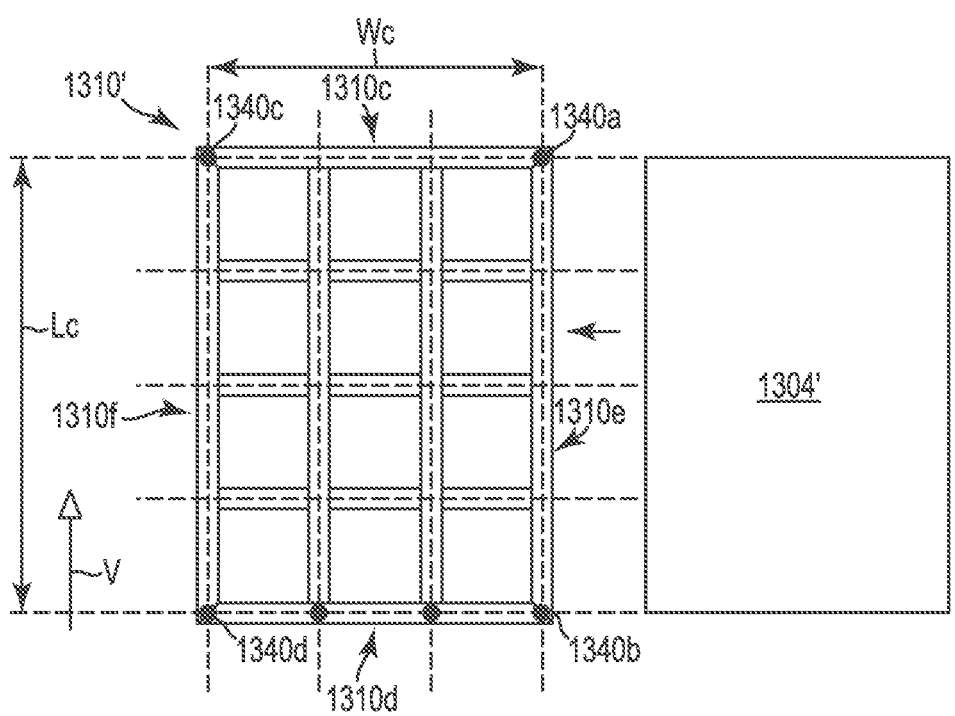

FIGS. 13*a* and 13*b* illustrate a problem encountered when one attempts to load into one of the storage structures a large format 2-dimensional good, such as a panel, whose dimensions are integer multiples of the wall stud spacing. This may happen, for example, for certain plywood or particle board sheets. In the United States, such sheets are commonly sold in units that are nominally 96 inches long and 48 inches wide. The aspect ratio of such sheets is nominally 2:1. Considering that a common wall stud spacing in the United States is 16 inches, the plywood sheet thus has a length equal to the stud spacing times the integer number 6, and a width equal to the stud spacing times the integer number 3.

In FIG. 13*a*, a storage structure 1310 is mounted horizontally on a wall as described elsewhere herein. The storage structure has side faces 1310*c*, 1310*d*, 1310*e*, 1310*f* as shown, The side face 1310*f* is obstructed with spacer bars distributed along the lower major outer rail between the corners, but the other outer rails are not so obstructed. The storage structure 1310 is in this regard the same as or similar to storage structure 1010 of FIG. 10. The major and minor rails of the structure 1310 are assumed to have the same width, and the center-to-center spacings SP, SP', sp, and sp' (refer e.g. to FIG. 6) are assumed to be equal to each other and to the wall stud spacing. Thus, the center-to-center width of the first and second panels of the storage structure 1310, Wc, is an integer number times the stud spacing, and the center-to-center length of those panels, Lc, is also an integer number times the stud spacing. (In the embodiment shown, Wc is 3 times the stud spacing, and Lc is 6 times the stud spacing.) In FIG. 13*a*, a user is trying to insert a large format panel-type good 1304 into the interior storage space of the storage structure through the unobstructed side face 1310*d*, the good 1304 also having the transverse dimensions Wc and Lc. The spacer bars 1340*b*, 1340*d* located at the corners of that side face are assumed to be located at the intersections of the center lines of the left minor outer rail with those of the two major outer rails. In reality, the spacer bars are not infinitesimally thin, but have a finite, reasonable lateral dimension or width (e.g., at least about 0.75 inch up to about 1.5 inches). This has the effect of diminishing the gap between the spacer bars 1340*b*, 1340*d* to a value slightly less than Wc. Since the gap through which the good 1304 is trying to pass is slightly less than the relevant dimension of the good, the good 1304 is not able to fit into the storage structure 1310.

The same thing happens when we rotate the storage structure to mount it in a vertical orientation, as shown in FIG. 13*b*. Due to the 90 degree rotation, we refer to the storage structure as 1310', but otherwise it is the same as the storage structure 1310 of FIG. 13*a*. The large format panel-type good is also the same as in FIG. 13*a*, but is labeled with a prime (1304') as an indication of its new orientation. In FIG. 13*b*, a user is trying to insert the good 1304' into the interior storage space of the storage structure through the unobstructed side face 1310*e*. The spacer bars 1340*a*, 1340*b* located at the corners of that side face are assumed to be located at the intersections of the center lines of the left minor outer rail with those of the two major outer rails.

In reality, the spacer bars are not infinitesimally thin, but have a finite, reasonable lateral dimension or width (e.g., at least about 0.75 inch up to about 1.5 inches). This has the effect of diminishing the gap between the spacer bars 1340*a*, 1340*b* to a value slightly less than Lc. Since the gap through which the good 1304' is trying to pass is slightly less than the relevant dimension of the good, the good 1304' is not able to fit into the storage structure 1310.

Figure 14:
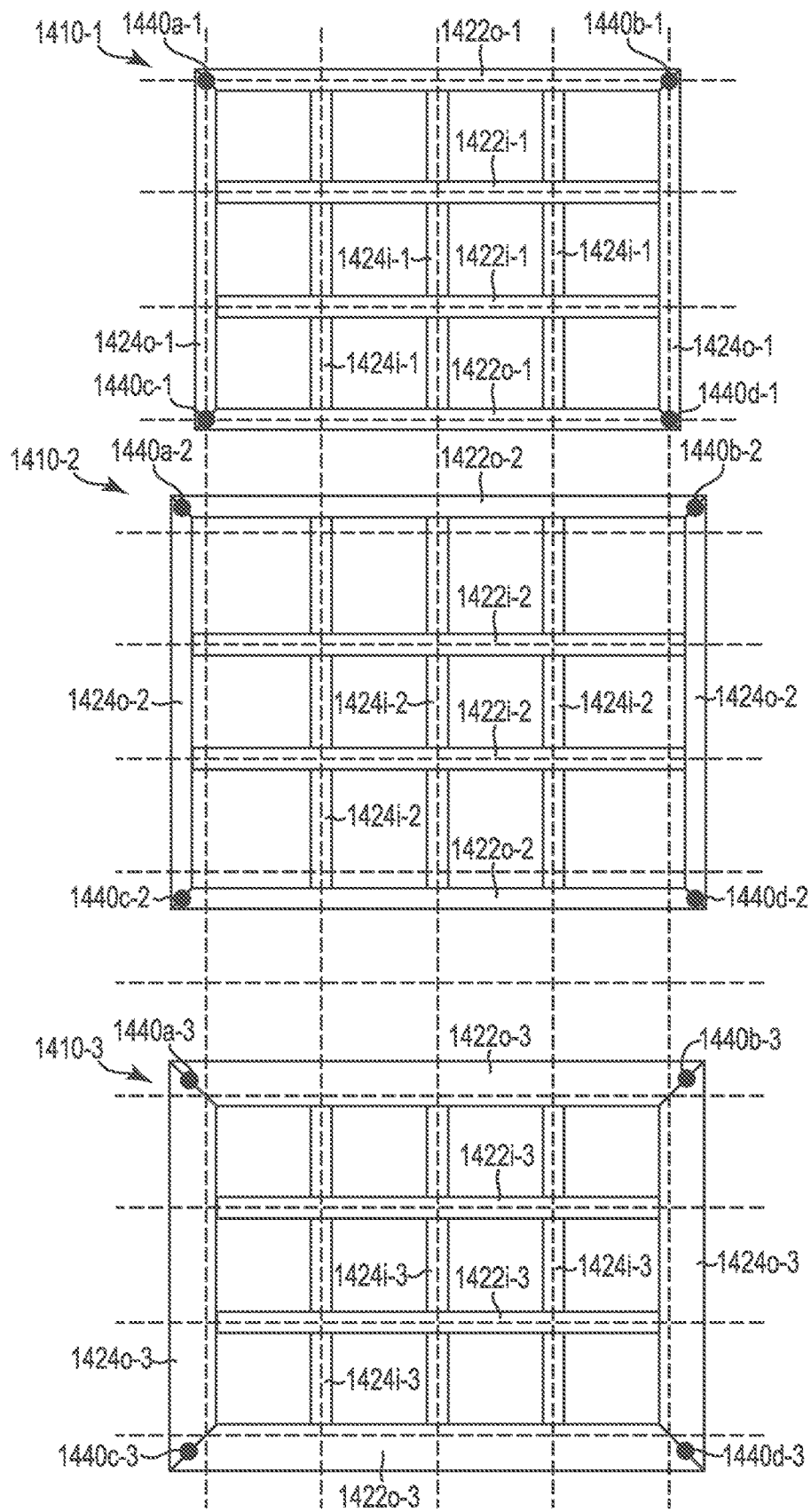
FIG. 14 is a schematic front view of three storage structures, one having a design similar to that of FIG. 13a, and two storage structures that incorporate features that overcome the problems illustrated in FIGS. 13a, 13b.

The embodiments shown in FIG. 14 are used to illustrate different ways the problem discussed in connection with FIGS. 13*a*, 13*b* can be addressed. A series of three separate storage structures are shown in FIG. 14, all mounted to a same wall that has vertical studs of a specified uniform stud spacing: a first storage structure 1410-1, which may be essentially the same as that of FIG. 13*a*; a second storage structure 1410-2, which addresses the problem by adjusting the placement of the outer rails without adjusting the widths of any of the rails; and a third storage structure 1410-3, which addresses the problem at least in part by increasing the widths of the outer rails. For ease of illustration, the storage structures are each shown only with regard to the first open frame panel, which would form the wall-mounted back panel of the storage structure, but the reader will understand that a second panel and other components as taught herein would also be included.

The vertical dashed lines in FIG. 14 represent the center lines of equally spaced vertical wall studs. These also coincide in some cases with the center lines of some of the vertically oriented rails. The horizontal dashed lines in FIG. 14 are provided for reference purposes, but have a uniform spacing equal to that of the dashed vertical lines.

Thus, the storage structure 1410-1 has rails for which SP, SP', sp, and sp' are all the same, equal to the stud spacing, and for which WDo, WDi, wdo, and wdi are all the same (refer to FIG. 6). The first panel of the storage structure has major rails 1422 and minor rails 1424, the major rails including major outer rails 1422*o*-1 and major inner rails 1422*i*-1, and the minor rails including minor outer rails 1424*o*-1 and minor inner rails 1422*i*-1. Four spacer bars 1440*a*-1, 1440*b*-1, 1440*c*-1, and 1440*d*-1 are provided at or near the four corners of the panel, in similar fashion to the storage structure 1310 of FIG. 13*a*. Thus, a large format 2-dimensional good such as a panel whose dimensions are an integer multiple of the wall stud spacing can pose a problem with regard to being able to fit through the gap formed between the spacer bars at the corners of the panel.

We address the problem of the integer-multiple-large-format good by making modifications that have the effect of moving the four spacer bars at the corners outward a relatively small amount—much less than the distance represented by the stud spacing—and just enough to allow the integer-multiple-large-format good to fit through the gap between the spacer bars. But we make these modifications preferably while making few or no changes to the relevant features of the inner rails, both major and minor.

Turning our attention then to the storage structure 1410-2, we see by comparison to the dashed reference lines that the modifications embodied by this structure have successfully moved or shifted the corner spacer bars (1440*a*-2, 1440*b*-2,

1440*c*-2, 1440*d*-2) outward or apart such that the integer-multiple-large-format good can now easily fit through or into both the minor side face(s) and the major side face(s). We achieve this by slightly lengthening all of the rails, but without changing the center-to-center positions of the major inner rails or the minor inner rails, and without changing the width of any of the rails. Thus, minor inner rails 1424*i*-2 have the same spacing (sp) as, but are slightly longer than, the minor inner rails 1424*i*-1. Major inner rails 1422*i*-2 have the same spacing (SP) as, but are slightly longer than, the major inner rails 1422*i*-1. We have increased the spacing between each of the outer rails and its nearest neighbor inner rail parallel to it. Thus, the spacing SP' between each major outer rail 1422*o*-2 and its nearest neighbor major inner rail 1422*i*-2 is now greater than SP. Likewise, the spacing sp' between each minor outer rail 1424*o*-2 and its nearest neighbor minor inner rail 1424*i*-2 is now greater than sp. When so modified, the major inner rails and minor inner rails will still fall into alignment with the center lines of the wall studs, and thus can still be used to anchor the frame and storage structure firmly to the wall via screws or other suitable means. The four outer rails of the storage structure 1410-2 will now no longer fall into alignment with the center lines of the wall studs (in either the horizontal or vertical orientation), and thus cannot be used directly to anchor the storage structure to the wall studs.

In the storage structure 1410-3, we are able to move or shift the corner spacer bars (1440*a*-3, 1440*b*-3, 1440*c*-3, 1440*d*-3) outward enough so that the integer-multiple-large-format good can now easily fit through or into both the minor side face(s) and the major side face(s), but without sacrificing the ability to use the outer rails of the first panel as anchor points to the wall studs. We achieve this by widening the four outer rails relative to the inner rails, without changing the center-to-center positions of the major inner rails or the minor inner rails. The minor inner rails 1424*i*-3 have the same spacing (sp) as (and may be the same length as, or could be longer than) the minor inner rails 1424*i*-1. Major inner rails 1422*i*-3 have the same spacing (SP) as (and may be the same length as, or could be longer than) the major inner rails 1422*i*-1.

The widths of the outer rails, WDo and wdo, have been increased relative to the inner rail widths, WDi and wdi. By increasing the width, we also shift the center lines for those rails, even in cases where the inner edges of the outer rails 1424*o*-3, 1422*o*-3 are in the same places as the inner edges of the outer rails 14240-1, 1422*o*-1 of the storage structure 1410-1. Thus, the spacing SP' between each major outer rail 1422*o*-3 and its nearest neighbor major inner rail 1422*i*-3 is now greater than SP. Likewise, the spacing sp' between each minor outer rail 1424*o*-3 and its nearest neighbor minor inner rail 1424*i*-3 is now greater than sp. When so modified, the major inner rails and minor inner rails will still fall into alignment with the center lines of the wall studs, and thus can still be used to anchor the frame and storage structure firmly to the wall via screws or other suitable means. The four outer rails of the storage structure 1410-2 will now no longer fall into alignment with the center lines of the wall studs (in either the horizontal or vertical orientation), but they are wide enough so that they overlap those center lines, and thus can also again be used to anchor the storage structure to the wall studs.

In connection with the approaches represented by the storage structures 1410-2 and 1410-3, we have seen that the center-to-center spacing SP' between a given major outer rail and its nearest neighbor major inner rail is greater than SP, the center-to-center spacing between adjacent major inner rails. SP' is preferably greater than SP by an amount that is small, but greater than the type of variability associated with manufacturing tolerances. SP' is preferably at least 1.01 times SP. Preferably, the ratio of SP'/SP is in a range from 1.01 to 1.2, or from 1.04 to 1.1, or is about 1.07. Similarly, the center-to-center spacing sp' between a given minor outer rail and its nearest neighbor minor inner rail is greater than sp, the center-to-center spacing between adjacent minor inner rails. sp' is preferably greater than sp by an amount that is small, but greater than the type of variability associated with manufacturing tolerances. sp' is preferably at least 1.01 times sp. Preferably, the ratio of sp'/sp is in a range from 1.01 to 1.2, or from 1.04 to 1.1, or is about 1.07. For example, if SP (or sp) is nominally 16 inches, then SP' (or sp') is preferably at least 16.16 inches, or in a range from 16.16 to 19.2 inches, or in a range from 16.64 to 17.6 inches, or is about 17.1 inches.

Figure 15:
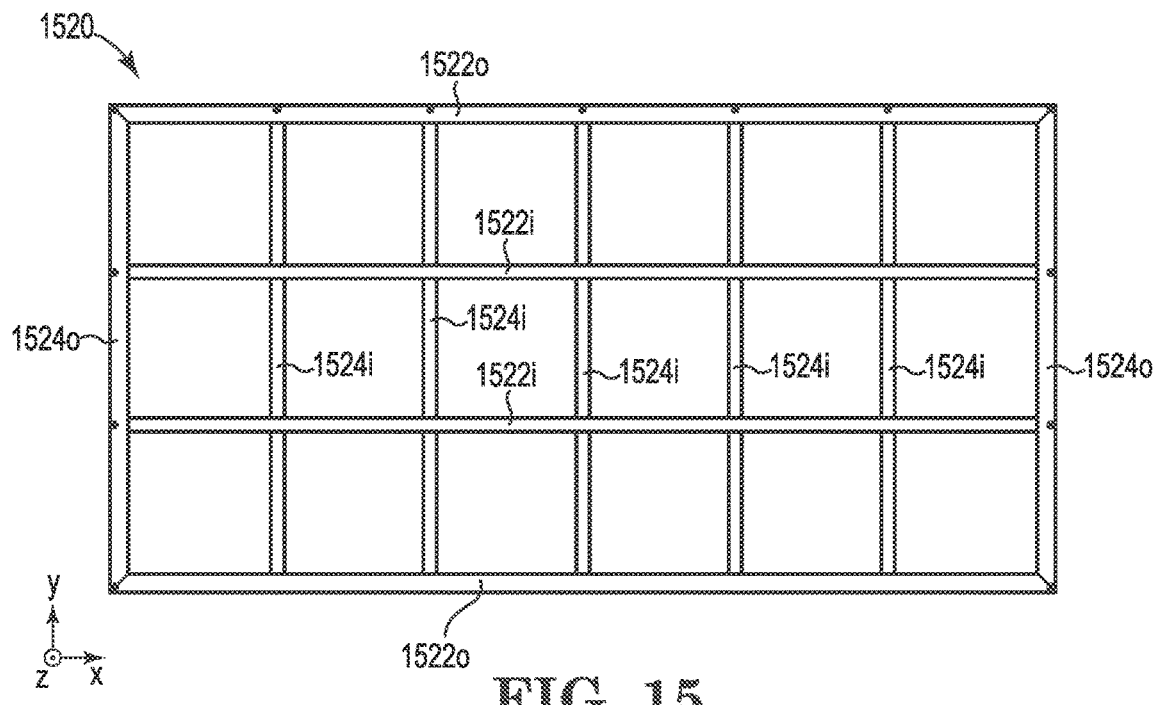
FIG. 15 is a schematic front view of an open frame panel designed for large format goods that have a nominal 2:1 aspect ratio, such as standard plywood sheets sold in the U.S.

Turning next to FIG. 15, we see there a first open frame panel 1520 similar to those discussed above, but where the aspect ratio of the panel has been changed by adding more rows of the equally spaced minor inner rails, and extending the major rails to accommodate the extra rows. In other respects, the panel 1520 may be the same as or similar to the other panels discussed herein. The panel 1520 may be used as either or both the first panel (e.g. to be mounted against a wall) and/or the second panel (e.g. to extend into a room away from the wall) of the storage structures discussed herein. The panel 1520 includes, or may consist essentially of, two groups of rails connected to each other to form a generally rectangular grid. The rails in each group of rails are mutually parallel to each other, but the two groups are oriented perpendicular to each other. Outermost ones of the major rails 1522 are designated major outer rails 1522*o*. Major rails between and parallel to those outer rails are designated major inner rails 1522*i*. Outermost ones of the minor rails 1524 are designated minor outer rails 1524*o*. Minor rails between and parallel to those outer rails are designated minor inner rails 1524*i*.

The embodiment of FIG. 15, with its aspect ratio (length to width) close to 2:1, can be made to be particularly well suited for holding plywood sheets or other large format goods that are sold in sizes with aspect ratios of 2:1. In that regard, the panel 1520 preferably incorporates features such as those discussed in connection with FIG. 14 to ensure the gap between corner spacer bars is large enough to allow such plywood sheets or the like to be inserted into or through an unobstructed side face of the storage structure. In some embodiments, a panel such as panel 1520 may have an edge-to-edge length (Le, see FIG. 6) of 99.25 inches, and an edge-to-edge width (We, see FIG. 6) of 51.25 inches. An aspect ratio of such a panel, measured in terms of the ratio Le/We, may be in a range from 1.9 to 1.98, or from 1.92 to 1.96, or about 1.94.

Figure 16:
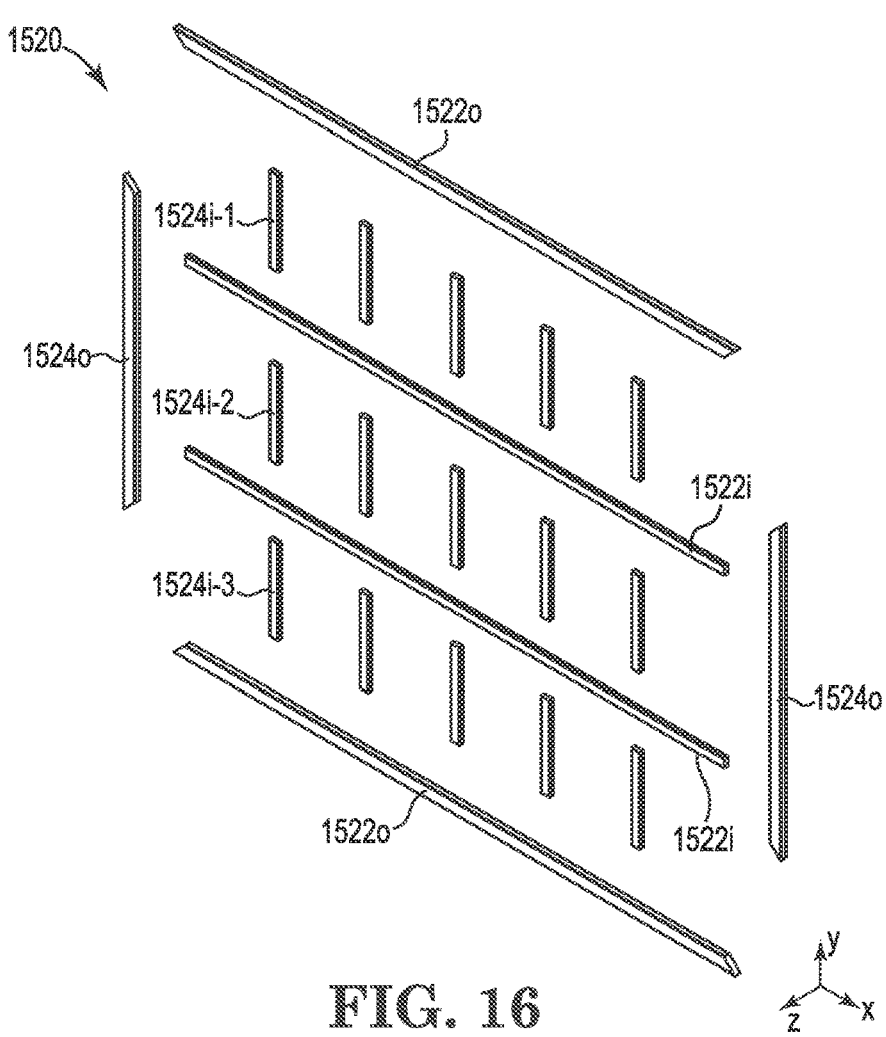
FIG. 16 is a schematic perspective exploded view of the component piece parts that can be combined to produce the panel of FIG. 15.

The various individual piece parts that make up an open frame panel such as that of FIG. are shown in the exploded view of FIG. 16. If made of metal, these piece parts are desirably welded together to form a finished panel. In some cases, the piece parts may be sold in a kit that an end user may put together himself or herself Such a kit may, in general, include first rails including at least four first major rails and two first minor rails, the first major rails being longer than the first minor rails, the first rails also including first minor sub-rails each of which is less than half as long as each of the first minor rails. The first rails may be connectable into a first generally rectangular open frame panel in which two of the first major rails are first major outer rails and at least two of the first major rails are first major inner rails disposed between and parallel to the first major outer rails. The two first minor rails may be first minor outer rails, and the first minor sub-rails may be connectable between the first major rails to form first minor inner rails extending between the first major outer rails. The first minor sub-rails may include a first group of minor sub-rails each having a first length and a second group of minor sub-rails each having a second length greater than the first length but shorter than each of the two first minor rails.

Figure 17:
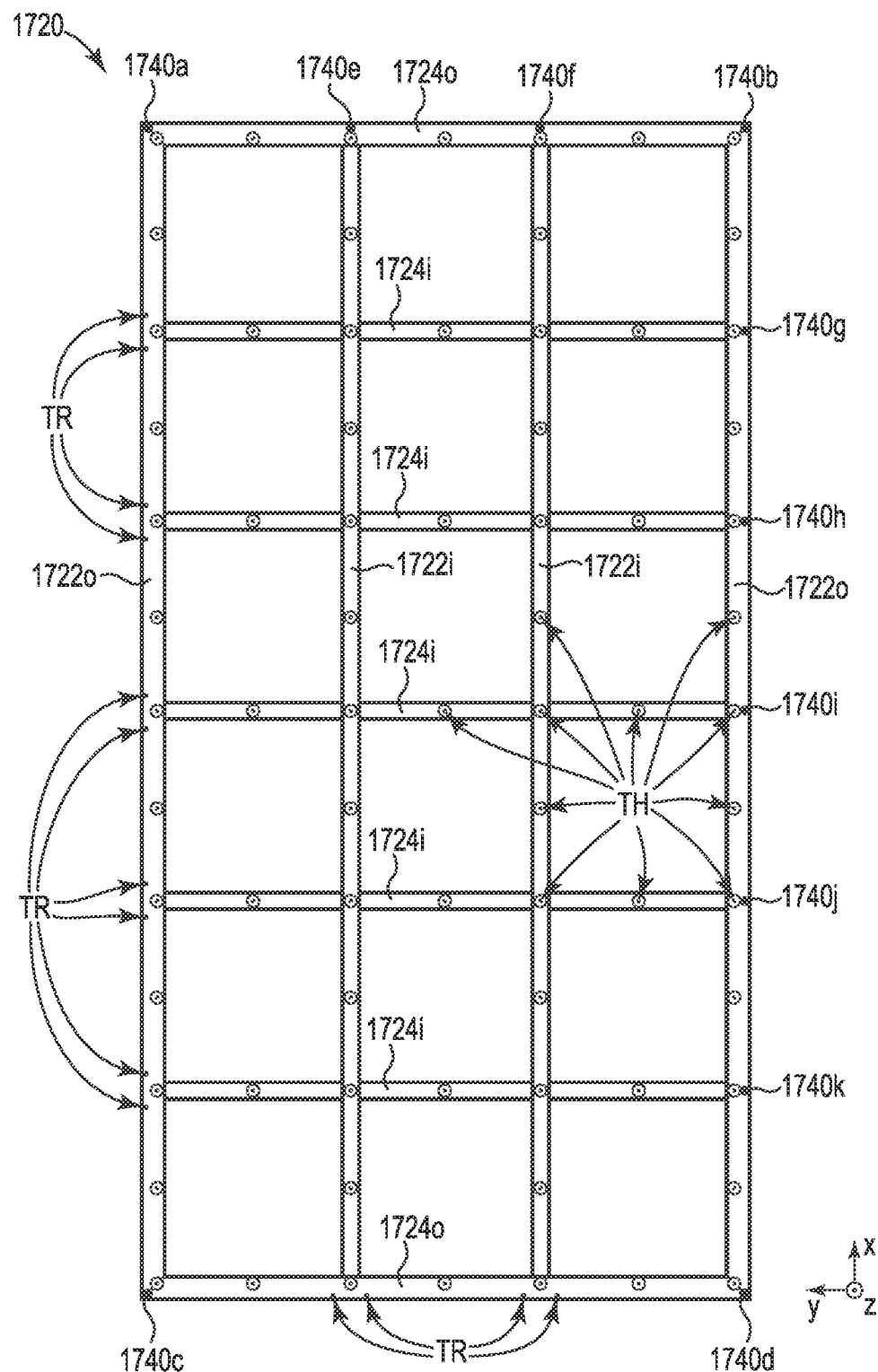
FIG. 17 is a schematic front view of an open frame panel similar to that of FIG. 15, the figure also showing hole patterns and spacer bar positions for such a panel.

An open frame panel 1720 that may be the same as or similar to the panel of FIG. 15 is shown schematically in FIG. 17. The view of FIG. 17 shows additional detail, in particular, hole patterns that may be used when the panel 1720 is used as the first panel, to be mounted directly to a wall.

Similar to the other panels described herein, the panel 1720 includes major rails 1722, including two major outer rails 1722o and a plurality of major inner rails 1722i. The panel 1720 also includes inner rails 1724, including two minor outer rails 1724o and a plurality of minor inner rails 1724i. The outer rails may be slightly wider than the inner rails, and/or may be spaced apart from their nearest neighbor by an amount SP' or sp' that is greater than the spacings SP or sp, respectively, as discussed above.

Suitable through holes TH may be provided in an orderly arrangement along some or all of the rails, as shown. In the figure, the through holes TH are indicated by a small, thin circle surrounding each hole. These circles are included in the figure only for identification purposes, and are not indicative of any actual physical feature. The through holes TH may be the same or similar to the through holes TH of FIG. 7, and may be present in the panel 1720 for the same purpose: to receive mounting screws or the like for firm attachment to wall studs or similar anchor points. If the center-to-center spacing of the major inner rails, SP, and the center-to-center spacing of the minor inner rails, sp, are equal to each other and to an expected wall stud spacing, the through holes TH may be provided in a uniform grid wherein the center-to-center spacing of the through holes along a given inner rail is SP/2, and the spacing of the through holes TH along each of the four outer rails is also SP/2. In the case of a panel 1720 designed for a 16 inch stud spacing, this places the through holes TH at the intersections of a uniform mesh or grid of 8 inch squares, except for such intersection points that fall within the apertures or gaps between rails.

The panel 1720 can also be seen to have four spacer bars 1740a, 1740b, 1740c, 1740d located at the corners of the panel, and additional spacer bars 1740e through 1740k located along one of the minor outer rails 1724o and along one of the major outer rails 1722o. This is analogous to the spacer bar arrangement described in FIG. 12b, and therefore needs no further explanation here.

The panel 1720 is also provided with pairs of adjacent threaded holes, which we label TR because they may be or comprise threaded rivets, rivet nuts, or the like. A threaded rivet is a well-known component used for fastening, that can be embedded into a hollow tube, pipe, or other suitable host member to provide a firm, reliable threaded anchor point. The pairs of threaded holes TR are located at positions where a detachable spacer bar, such as those shown in FIGS. 4a through 5b, can be mounted. Attachment can be accomplished at two points for each flange, using (removeable) bolts that pass through the through-holes (445 in FIG. 4a, 545 in FIG. 5a) and engage with the threaded holes TR. In contrast to the detachable spacer bars, the spacer bars 1740a through 1740k may be permanently welded in place. To maximize the size of the useable interior storage space and the gaps between corner spacer bars, the spacer bars are preferably located closer to the outer edge than to the inner edge of a given outer rail, or as close to the outer edge as possible, as shown in FIG. 17.

Figure 18:
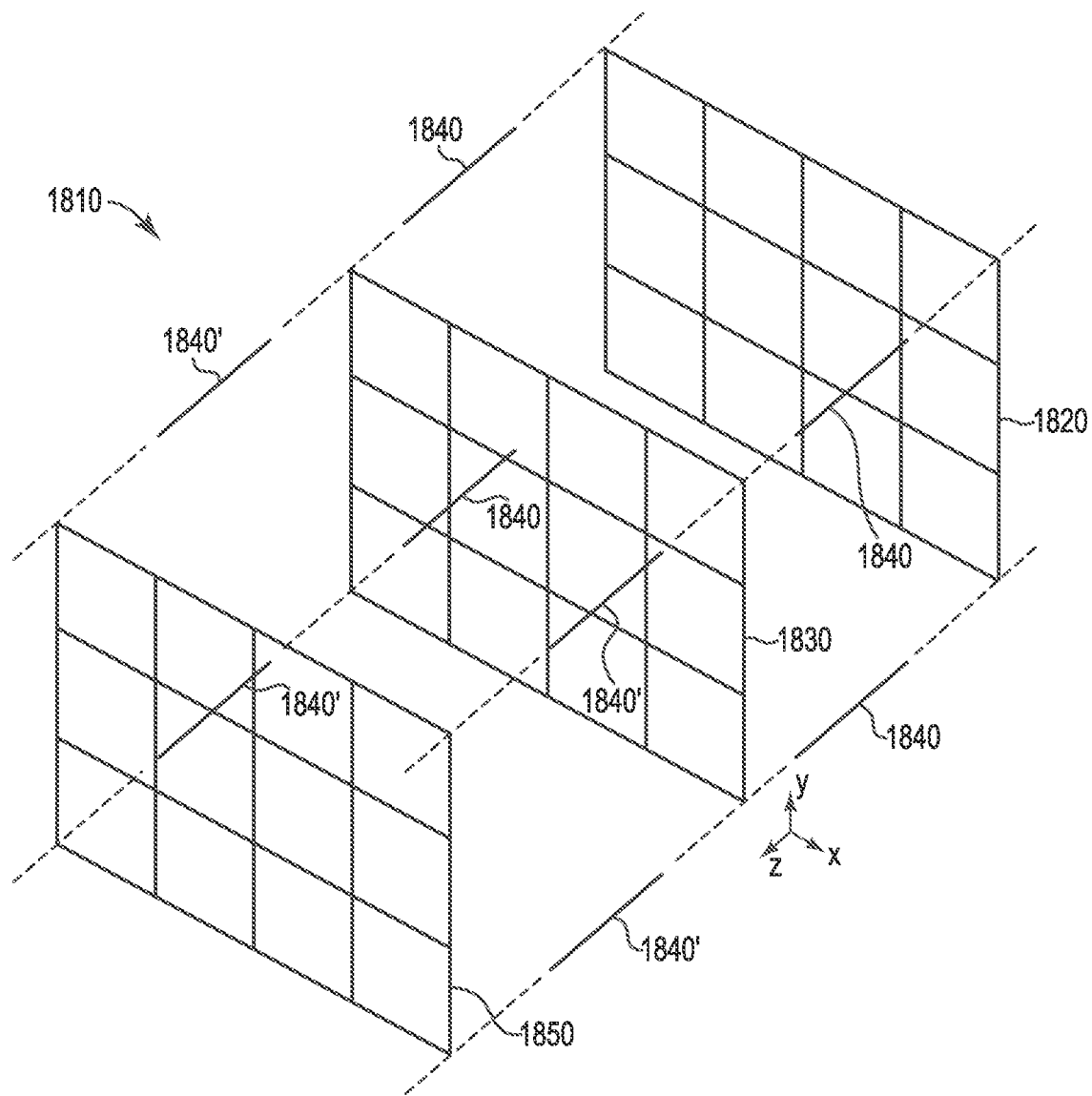
FIG. 18 is a schematic perspective exploded view of a storage structure in which three open frame panels are used to define two adjacent interior storage spaces.

The foregoing features and principles relating to open frame panels, rails, and spacer bars, and so forth, can also be applied to storage structures and systems that employ more than two panels, such as three or more panels stacked together. A three-panel storage structure 1810 is shown in a schematic exploded view in FIG. 18. This is analogous to the exploded view of FIG. 1, and features discussed in connection with that figure are also generally applicable to the three-panel storage structure. In FIG. 18, a first open frame panel 1820, a second open frame panel 1830, and spacer bars 1840 are provided to hold these two panels together to define a first interior storage space therebetween. Additionally, the storage structure 1810 has a third open frame panel 1850, which is attached to the second panel 1830 by spacer bars 1840'. A second interior storage space, adjacent to the first interior storage space, is defined between the second and third panels. The panels 1820, 1830, 1850 are preferably generally rectangular in shape, each one lying in or extending along a reference plane. In the figure, a Cartesian coordinate system x-y-z is provided for reference. Each panel 1820, 1830, 1850 may define a reference plane parallel to the x-y plane. The spacer bars 1840 and 1840' may extend along respective axes that are all parallel to the z-axis. In some embodiments, the three panels may have substantially the same size, shape, and configuration of rails, exclusive of possible differences regarding holes, e.g., the presence or absence of holes, types of holes, differences in hole patterns, etc.

Figure 2:
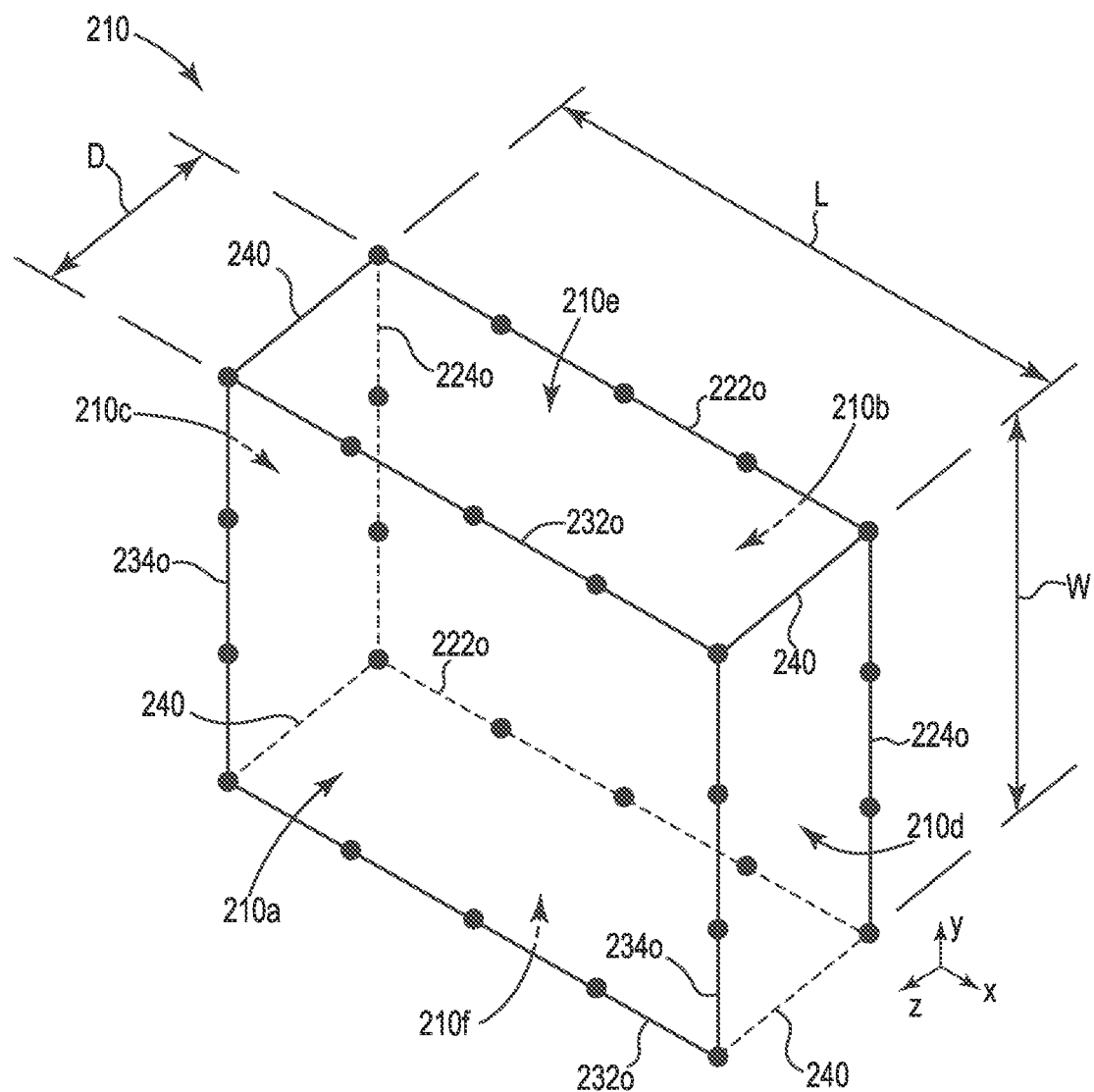
FIG. 2 is a schematic perspective view of an open panel storage structure, or the outer envelope of such structure.
Figure 19:
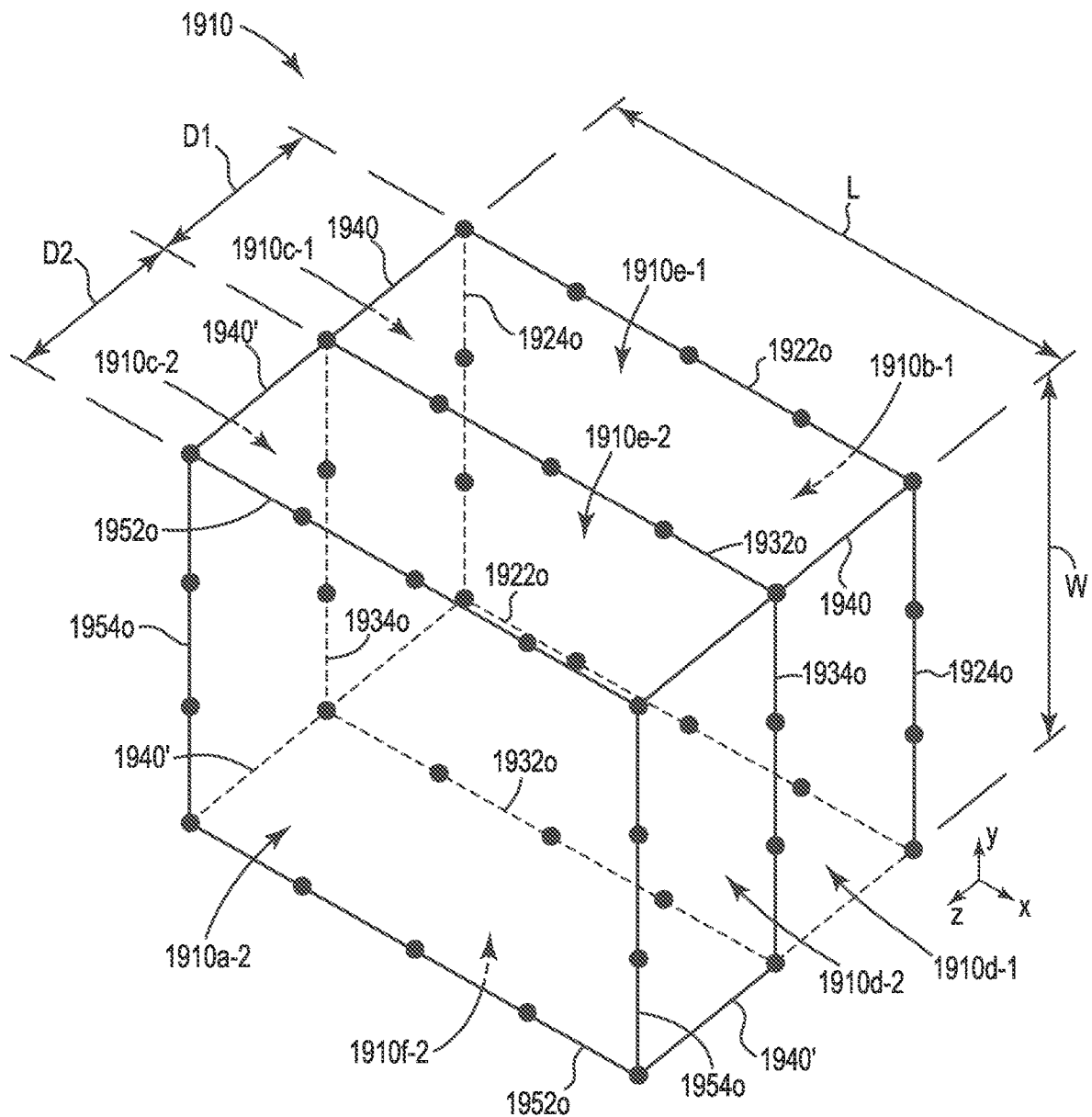
FIG. 19 is a schematic perspective view of an open frame storage structure, or outer envelope of such structure, corresponding to that of FIG. 18.

Just as the three panel embodiment of FIG. 18 is analogous to the two panel embodiment of FIG. 1, FIG. 19 is analogous to FIG. 2.

Thus, when the spacer bars of FIG. 18 are attached at both ends to the respective panels so the panels are firmly connected together, a storage structure 1910 is obtained. The figure shows the storage structure 1910 in a highly schematic fashion, or the outer envelope of such structure. The storage structure 1910 or its outer envelope has the general shape of a rectangular cuboid, since the first, second, and third panels are generally rectangular and the spacer bars extend perpendicular to each panel. The panels each extend parallel to an x-y plane, and are separated from each other along a perpendicular z-direction. The first panel has opposed major outer rails 1922o, 1922o and opposed minor outer rails 1924o, 1924o. The second panel has opposed major outer rails 1932o, 1932o and opposed minor outer rails 1934o, 1934o. Spacer bars 1940 connect the first panel to the second panel by attaching directly to the rails of those panels. The third panel has opposed major outer rails 1952o, 1952o and opposed minor outer rails 1954o, 1954o. Spacer bars 1940' connect the second panel to the third panel by attaching directly to the rails of those panels. For simplicity, the transverse major inner rails and minor inner rails are not shown in the figure, but their points of attachment to the appropriate major outer rails and minor outer rails are represented in the figure with small dark dots.

The rectangular cuboid formed by the storage structure 1910 has six overall faces, but we may distinguish or identify different portions of those faces depending on whether they are associated with the first internal storage space between the first and second panels, or the second internal storage space between the second and third panels. There is a front face 1910a-2, which is both the front face of the entire storage structure 1910 and the front face of the second interior storage space. There is also a rear face 1910*b*-1, which is both a rear face of the entire storage structure 1910 and the rear face of the first interior storage space. There are also four side faces. On the left, we have a side face composed of a first side face 1910*c*-1 and a coplanar second side face 1910*c*-2. On the right, we have a side face composed of a first side face 1910*d*-1 and a coplanar second side face 1910*d*-2. At the top, we have a side face composed of a first side face 1910*e*-1 and a coplanar side face 1910*e*-2. At the bottom, we have a side face composed of a first side face (not labeled, but located at the bottom of the first interior storage space) and a second side face 1910*f*-2. The term "side" in relation to these features should not be meant to imply or require a solid, planar physical surface, since many or most embodiments employ an open frame design wherein a given "side" may be a reference plane defined by the gap or aperture formed between two given outer rails and the outermost spacer bars (at the corners of the panels) that connect them.

The overall dimensions of the storage structure 1510 or its outer envelope are shown as a length L, a width W, and a depth equal to the sum of a first depth D1 and a second depth D2.

These dimensions can be selected as desired to satisfy a given application. However, in order for the storage structure to be suitable for holding at least some kinds of storage materials or other large format materials, L and W are each typically at least about 32 inches, more preferably at least 48 inches, and L is typically greater than W. Each of depths D1 and D2 is typically at least about 6 inches, and preferably at least 10, or 15, or 20 inches.

Figure 20:
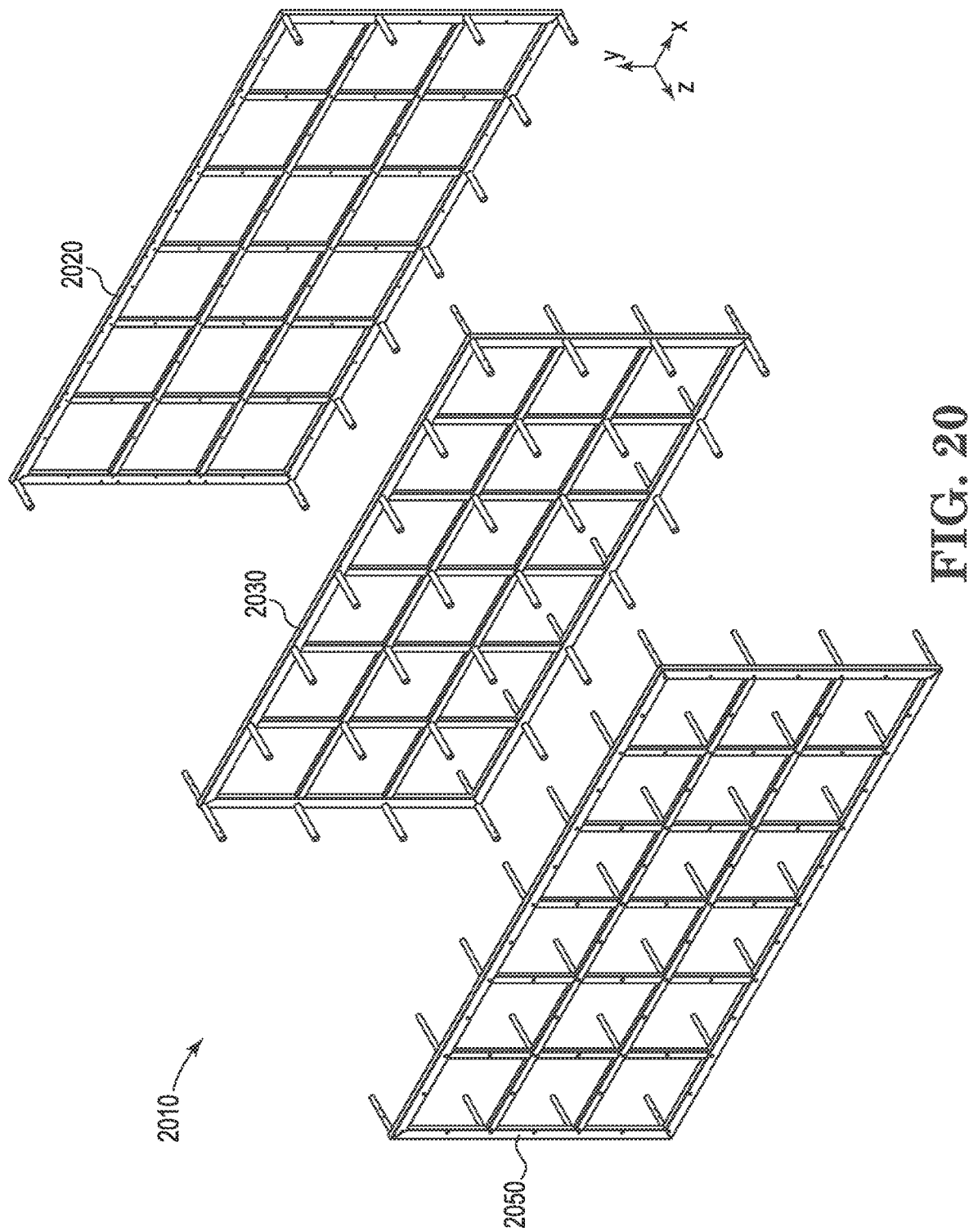
FIG. 20 is a schematic perspective exploded view of a 3-panel storage structure designed for nominal 2:1 aspect ratio large format goods, where extensible spacer bars are used and different configurations of spacer bars are used in the adjacent interior storage spaces.

A schematic perspective exploded view of a 3-panel storage structure 2010 is shown in FIG. 20. The storage structure 2010 uses open frame panels similar to or the same as those of FIGS. 15 through 17, and hence is suitable for the storage of nominal 2:1 aspect ratio large format goods.

Inspection of FIG. 20 reveals several things relating to the spacer bars. First, all of the spacer bars are of the extensible type, in which a small diameter bar welded to one frame slidingly mates with a larger diameter bar welded to another frame at a corresponding location. Second, the configuration or pattern of spacer bars used to connect the first panel 2020 to the second panel 2030 is different from the configuration/pattern of spacer bars used to connect the second panel 2030 to the third panel 2050. The spacer bar pattern used for the first interior storage space (between the first and second panels) is the same as or similar to that shown in FIG. 17, and analogous to the pattern shown in FIG. 12*b*. The spacer bar pattern used for the second interior storage space (between the second and third panels) is analogous to that shown in FIG. 12*c*, i.e., a spacer bar is provided at each intersection point of the various rails. The different spacer bar patterns for the two adjacent storage spaces advantageously allows the storage structure 2010 to be used for two distinct types of large format goods: the first storage space is open and unobstructed between the four corners, and thus suitable for holding large format 2-dimensional good such as plywood sheets or the like, while the second storage space is obstructed and thus more compartmentalized and suited for board-type goods.

Figure 21A:
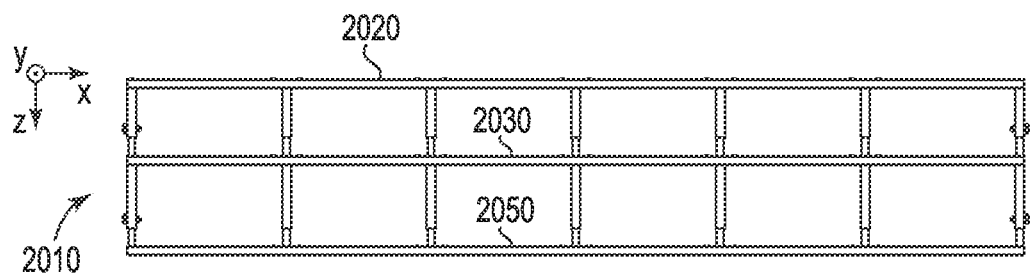
FIG. 21a is a schematic top or plan view.
Figure 21B:
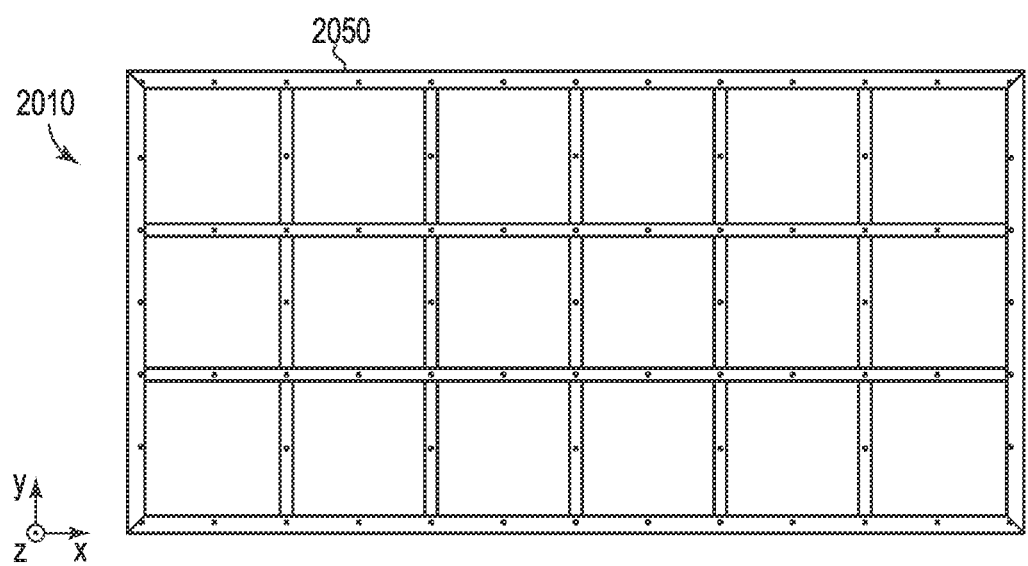
FIG. 21b is a schematic front elevation view.
Figure 21C:
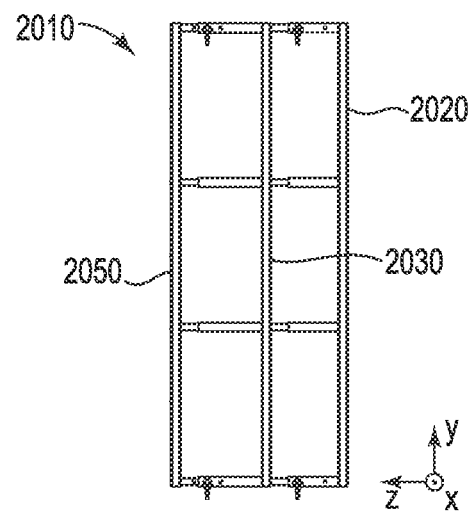
FIG. 21c is a schematic side elevation view of the 3-panel storage structure of FIG. 20.

Schematic top, front, and side views of the storage structure 2010 of FIG. 20 in its assembled configuration are shown in FIGS. 21*a*, 21*b*, and 21*c* respectively. In these figures, like reference numbers relative to FIG. 20 refer to like elements, with no further explanation of those elements being needed. The top view of FIG. 21*a* and the side view of FIG. 21*c* illustrate well the expandable nature of the spacer bars, indicating that the depth dimensions of the two storage spaces can be adjusted independently of each other.

Numerous types of accessories can be used with the disclosed storage structures. One such accessory is shown in connection with FIGS. 22*a* through 23*b*. The accessory is a bracket that is removably attachable (e.g. by threaded bolts) to the frontmost open frame panel of any of the disclosed storage structures. The accessory bracket can be constructed using the same or similar rails as those used to make the open frame panels. The accessory bracket may comprise or consist essentially of two long vertical rails that are connected to each other by a series of shorter, horizontal connecting rails, one at the top, one at the bottom, and one or more equally spaced between the top and bottom short rails. The vertical spacing between the short rails of the accessory bracket is preferably the same as the spacing of the inner rails of the open frame panel to which it attaches.

Figure 22A:
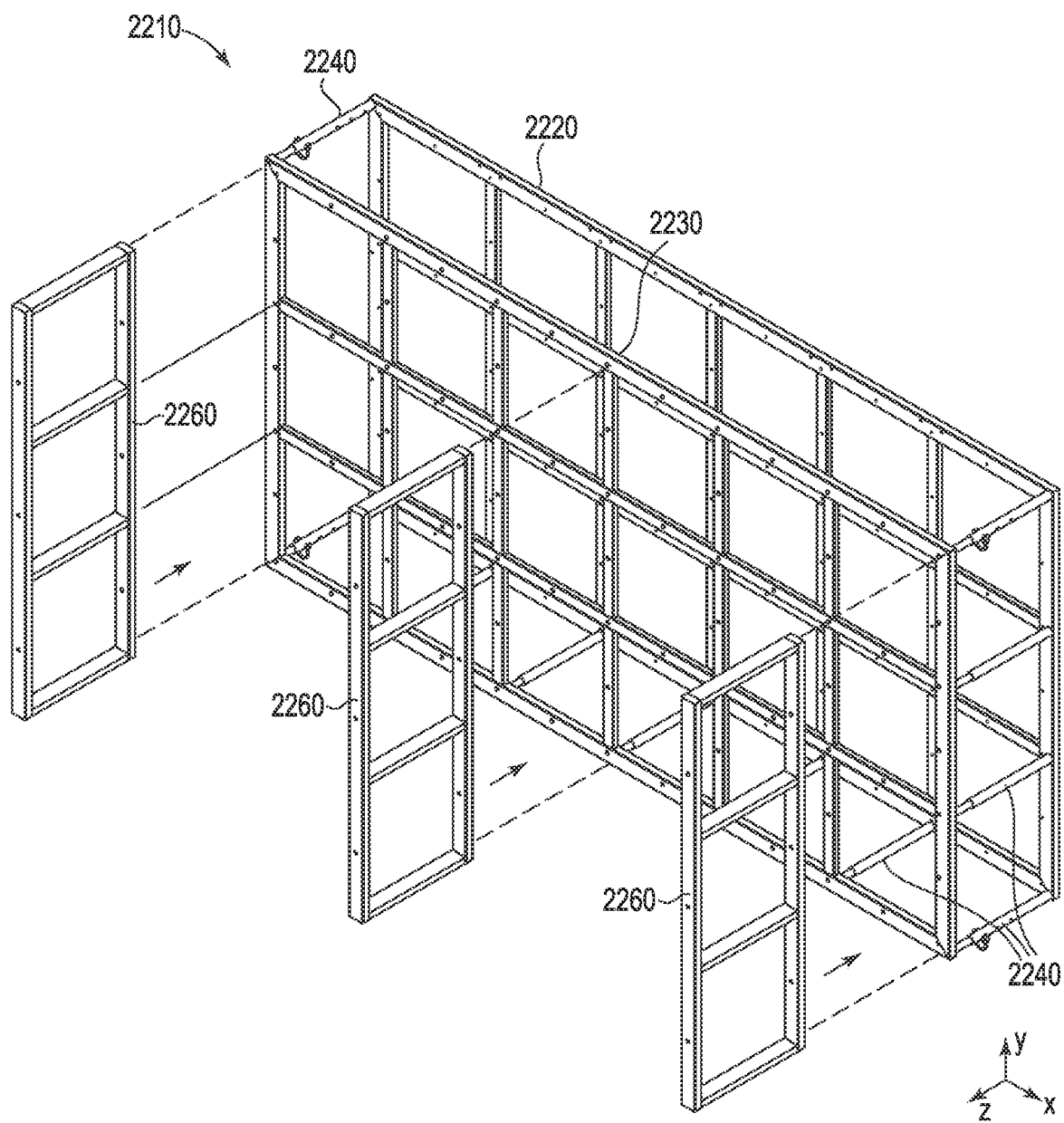
FIG. 22a is a schematic perspective exploded view of a storage system having a storage structure with a nominal 2:1 aspect ratio and several accessory brackets adapted for attachment to the front panel of the storage structure.
Figure 22B:
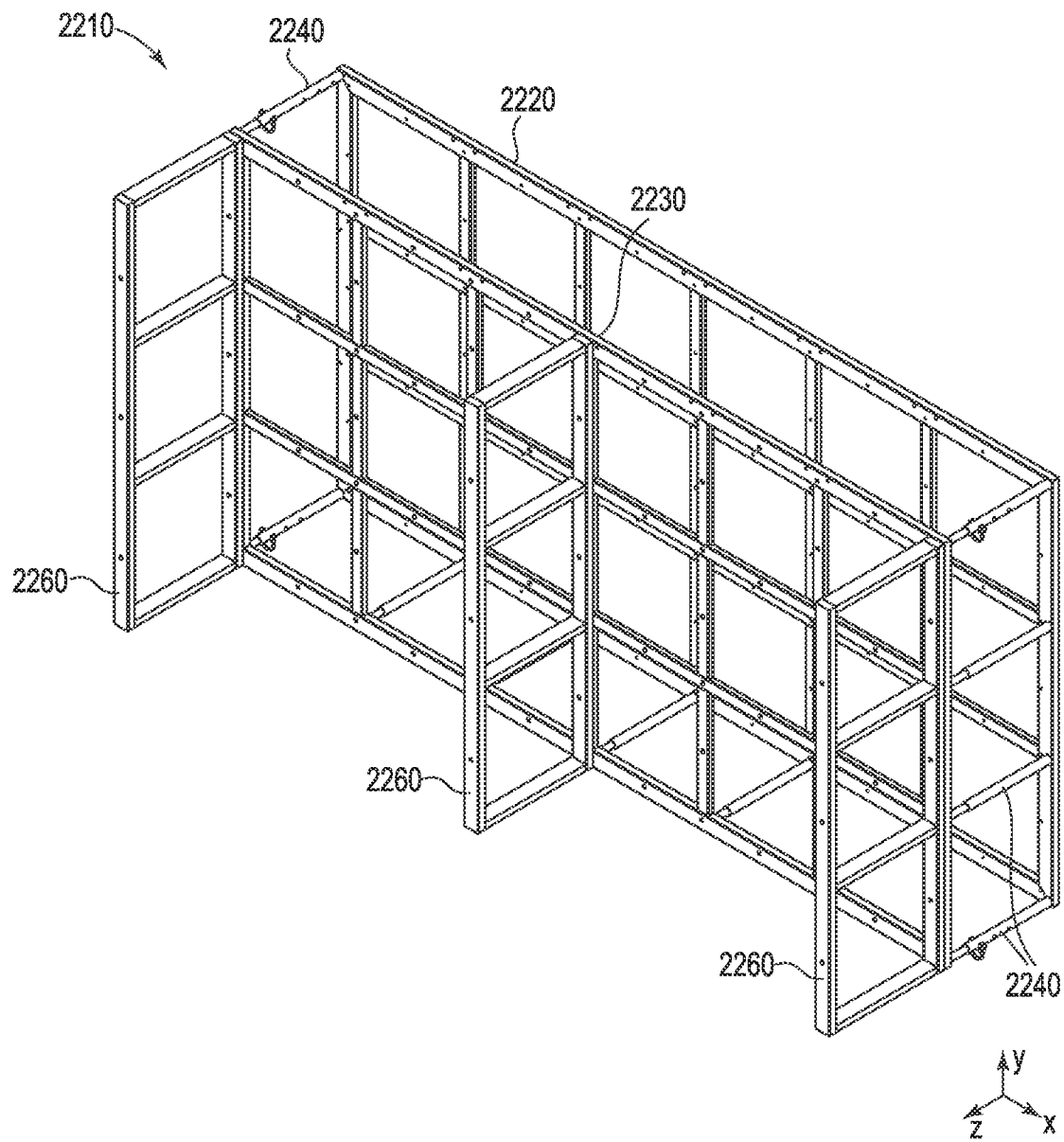
FIG. 22b is a view like that of FIG. 22a but where the accessory brackets have been attached to the storage structure.

Thus, FIG. 22*a* shows a storage system that includes a storage structure 2210 and three accessory brackets 2260. The storage structure includes a first open frame panel 2220, a second open frame panel 2230, and (expandable) spacer bars 2240 connecting the two panels together. Three accessory brackets 2260 are configured to attach to the front face of the front panel (second panel 2230) in a spaced-apart fashion as shown—one at the left end, one at the right end, and one in the middle of the front panel. The brackets 2260 may have through holes formed in the long vertical rail, the through holes positioned to line up with corresponding threaded holes formed in the front face of the front panel, as shown in the figure, so that removeable bolts can be used to affix the brackets to the storage structure. FIG. 22*b* illustrates the storage system after the accessory brackets 2260 have been fastened in place. If desired, a user may add additional elements as desired, such as one or more boards to serve as shelves, such a board extending through the apertures of the accessory brackets and supported by one of the short horizontal rails of each of the brackets.

Figure 23A:
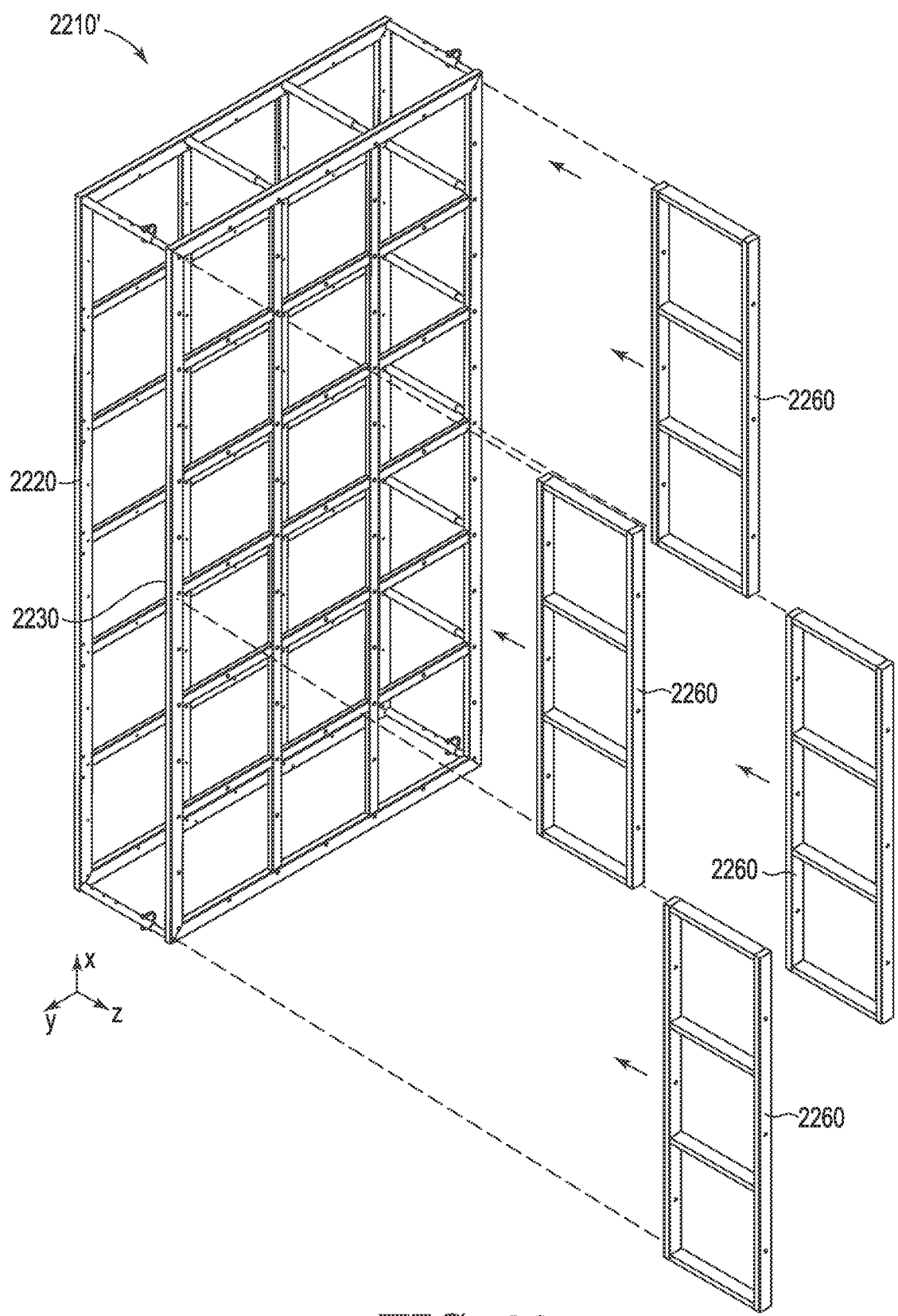
FIG. 23a is a schematic perspective exploded view similar to FIG. 22a but where the storage structure and accessory brackets are oriented in an orthogonal direction.
Figure 23B:
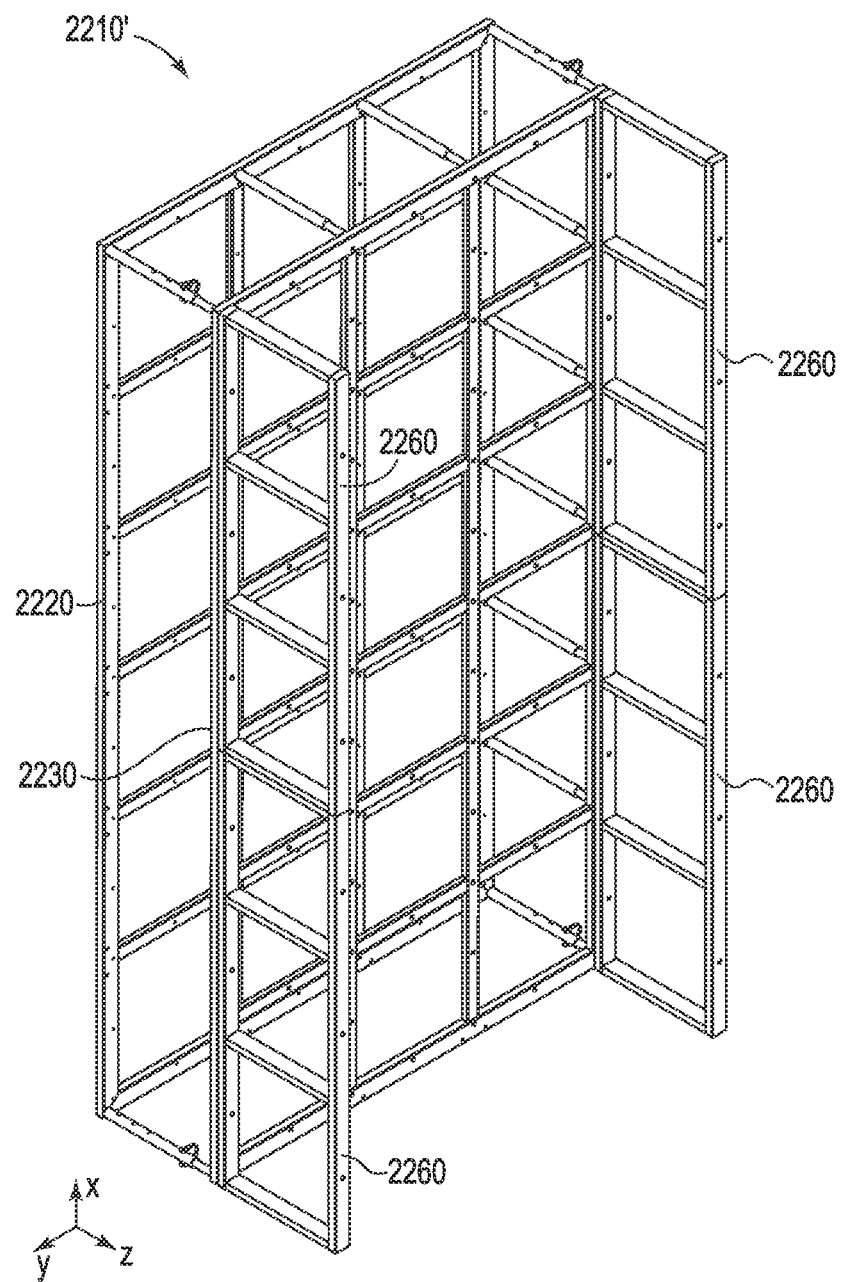
FIG. 23b is a view like that of FIG. 23a but where the accessory brackets have been attached to the storage structure.

Due to the nominal (approximate) 2:1 aspect ratio of the panels used in the storage structure 2210 and the fact that the length of each accessory bracket 2230 is nominally equal to the width (short dimension) of the panels, the accessory brackets 2230 can be combined in pairs to extend the full length of the storage structure when the storage structure is mounted in a vertical position, as shown in FIG. 23*a*. There, the storage structure is labeled with a prime (2210') due to its rotation relative to FIG. 22*a*, but otherwise it is identical to storage structure 2210. As shown in the figure, pairs of the brackets 2230 can be stacked one atop the other such that they extend the full length of the front panel of the storage structure. FIG. 23*b* illustrates the storage system after the accessory brackets 2260 have been fastened in place. One or more boards can be added to serve as shelves, such a board extending through the apertures of the accessory brackets and supported by one of the short horizontal rails of each of the brackets.

Figure 24A:
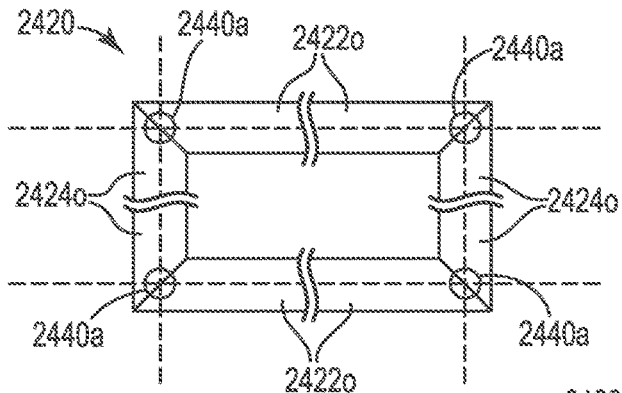
FIGS. 24a-d are schematic front elevation views of an open frame panel showing different configurations for the placement and orientation of spacer bars at the corners of the panel.

Some details of the placement of spacer bars at the corners of a panel, where the major outer rails meet the minor outer rails, are discussed in connection with FIGS. 24*a* through 24*d*. In FIG. 24*a*, an open frame panel 2420 is shown in a truncated manner so that we can focus our attention on the four corners of the panel. The corners occur where the major outer rails 2422*o* meet the minor outer rails 2424*o*. Typically, but not necessarily, the rail ends are cut at a 45 degree angle to produce 45 degree corners, and welded together. Dashed lines in the FIG. represent the center lines of each rail. In FIG. 24*a*, four spacer bars 2440*a* are provided at the four corners, one at each corner. Each spacer bar 2440*a*, which is assumed to have a circular cross-sectional shape, is centered with regard to the center lines of each of the two intersecting rails, hence the central axis of the spacer bar passes through the point of intersection of the two center lines.

Figure 24B:
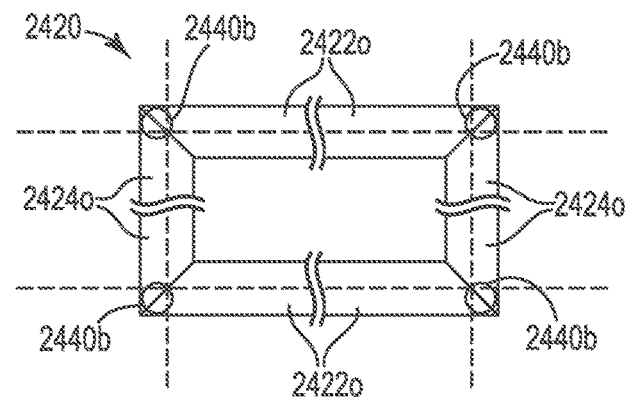

In order to widen the gap between any two spacer bars (e.g. in order to fit a large plywood sheet through a side face of the storage structure), we can position the spacer bars closer to the outer edges of the outer rails, as shown in FIG. 24*b*. The spacer bars 2440*b* shown in that figure may be the same as the spacer bars 2440*a*, except for their placement on the panel.

Figure 24C:
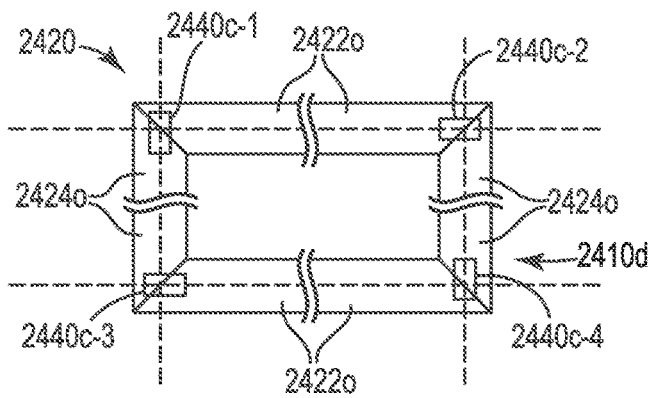

FIG. 24*c* shows the same open frame panel 2420 but where spacer bars of rectangular cross-section have replaced the round ones of FIG. 24*a*. Considering the weld joint that holds each spacer bar in place at the corner, the rectangular spacer bars 2440*c*-1, 2440*c*-2, 2440*c*-3, 2440*c*-4 are arranged to have alternating orientations, with spacer bar 2440*c*-1 oriented vertically, spacer bar 2440*c*-2 oriented horizontally, spacer bar 2440*c*-4 oriented vertically, and spacer bar 2440*c*-3 oriented horizontally. This alternating orientation, in which the spacer bars at the opposite ends of each outer rail are of different (orthogonal) orientation, ensures that the welded area between the spacer bars and a given rail are substantially the same for the four rails.

Figure 24D:
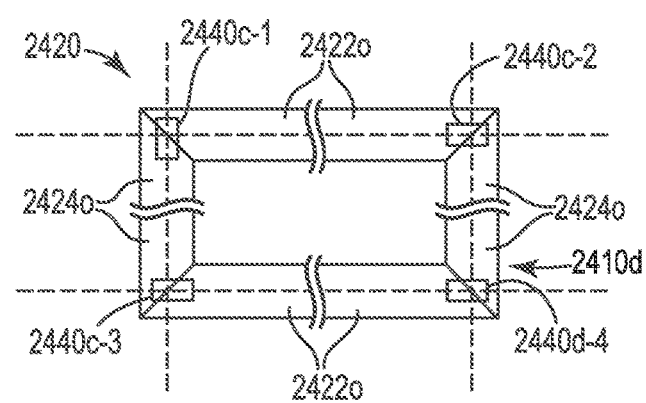

In FIG. 24*d*, we see the same panel 2420 and rectangular spacer bars as in FIG. 24*c*, but where one of the spacer bars, 2440*c*-4, has been rotated 90 degrees to be horizontal, like spacer bars 2440*c*-2 and 2440*c*-3. The newly rotated spacer bar is labeled 2440*d*-4. Although this breaks the alternating orientation pattern set up in FIG. 24*c*, it can be used advantageously to widen the gap between corner spacer bars on one side of the storage structure, in this case, the side face 2410*d*.

Numerous modifications can be made, and numerous features added, to the storage systems and storage structures disclosed herein. For example, skins in the form of peg boards or the like can be fastened to cover one or more of the panels to provide a place to hang things and/or to prevent access to the contents of the storage structure through the relatively large apertures between the rails. Chains and locks can also be used at the side faces to secure the contents for theft prevention or the like. Woodwork, cabinets, shelves, doors, hinges, and the like can be added or applied to the disclosed storage structures to provide a more aesthetic or more functional system for a given user.

Another modification that can readily be made to the disclosed embodiments is to make each of the open frame panels substantially square rather than rectangular. Thus, the dimensions L and W (see e.g. FIGS. 2 and 19), or Le and We (see FIG. 6), or Lc and Wc (see FIG. 6), may be the same or substantially the same, while retaining the other features described herein. Each panel would then be generally square in shape rather than generally rectangular. In that case, the rails referred to herein as "major" rails and "minor" rails would be understood to simply refer to a first group of mutually parallel rails and a second group of mutually parallel rails, the second rails being perpendicular to the first rails, and the first and second rails being of substantially the same lengths.

Turning to FIGS. 25-28, a hanger bracket 2500 is shown in accordance with embodiments of the present disclosure. The hanger bracket 2500 is generally rectangular in shape. A hanger bracket may be tailored or suitable for securing to a generally vertical surface, such as a wall of a garage, warehouse, dwelling, vehicle, a panel in accordance with any embodiment or combination of embodiments described herein, or other structure. Like panels 120, 130, a hanger bracket 2500 may have a substantially open frame design composed of transversely oriented rails spaced apart from each other in the plane of the hanger bracket 2500.

The rails of the hanger bracket 2500 fall into one of two groups: major rails 2501 which are the longer rails and, in the embodiment shown, extend generally vertically and parallel to the x-axis, and minor rails 2503 which are the shorter rails and, in the embodiment shown, extend generally horizontally and parallel to the y-axis. In the embodiment shown, the hanger bracket 2500 has three (3) mutually parallel major rails 2501 and four (4) mutually parallel minor rails 2503. The two major rails at the outer edges of the hanger bracket 2500 are designated 2501*a* and the remaining inner major rail is designated as 2501*b*. Likewise, the minor rails at the outer edges of the hanger bracket 2500 are designated 2503*a* and the remaining inner minor rails are designated as 2503*b*. The major rails 2501 and minor rails 2503 are preferably securely and permanently attached to each other at their points of intersecting, such as by welding or the like.

The secure and permanent attachment can provide the panel 2500 with a sturdy, robust structural integrity.

As shown in FIGS. 25-28, the various rails 2501, 2503 are shown as having flat outer surfaces and generally rectangular cross-sectional shapes perpendicular to their length. The edges of the generally rectangular cross-sectional shape may be rounded, angled, beveled, or sharp right angles. In other embodiments, the rails may have a different cross-sectional geometry, provided the outer surface of at least one of the major outer rails 2501 is flat and the upper (as oriented in the present Figures) surface of the lower minor outer rail 2503*a* and minor inner rails 2503*b* are flat.

Through holes 2506 are provided on the major rail 2501*a* so that the hanger bracket 2500 can be fastened to a generally vertical surface, such as a wall. In some embodiments, it is intended that the hanger bracket 2500 be secured to a vertical surface which is a wall, and the hanger bracket 2500 is specifically secured to the studs of a wall. Through holes 2507 are also provided on the opposite major rail 2501*a* to allow attachment of other accessory components, such as shelving, hooks, brackets, braces, clips, clasps, and other such devices or structures. Similarly, through holes 2507 can be provided in the minor outer rails 2503*a* to allow attachment of other accessory components, such as shelving, hooks, brackets, braces, clips, clasps, and other such devices or structures.

The overall dimension of a hanger bracket 2500 are shown as a width W and a depth D. These dimension can be selected as desired to satisfy a given application. However, in order to be suitable for holding at least some kinds of storage materials or other large format materials, W is typically at least about 32 inches, or at least about 48 inches. $W_1$, as shown, is the center-to-center distance between outer minor rails 2503*a* and is likewise at least about 32 inches, or at least about 48 inches, with $W_1$ being less than W. $W_2$, as shown, is the center-to-center distance between inner minor rails 2503*b* and an outer minor rail 2503*a* and an adjacent inner minor rail 2503*b* and is at least about 12 inches, or at least about 16 inches, or at least about 24 inches. In the particular embodiment shown, each $W_2$ is the same; however, in further embodiments, each $W_2$ is independent of the others and each $W_2$ can be different, with each $W_2$ being less than $W_1$. In some embodiments, each $W_2$ may be adjustable.

D is typically at least about 15 inches, or at least about 20 inches, or at least about 24 inches. $D_1$, as shown, is the center-to-center distance between a first of the major outer rails 2501a and the major inner rail 2501b and is at least about 8 inches, or at least about 10 inches, or at least about 12 inches. $D_2$, as shown, is the center-to-center distance between the second of the major outer rails 2501a and the major inner rail 2501b and is at least about 10 inches, or at least about 12 inches, or at least about 15 inches. In the specific embodiment shown, $D_1$ is less than $D_2$; however, in further embodiments, $D_1$ may be equal to or greater than $D_2$. In some embodiments, each $D_1$ and/or $D_2$ may be independently adjustable.

In the embodiments shown, W is equivalent to the width of the rails used in making the hanger bracket 2500. W is at least about 1 inch, or at least about 2 inches, or at least about 3 inches. W is at most about 6 inches, or at most about 5 inches.

In embodiments, the distance between through holes (2506, 2507) can vary. Through holes are preferably evenly spaced, but in some embodiments may be irregularly spaced along a rail. As shown in FIGS. 25-28, through holes are at least 5 inches apart, or at least 6 inches apart, or at least 8 inches apart, or at least 10 inches apart. It will be appreciated that through holes do not occur immediately at the ends of the rails. Rather, as shown in FIGS. 25-28, through holes are set a distance inward from the edge of the rails. The center of a through hole may be at least 0.5 inches from the end of a rail, or at least 0.75 inches from the end of a rail, or at least 1 inch from the end of a rail, or at least 1.25 inches from the end of a rail, or at least 1.5 inches from the end of a rail, or at least 1.5 inches from the end of a rail. Likewise, through holes are set a distance inward from the side edges of the rails. Preferably, through holes are centered between the sides of the rails. In an embodiment, the center of a through hole may be at least 0.5 inches from the side edge of a rail, or at least 0.75 inches from the side edge of a rail, or at least 1 inch from the side edge of a rail, or at least 1.25 inches from the side edge of a rail, or at least 1.5 inches from the side edge of a rail, or at least 2 inches from the side edge of a rail. It will be appreciated that the distance a through hole is placed from the side edge of a rail will, in some cases, be dependent on the dimensions of the rail.

As shown in FIGS. 25-28, the hanger bracket 2500 is generally rectangular with major rails 2501 having a length greater than minor rails 2503. Other proportions are contemplated, with the understanding that the length of the minor inner rails 2503b will always be less than the length of the minor outer rails 2503a.

Figure 25:
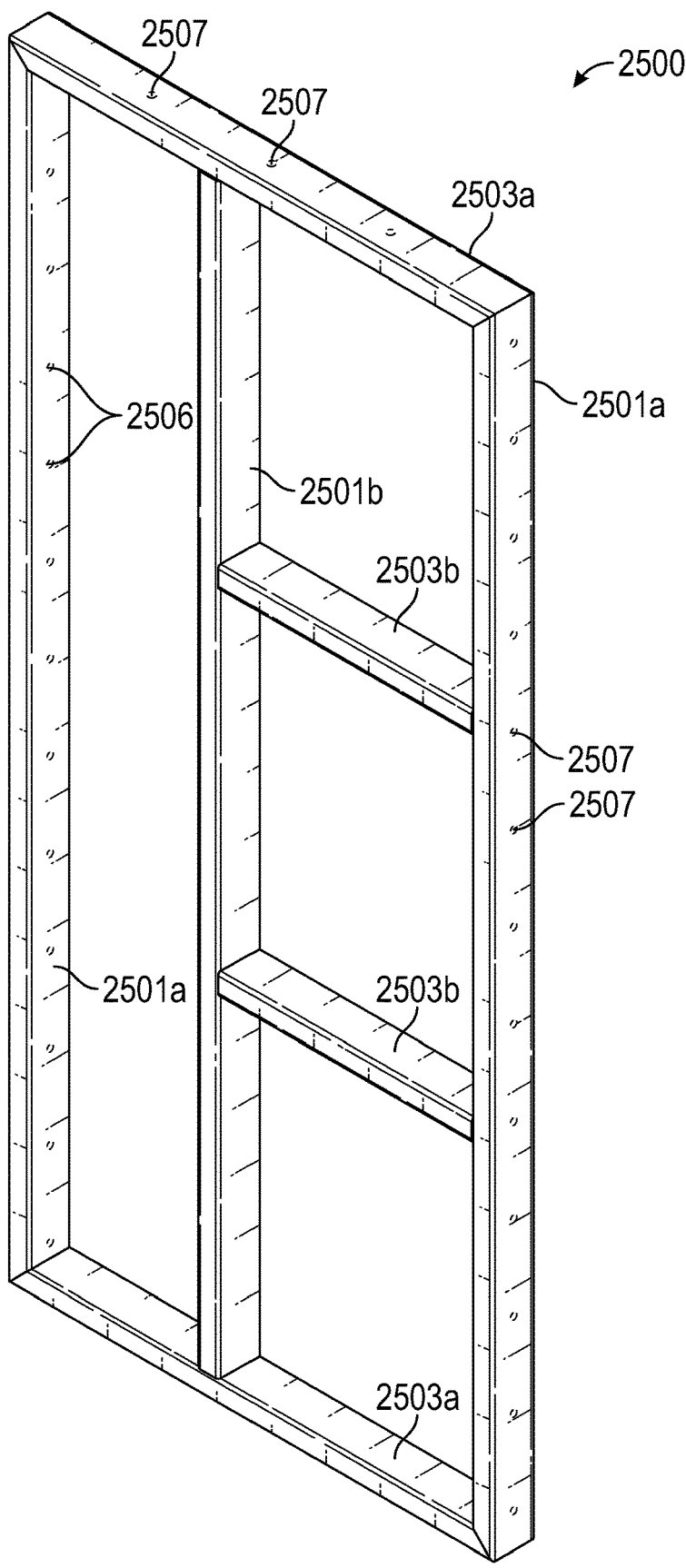
FIG. 25 is a perspective view of a hanger bracket in accordance with embodiments of the present disclosure.
Figure 26:
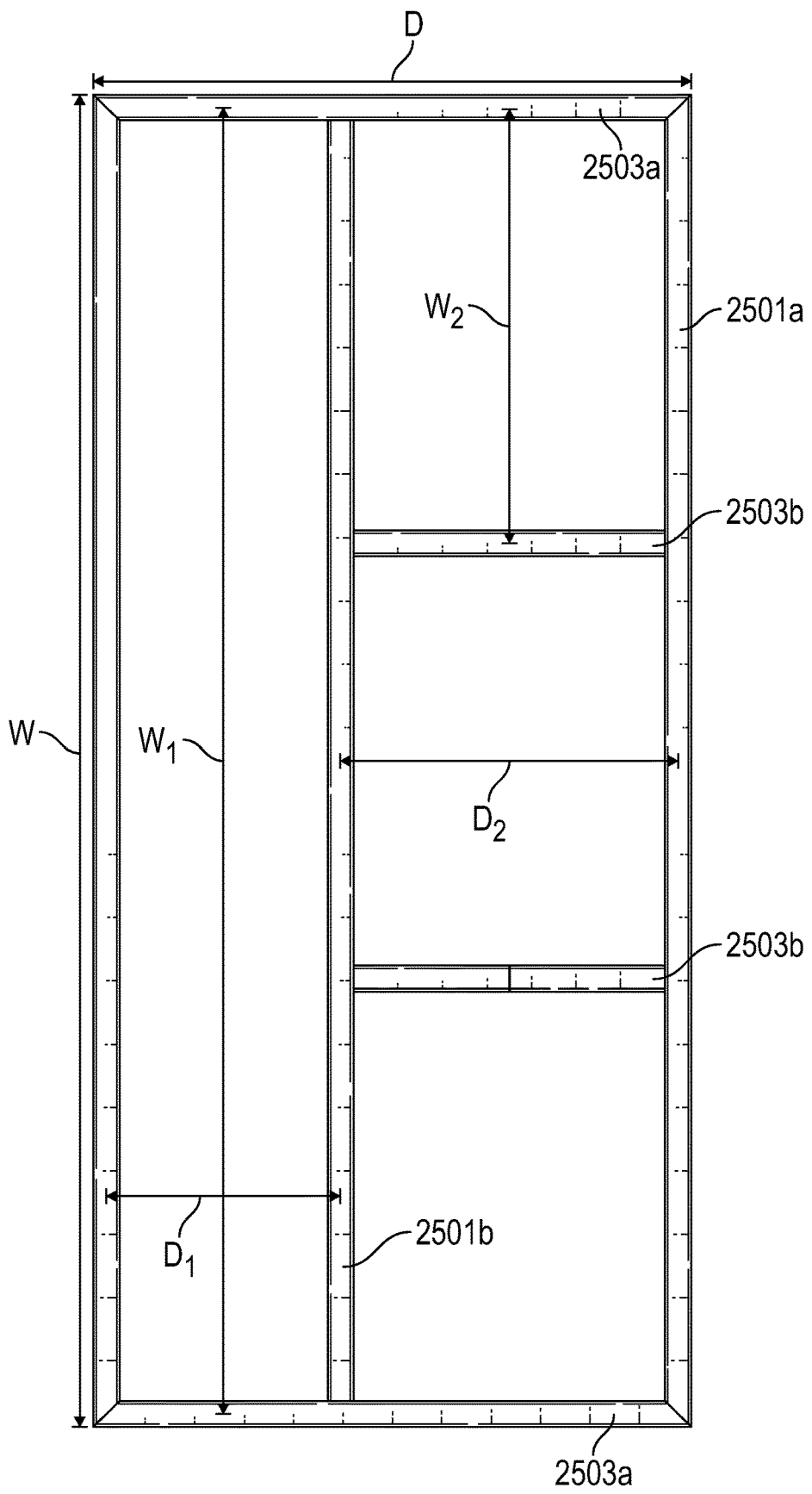
FIG. 26 is a side view thereof.
Figures 27, 28:
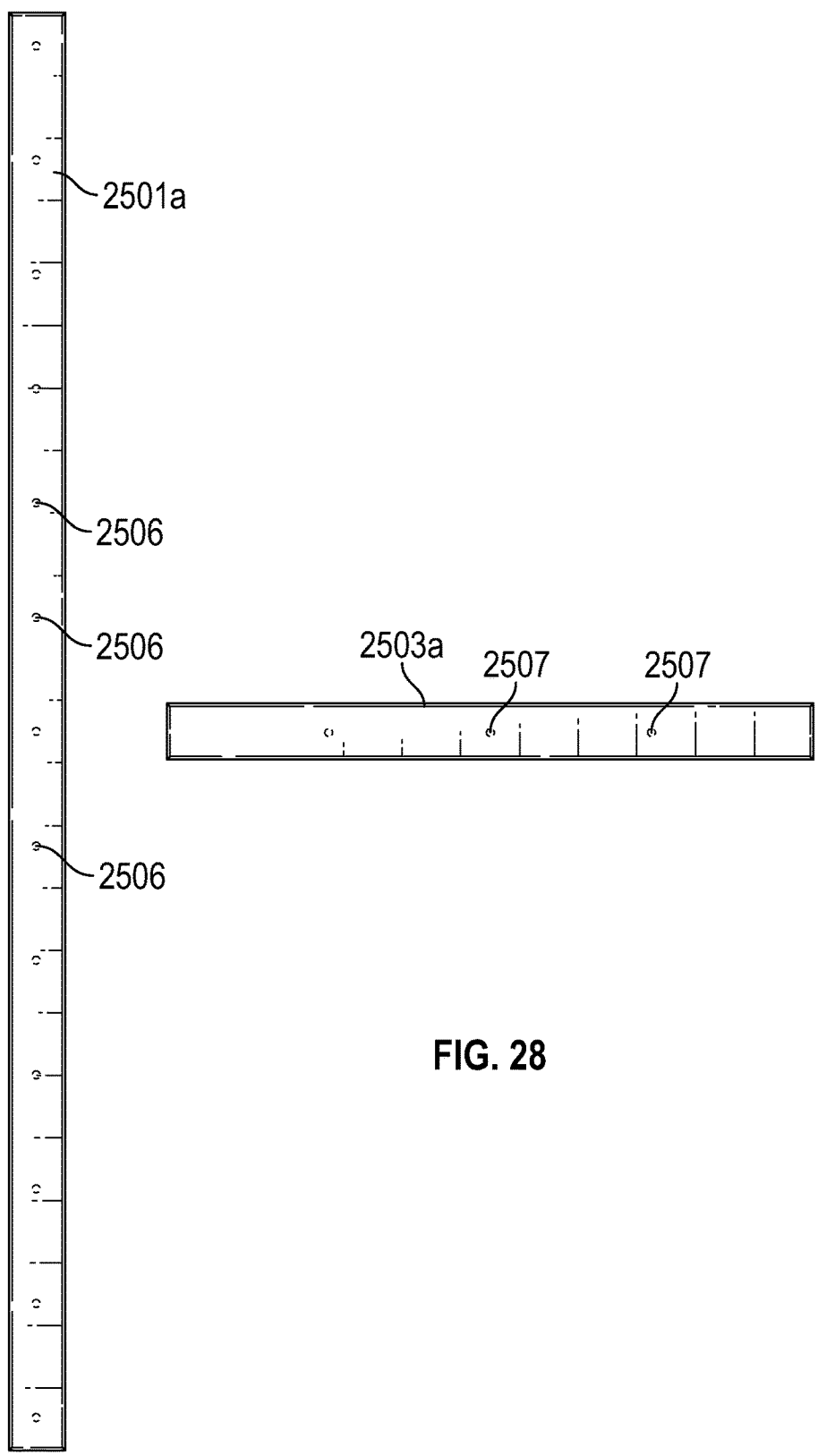
FIG. 27 is a rear view thereof, the front view being identical.
FIG. 28 is a top view thereof, the bottom view being identical.
Figure 29:
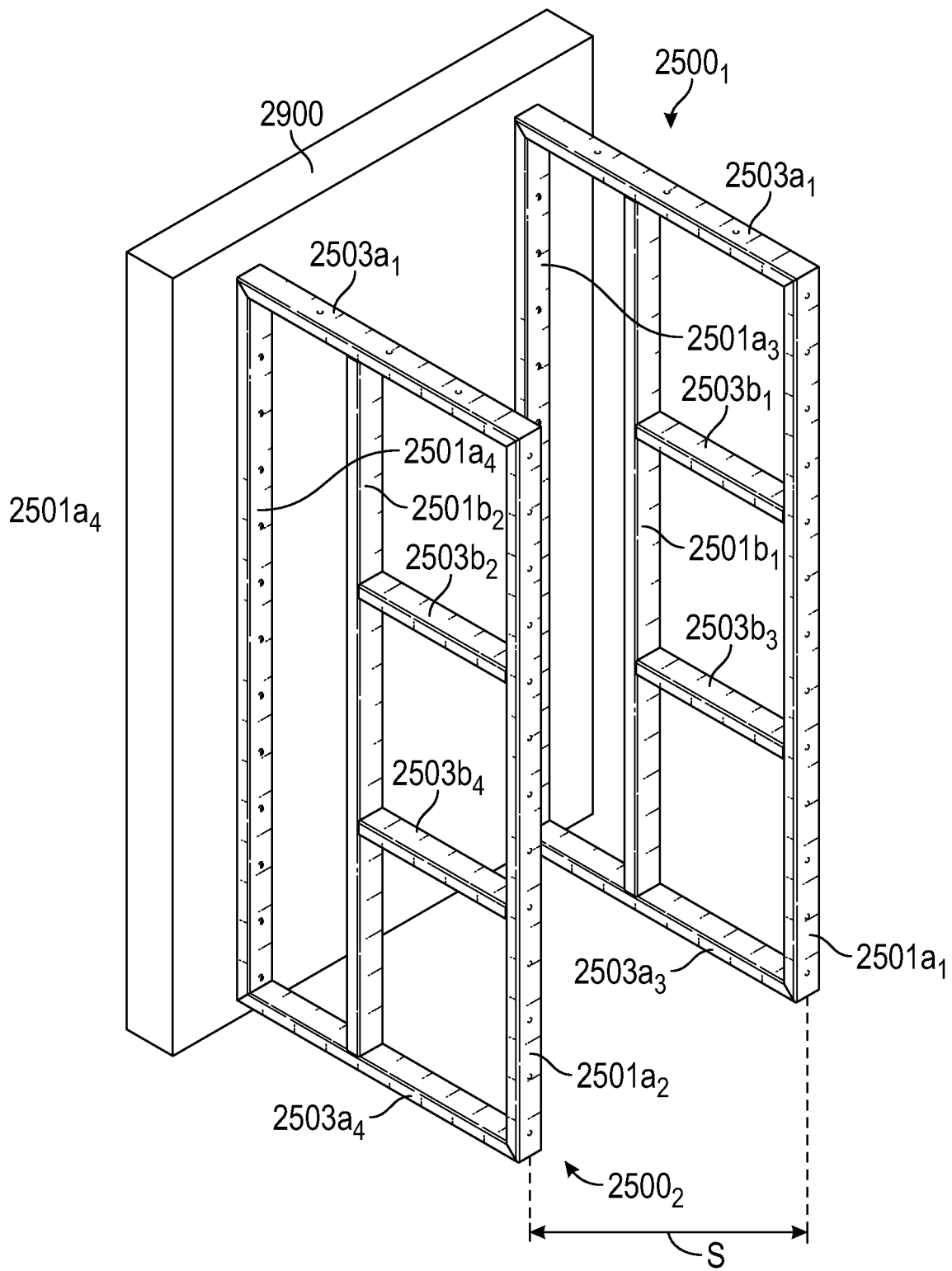
FIG. 29 illustrates the exemplary hanger brackets of FIG. 25 secured to a generally vertical surface.

FIG. 29 is a illustrate the exemplary hanger brackets 2500 of FIG. 25 secured to a generally vertical surface 2900. Each hanger bracket 2500 lies in or extends along a reference plane. In the figure, each hanger bracket 2500 defines a reference plane. In the embodiment shown, two hanger brackets 2500 are used; however, in further embodiments, three, or four, or more hanger brackets may be used and secured to a generally vertical surface. The hanger brackets 2500 can be spaced apart at any desired distance.

As shown in FIG. 29, the hanger brackets 2500 are secured to the generally vertical surface 2900 in a spaced-apart relationship. The distance between hanger brackets 2500 may vary by convenience and/or necessity, provided the hanger brackets 2500 are positioned such that respective outer major rails, respective inner major rails, respective outer minor rails, and respective minor inner rails are mutually parallel. That is, in the particular embodiment shown, major outer rail $2501a_1$ of hanger bracket $2500_1$ is mutually parallel to major outer rail $2501a_2$ of hanger bracket $2500_2$, major outer rail $2501a_3$ of hanger bracket $2500_1$ is mutually parallel to major outer rail $2501a_4$ of hanger bracket $2500_2$, major inner rail $2501b_1$ of hanger bracket $2500_1$ is mutually parallel to major inner rail $2501b_2$, minor outer rail $2503a_1$ of hanger bracket $2500_1$ is mutually parallel to minor outer rail $2503a2$ of hanger bracket $2500_2$, minor outer rail $2503a3$ of hanger bracket $2500_1$ is mutually parallel to minor outer rail $2503a4$ of hanger bracket $2500_2$, minor inner rail $2503b_1$ of hanger bracket $2500_1$ is mutually parallel to minor inner rail $2503b_2$ of hanger bracket $2500_2$, and minor inner rail $2503b3$ of hanger bracket $2500_1$ is mutually parallel to minor inner rail $2503b_4$ of hanger bracket $2500_2$.

In the embodiment shown, the hanger brackets 2500 are secured to the generally vertical surface 2900 with a space S between them. S may vary by convenience and/or for the particular project at hand. However, in some embodiments, S may be approximately equal to the distance between wall studs, particularly when the vertical surface to which the hanger brackets are secured is a wall. As previously described, in the United States, standard wall stud spacing is generally 16 inches, but may, in some instance, be 24 inches. In some embodiments, S may therefore be approximately 16 inches, or multiples of 16 inches, or, in some instances, 24 inches, or multiple of 24 inches. That is, S may, in embodiments, be at least 8 inches, or at least 12 inches, or at least 16 inches, or at least 24 inches.

Figure 30:
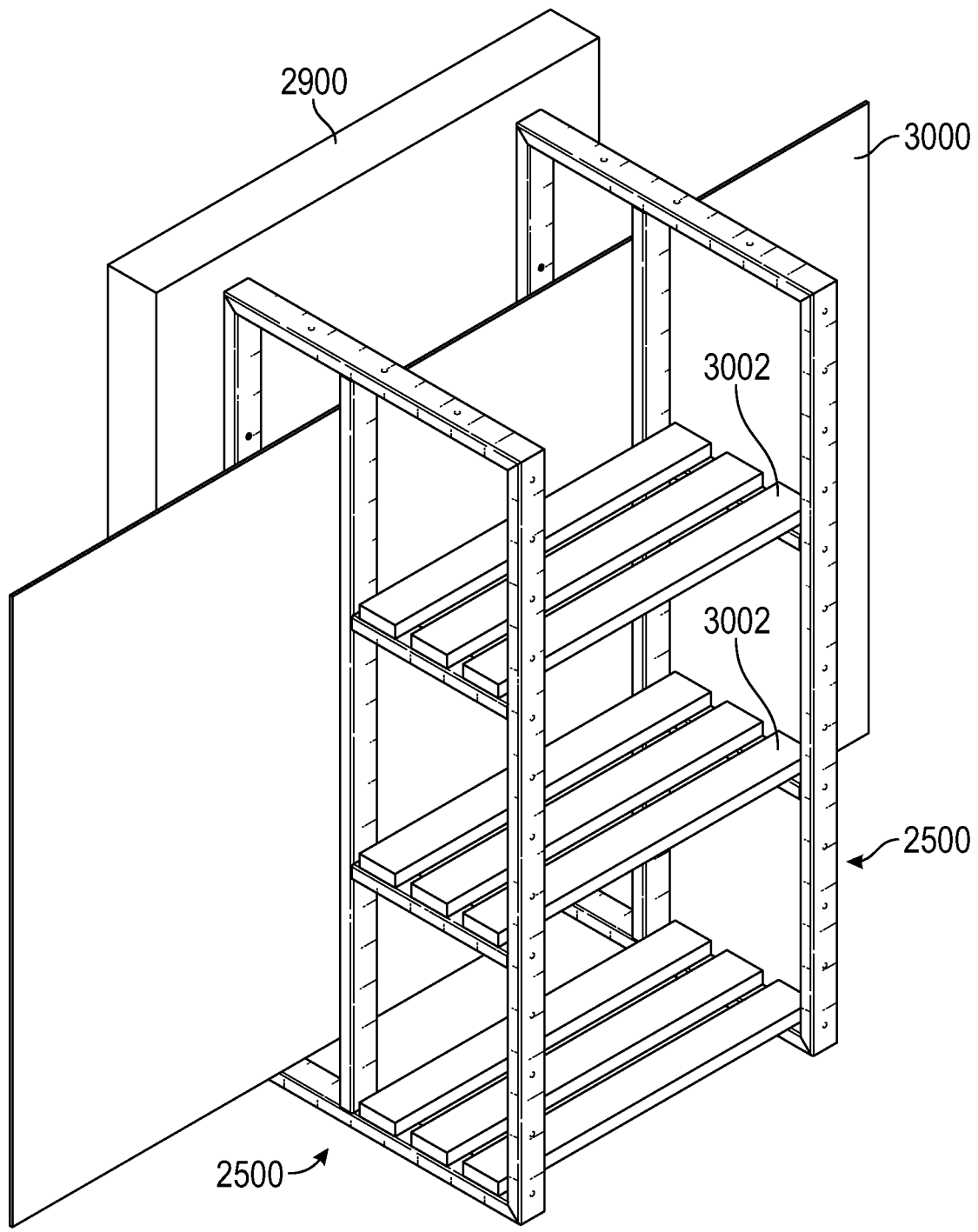
FIG. 30 is a view similar to FIG. 29 but showing the hanger brackets in use and with shelving installed.

FIG. 30 is a view similar to FIG. 29 but showing the hanger brackets 2500 in use and with shelving 3002 installed. In particular, two hanger brackets 2500 are shown secured to a generally vertical surface 2900, such as a wall. The hanger brackets 2500 are installed such that they define parallel planes and corresponding minor rails 2503 on the hanger brackets 2500 are mutually parallel and corresponding major rails 2501 on the hanger brackets 2500 are mutually parallel. That is, in the embodiment shown, the corresponding minor rails 2503 each define a plane. Shelving 3002 can therefore be installed along the corresponding minor rails 2503 to create planar shelves.

In the embodiment shown, two hanger brackets 2500 are secured to the generally vertical surface 2900. In further embodiments, the number of hanger brackets 2500 secured to a generally vertical surface 2900 may be at least two, or at least three, or at least four, or any number desired to fit a specific space or purpose. Moreover, additional hanger brackets 2500 may be installed above or below a pair of corresponding hanger brackets 2500 to create "upper" and "lower" hanger bracket units.

The generally vertical surface 2900 shown in FIGS. 29-30 is a wall. In further embodiments, the generally vertical surface 2900 may be any form of wall (e.g., brick, drywall, wood, metal, etc.) or side of a structure or vehicle (e.g., home, garage, truck, van, construction vehicle, bus, trailer, etc.). In still further embodiments, the generally vertical surface may be a storage structure in accordance with any embodiment or combination of embodiments described herein.

Hanger brackets 2500 (and particularly pairs of hanger brackets) may be secured to a generally vertical surface at any height. That is, hanger brackets may be installed at or near the ground or other generally horizontal surface or be suspended above the ground on the generally vertical surface. When installed near the ground (or other similar surface), shelving on the lower minor outer rails may not be necessary. When suspended above the ground (or other similar surface), items may be suspended from the bottom of the lower minor outer rails.

In the embodiment shown in FIG. 30, shelving 3002 is placed across minor inner rails 2503b and the lower minor outer rail 2503a to create storage shelves. In other embodiments, the upper minor outer rail 2503a may also include shelving. In still other embodiments, shelving may be used on all, some or none of the minor rails to create custom height shelving designed to fill a particular need.

Figure 31:
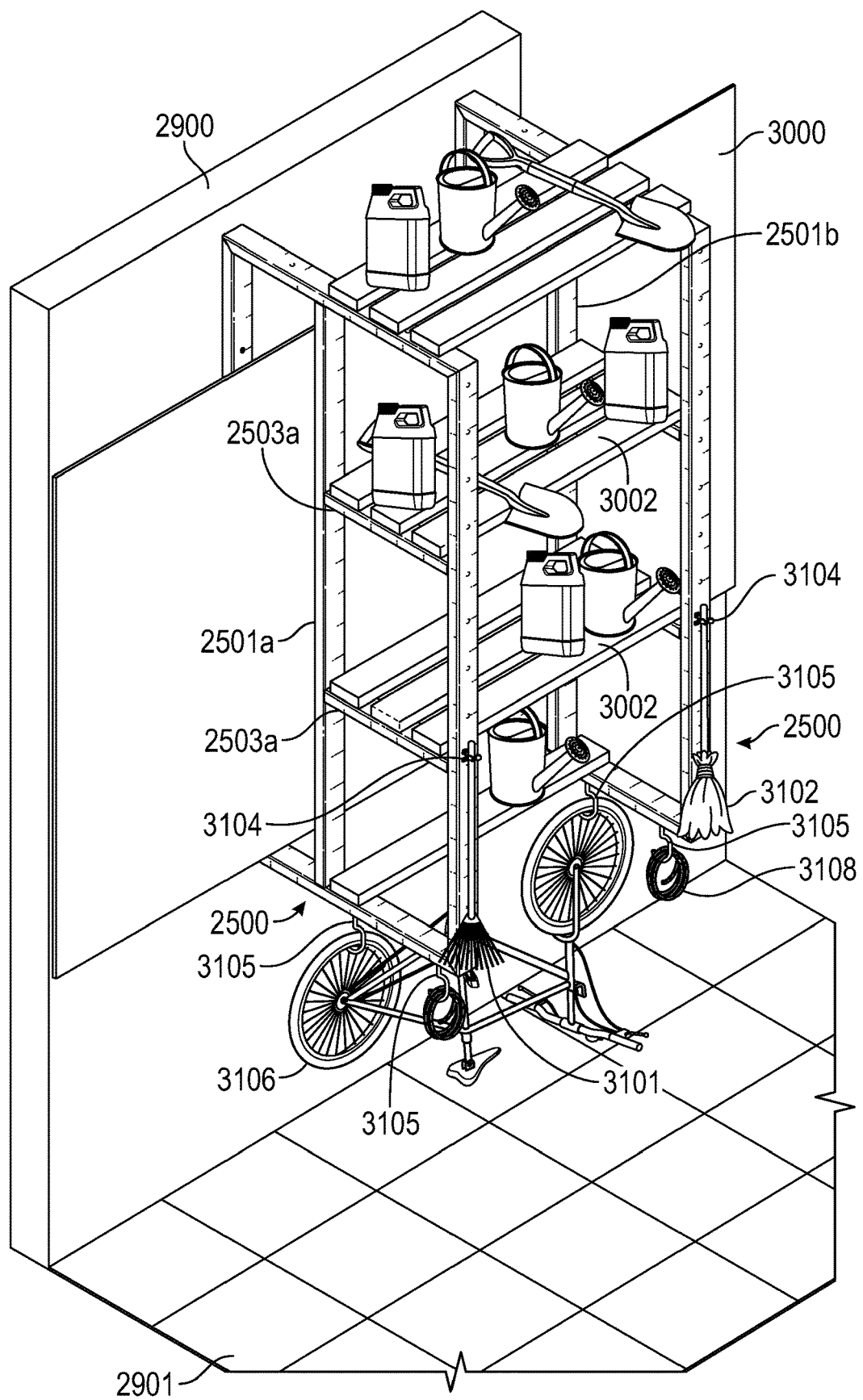
FIG. 31 is a view similar to FIG. 30 showing an alternative embodiment of hanger brackets in use.

In still further embodiments, additional accessory structures may be secured to the hanger brackets 2500 to create customized storage solutions, such as doors, drawers or drawing fixtures, hooks, suspension structures, clasps, clips, brackets, braces, ropes, and other similar structures. For example, FIG. 31 illustrates two hanger brackets 2500 secured to a generally vertical surface 2900 and positioned a distance above a generally horizontal surface 2901 (e.g., ground), with shelving 3002 installed on all four minor rails 2503 holding gardening supplies. Large format items 3000 can be contained between the major inner rails 2501b and the corresponding major outer rails 2501a which is secured to the generally vertical surface. Hook accessories 3104 secured to the outer surface of the major outer rails 2501a hold additional items, such as, for example, a rake 3101 and broom 3102, and hooks 3105 on the bottom surface of the minor outer rails 2503a are shown suspending a bike 3106 and additional gardening supplies 3108 (e.g., hoses/ropes) suspended from a second set of hooks 3105. Such additional accessory items may be secured to the hanger brackets 2500 using connectors such as threaded rivets, nuts, threaded nuts, rivet studs, blind rivet studs, bolts, screws, and any combination of these and other connectors.

Figure 32:
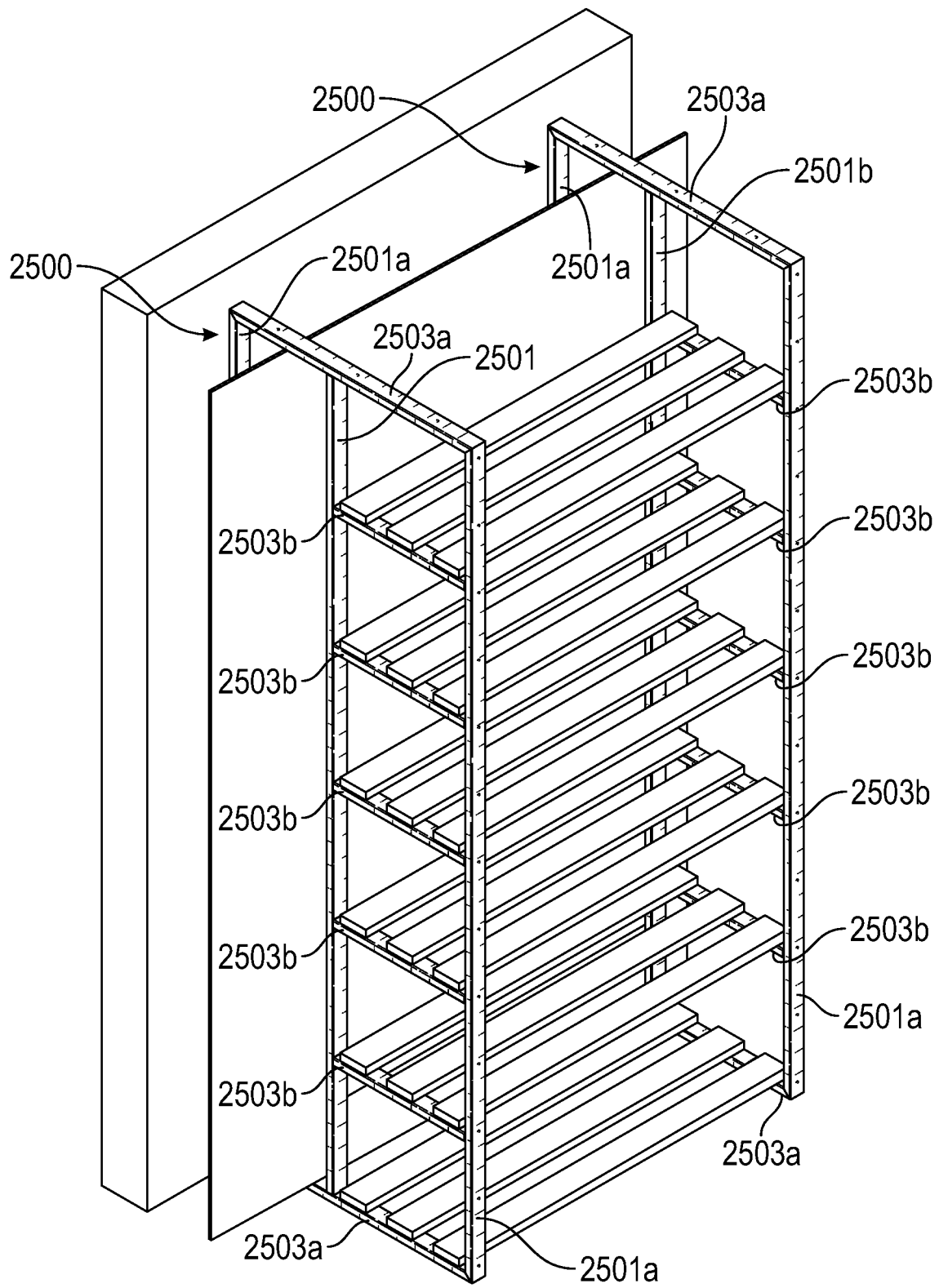
FIG. 32 illustrates an alternative embodiment of a hanger bracket in accordance with embodiments of the present disclosure.

In the embodiment shown in FIGS. 25-31, the hanger bracket 2500 is shown as having four generally rectangular openings: a first larger opening created by a major outer rail, a major inner rail, and the corresponding portions of the outer minor rails, and three small openings created by the other major outer rail, the major inner rail, and the minor rails. However, as shown in FIG. 32, the hanger brackets 2500 may have any number of openings depending on the number of major and minor inner rails. In the embodiment shown in FIG. 31, for example, each hanger bracket 2500 has seven generally rectangular openings: a first larger opening again created by a major outer rail 2501a, major inner rail 2501b, and corresponding portions of the minor outer rails 2503a, and six smaller openings, each created by the other major outer rail 2501a, the major inner rail 2501b, and the minor rails 2503a, 2503b. In other embodiments, the hanger bracket could have zero minor inner rails. According to embodiments, a hanger bracket may have from zero, or one, or at least two, or at least three, or at least four minor inner rails to five, or 6, or 7, or 8, or 9, or 10 minor inner rails.

The number of major inner rails can likewise vary. In some embodiments, there may be zero major inner rails, while in other embodiments, the number of major inner rails may be greater than 1. In accordance with embodiments of the present disclosure, a hanger bracket may have from zero, or one, or at least two, or at least 3 major inner rails to 4, or 5, or 6 major inner rails.

Unless otherwise indicated, all numbers expressing quantities, measured properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application.

Not to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

The use of relational terms such as "top", "bottom", "upper", "lower", "above", "below", and the like to describe various embodiments are merely used for convenience to facilitate the description of some embodiments herein. Notwithstanding the use of such terms, the present disclosure should not be interpreted as being limited to any particular orientation or relative position, but rather should be understood to encompass embodiments having any orientations and relative positions, in addition to those described above.

The following is a non-limiting list of items of the present disclosure.

Item 1. A storage system, comprising:
a first open frame panel, the first panel—which may be generally rectangular in shape—comprising first major rails and first minor rails, the first major rails being mutually parallel and including a plurality of first major inner rails disposed between two first major outer rails, the first minor rails being mutually parallel and including a plurality of first minor inner rails disposed between two first minor outer rails;
a second open frame panel, the second panel—which may be generally rectangular in shape—comprising second major rails and second minor rails, the second major rails being mutually parallel and including a plurality of second major inner rails disposed between two second major outer rails, the second minor rails being mutually parallel and including a plurality of second minor inner rails disposed between two second minor outer rails; and
a plurality of first spacer bars connecting the first panel to the second panel to define an interior storage space therebetween;
wherein the plurality of first major interior rails are arranged to have a center-to-center spacing SP1, and the plurality of first minor interior rails are arranged to have a center-to-center spacing sp1 substantially equal to SP1.

Item 1a. The system of item 1, wherein SP1 and sp1 are substantially equal to a standardized spacing for wall studs.

Item 1b. The system of any previous item, wherein the plurality of second major interior rails are arranged to have a center-to-center spacing SP2, and the plurality of first minor interior rails are arranged to have a center-to-center spacing sp2 substantially equal to SP2.

Item 1c. The system of item 1b, wherein SP1, sp1, SP2, and sp2 are substantially the same.

Item 1d. The system of any previous item, wherein the first and second open frame panels have a same number of major rails and a same number of minor rails.

Item 1e. The system of any previous item, wherein all of the first major rails are arranged to have the center-to-center spacing SP1, and all of the first minor rails are arranged to have the center-to-center spacing sp1.

Item 1f. The system of any of items 1-1d, wherein a spacing between each first major outer rail and its nearest neighbor first major inner rail is SP1', greater than SP1.

Item 1g. The system of item 1f, wherein a ratio SP1'/SP1 is in a range from 1.01 to 1.2, or is in a range from 1.04 to 1.1, or is about 1.07.

Item 1h. The system of item 1f, wherein all of the first major rails have a same width WD1.

Item 1i. The system of item 1, wherein the first major outer rails have a width WD1$o$ and the first major inner rails have a width WD1$i$, and WD1$o$>WD1$i$.

Item 1j. The system of item 1i, wherein the spacing SP1' and the width WD1$o$ are tailored such that each of the first major outer rails overlaps a reference line that is parallel to such first major outer rail and spaced from its nearest neighbor first major inner rail by a distance SP1.

Item 1k. The system of any previous item, wherein a spacing between each first minor outer rail and its nearest neighbor first minor inner rail is sp1', greater than sp1.

Item 1L. The system of item 1k, wherein a ratio sp1'/sp1 is in a range from 1.01 to 1.2, or is in a range from 1.04 to 1.1, or is about 1.07.

Item 1m. The system of any previous item, wherein the first major rails and the first minor rails each have a flat outer surface.

Item 1n. The system of any previous item, wherein the first major rails and the first minor rails comprise hollow tubes.

Item 1o. The system of item 1, wherein all of the first major rails and all of the first minor rails have a same width WD1.

Item 1p. The system of item 1, wherein the first major inner rails have a width WD1$i$ and the first major outer rails have a width WD1$o$, and WD1$o$>WD1$i$.

Item 1q. The system of any previous item, wherein the first spacer bars contact at least some of the outer rails of the first and second panels, but no spacer bar contacts the inner rails of the first or second panels.

Item 1r. The system of any previous item, wherein the outer rails of the first panel define four corners of the first panel, and the outer rails of the second panel define four corners of the second panel, and the first spacer bars include one spacer bar disposed at each of the four corners of each panel.

Item 1s. The system of item 1r, wherein the first spacer bars include spacer bars connecting only one of the first major outer rails to only one of the second major outer rails at positions between the corners, and no spacer bars connect the remaining first major outer rail to the remaining second major outer rail between the corners thereof.

Item 1t. The system of item 1s, wherein the first spacer bars include spacer bars connecting only one of the first minor outer rails to only one of the second minor outer rails at positions between the corners, and no spacer bars connect the remaining first minor outer rail to the remaining second minor outer rail between the corners thererof.

Item 1u. The system of item 1r, wherein the first spacer bars include spacer bars connecting only one of the first minor outer rails to only one of the second minor outer rails at positions between the corners, and no spacer bars connect the remaining first minor outer rail to the remaining second minor outer rail between the corners thererof.

Item 1v. The system of item 1r, wherein the first spacer bars include spacer bars that contact at least some of the inner rails of the first and second panels.

Item 1w. The system of item 1r, wherein the first spacer bars at the four corners are permanently affixed to the first and second panels, and at least some remaining first spacer bars detachably connect to the first and second panels.

Item 1x. The system of any previous item, wherein the first spacer bars are non-extensible such that the storage system defines an interior storage space of a fixed volume.

Item 1y. The system of any of items 1-1w, wherein the first spacer bars are extensible such that the storage system defines an interior storage space of an adjustable volume.

Item 1z. The system of any previous item, wherein at least one of the first spacer bars is permanently affixed to the first and second panels, and at least another of the first spacer bars is detachably connected to the first and second panels.

Item 1aa. The system of item 1, wherein the first and second panels each have outer edge aspect ratios of R:1, where R is in a range from 1.9 to 1.98, or from 1.92 to 1.96, or is about 1.94.

Item 1bb. The system of any previous item, wherein the storage system further includes
  a third open frame panel disposed such that the second open frame panel is between the first open frame panel and the third open frame panel, the third open frame panel being generally rectangular in shape and comprising third major rails and third minor rails, the third major rails being mutually parallel and including a plurality of third major inner rails disposed between two third major outer rails, the third minor rails being mutually parallel and including a plurality of third minor inner rails disposed between two third minor outer rails; and
  a plurality of second spacer bars connecting the third panel to the second panel.

Item 1cc. The system of item 1bb, wherein the first spacer bars have a number N1 and the second spacer bars have a number N2, and N1 equals N2.

Item 1dd. The system of item 1bb, wherein the first spacer bars have a number N1 and the second spacer bars have a number N2, and N1<N2.

Item 1ee. The system of item 1bb, wherein the first spacer bars contact at least some of the outer rails of the first and second panels, but no spacer bar disposed between the first and second panels contacts the inner rails of the first or second panels, and the second spacer bars include some spacer bars that contact at least some of the outer rails of the second and third panels and at least one spacer bar that contacts at least one inner rail of the second and third panels.

Item 2. A storage system, comprising:
  a first panel, which may be generally rectangular, comprising first major rails and first minor rails, the first major rails being mutually parallel and including a plurality of first major inner rails disposed between two first major outer rails, the first minor rails being mutually parallel and including a plurality of first minor inner rails disposed between two first minor outer rails;
  a second panel, which may be generally rectangular; and
  a plurality of spacer bars connecting the first panel to the second panel to define an interior storage space therebetween;
  wherein the plurality of first major interior rails are arranged to have a center-to-center spacing SP1, and the plurality of first minor interior rails are arranged to have a center-to-center spacing sp1 substantially equal to SP1; and
  wherein a spacing between each first major outer rail and its nearest neighbor first major inner rail is SP1', greater than SP1; and
  wherein a spacing between each first minor outer rail and its nearest neighbor first minor inner rail is sp1', greater than sp1.

Item 2a. The system of item 2, wherein a ratio SP1'/SP1 is in a range from 1.01 to 1.2, or is in a range from 1.04 to 1.1, or is about 1.07.

Item 2b. The system of item 2, wherein a ratio sp1'/sp1 is in a range from 1.01 to 1.2, or is in a range from 1.04 to 1.1, or is about 1.07.

Item 2c. The system of any of items 2-2b, wherein all of the first major rails have a same width W1.

Item 2d. The system of any of items 2-2b, wherein the first major outer rails have a width WD1$o$ and the first major inner rails have a width WD1$i$, and WD1$o$>WD1$i$.

Item 2e. The system of item 2d, wherein the spacing SP1' and the width WD1$o$ are tailored such that each of the first major outer rails overlaps a reference line that is parallel to such first major outer rail and spaced from the nearest neighbor first major inner rail by a distance SP1.

Item 3. A kit for a storage structure, the kit comprising:
a plurality of first rails including at least four first major rails and two first minor rails, the first major rails being longer than the first minor rails, the first rails also including first minor sub-rails each of which is less than half as long as each of the first minor rails;
wherein the first rails are connectable into a first open frame panel, which may be generally rectangular, in which two of the first major rails are first major outer rails and at least two of the first major rails are first major inner rails disposed between and parallel to the first major outer rails, and in which the two first minor rails are first minor outer rails, and in which the first minor sub-rails are connectable between the first major rails to form first minor inner rails extending between the first major outer rails.

Item 3a. The kit of item 3, wherein the first minor sub-rails include a first group of minor sub-rails each having a first length and a second group of minor sub-rails each having a second length greater than the first length but shorter than each of the two first minor rails.

Item 3b. The kit of item 3, wherein the first rails all have a same width.

Item 3c. The kit of item 3, wherein the first major outer rails have a width greater than a width of the first major inner rails.

Item 3d. The kit of item 3, wherein the first rails are metal and are suitable for being welded to each other.

Item 3e. The kit of item 3d, wherein the first rails are hollow metal tubes.

Item 3f. The kit of item 3e, wherein the hollow metal tubes have a generally rectangular cross-sectional shape.

Item 3g. The kit of any of items 3-3f, further comprising:
a plurality of second rails including at least four second major rails and two second minor rails, the second major rails being longer than the second minor rails, the second rails also including second minor sub-rails each of which is less than half as long as each of the second minor rails;
wherein the second rails are connectable into a second open frame panel, which may be generally rectangular, in which two of the second major rails are second major outer rails and at least two of the second major rails are second major inner rails disposed between and parallel to the second major outer rails, and in which the two second minor rails are second minor outer rails, and in which the second minor sub-rails are connectable between the second major rails to form second minor inner rails extending between the second major outer rails.

Item 3h. The kit of item 3g, wherein the second minor sub-rails include a third group of minor sub-rails each having a third length and a fourth group of minor sub-rails each having a fourth length greater than the third length but shorter than each of the two second minor rails.

Item 3i. The kit of item 3g, wherein the second rails all have a same width.

Item 3j. The kit of item 3g, wherein the second major outer rails have a width greater than a width of the second major inner rails.

Item 3k. The kit of item 3g, wherein the second rails are metal and are suitable for being welded to each other.

Item 3L. The kit of item 3k, wherein the second rails are hollow metal tubes.

Item 3m. The kit of item 3L, wherein the hollow metal tubes have a generally rectangular cross-sectional shape.

Item 3n. The kit of any of items 3g-3m, further comprising:
a plurality of spacer bars of equal length suitable for attaching to the first and second open frame panels to keep such panels in spaced relation to form an interior storage space therebetween.

Item 4. A storage system comprising:
at least two hanger brackets, each hanger bracket being generally rectangular in shape and comprising major and minor rails, the major rails being mutually parallel and including two major outer rails, the minor rails being mutually parallel and including a plurality of minor inner rails disposed between the minor outer rails;
wherein the major rails and minor rails are perpendicular to one another;
wherein the minor inner rails are spaced generally vertically from one another and extend between one of the major outer rails and the at least one major inner rail; and
wherein one of the major outer rails has a substantially planar outer surface and a plurality of through holes.

Item 4a. The storage system of item 4, wherein a center-to-center spacing of a first major outer rail and an adjacent major inner rail is different than a center-to-center spacing of a second major outer rail and an adjacent major inner rail.

Item 4b. The storage system of any of items 4-4a, wherein the minor inner rails are evenly vertically spaced between the major outer rails.

Item 4c. The storage system of any of items 4-4b, wherein the minor inner rails are adjustably spaced between the major outer rails.

Item 4d. The storage system of any of items 4-4c, wherein the at least two hanger brackets define parallel planes.

Item 4e. The storage system of any of items 4-4d, wherein, when the at least two hanger brackets are secured in position, the minor inner rails of a first of the at least two hanger brackets are each parallel and coplanar with a corresponding one of the minor inner rails of a second of the at least two hanger brackets.

Item 4f. The storage system of any of items 4-4e, further comprising at least one shelf extending from a minor inner rail of a first of the at least two hanger brackets and a corresponding minor inner rail of a second of the at least two hanger brackets.

Item 4g. The storage system of any of items 4-4f, wherein an outer surface of at least one of a second of the major outer rails and an outer minor rail has a plurality of through holes.

Item 4h. The storage system of item 4g, wherein at least one item is secured to one or more of the plurality of through holes on the at least one of the second of the major outer rails and the outer minor rail, wherein the at least one item is selected from the group consisting of a hook, a bracket, a brace, a clasp, and a clip is secured to at least one of the plurality of through holes of the at least one of the second of the major outer rails and the outer minor rail.

Item 4i. The storage system of any of items 4-4h comprising at least two minor inner rails.

Item 4j. The storage system of any of items 4-4i, wherein the structure is a generally vertical surface.

Item 5. A storage system for mounting on a structure, the storage system comprising:
 at least two hanger brackets, each hanger bracket being generally rectangular in shape and comprising major rails and minor rails, the major rails being mutually parallel and including at least one major inner rail disposed between two major outer rails, the minor rails being mutually parallel and including a plurality of minor inner rails disposed between the minor outer rails;
 wherein the major rails and minor rails are perpendicular to one another;
 wherein the minor inner rails extend between one of the major outer rails and the at least one major inner rails;
 wherein one of the major outer rails has a substantially planar outer surface and a plurality of through holes; and
 wherein the minor inner rails are evenly spaced between minor outer rails.

Item 5a. The storage system of item 5, wherein a center-to-center spacing of a first major outer rail and an adjacent major inner rail is different than a center-to-center spacing of a second major outer rail and an adjacent major inner rail.

Item 5b. The storage system of any of items 5-5a, wherein, when the at least two hanger brackets are secured in position, the minor inner rails of a first of the at least two hanger brackets are each parallel and coplanar with a corresponding one of the minor inner rails of a second of the at least two hanger brackets.

Item 5c. The storage system of any of items 5-5b, further comprising at least one shelf extending from a minor inner rail of a first of the at least two hanger brackets and a corresponding minor inner rail of a second of the at least two hanger brackets.

Item 5d. The storage system of any of items 5-5c, wherein an outer surface of at least one of a second of the major outer rails and an outer minor rail has a plurality of through holes.

Item 5e. The storage system of any of items 5-5d comprising at least two minor inner rails.

Item 5f. The storage system of any of items 5-5e, wherein the structure is a generally vertical surface.

Item 5g. The storage system of item 5f, wherein the generally vertical surface is selected from the group consisting of a structure wall and a vehicle wall.

Item 6. A storage system comprising:
 a first open frame panel, the first panel being generally rectangular in shape and comprising first major rails and first minor rails, the first major rails being mutually parallel and including a plurality of first major inner rails disposed between two first major outer rails, the first minor rails being mutually parallel and including a plurality of first minor inner rails disposed between two first minor outer rails;
 a second open frame panel, the second panel being generally rectangular in shape and comprising second major rails and second minor rails, the second major rails being mutually parallel and including a plurality of second major inner rails disposed between two second major outer rails, the second minor rails being mutually parallel and including a plurality of second minor inner rails disposed between two second minor outer rails;
 a plurality of first spacer bars connecting the first panel to the second panel to define an interior storage space therebetween; and
 at least two hanger brackets, each hanger bracket being generally rectangular in shape and comprising third major rails and third minor rails, the third major rails being mutually parallel and including at least one third major inner rail disposed between two third major outer rails, the third minor rails being mutually parallel and including a plurality of third minor inner rails disposed between the third minor outer rails,
 wherein the third major rails and third minor rails are perpendicular to one another,
 wherein the third minor rails extend between one of the third major outer rails and the at least one third major inner rail,
 wherein the third minor inner rails are vertically spaced between minor outer rails, and
 wherein each of the at least two hanging brackets is secured to a second major rail such that a third major outer rail of each of the at least two hanging brackets is secured to and parallel with the respective second major rail.

Various modifications and alterations of this invention will be apparent to those skilled in the art without departing from the spirit and scope of this invention, which is not limited to the illustrative embodiments set forth herein. The reader should assume that features of one disclosed embodiment can also be applied to all other disclosed embodiments unless otherwise indicated. All U.S. patents, patent application publications, and other patent and non-patent documents referred to herein are incorporated by reference, to the extent they do not contradict the foregoing disclosure.

What is claimed is:

1. A storage system comprising: at least two hanger brackets configured to be secured on a vertical surface, each hanger bracket being generally rectangular in shape and comprising major rails and minor rails, the major rails being mutually parallel and including two major outer rails and at least one major inner rail between the two major outer rails, the minor rails being mutually parallel and including a plurality of minor inner rails disposed between two minor outer rails;
 wherein the major rails and minor rails are perpendicular to one another;
 wherein the minor inner rails are spaced generally vertically from one another and each minor inner rail extends between a first major outer rail from the major outer rails and the at least one major inner rail; and
 wherein one of the major outer rails has a substantially planar outer surface and a plurality of through holes, wherein a second major outer rail from the major outer rails and the at least one major inner rail is free from any minor inner rails extending therebetween to define a void that is configured to receive a panel.

2. The storage system of claim 1, wherein a center-to-center spacing of a first major outer rail and an adjacent major inner rail is different than a center-to-center spacing of a second major outer rail and an adjacent major inner rail.

3. The storage system of claim 1, wherein the minor inner rails are evenly vertically spaced between the major outer rails.

4. The storage system of claim 1, wherein the minor inner rails are adjustably spaced between the major outer rails.

5. The storage system of claim 1, wherein the at least two hanger brackets define parallel planes.

6. The storage system of claim 1, wherein, when the at least two hanger brackets are secured in position, the minor inner rails of a first of the at least two hanger brackets are each parallel and coplanar with a corresponding one of the minor inner rails of a second of the at least two hanger brackets.

7. The storage system of claim 1, further comprising at least one shelf extending from a minor inner rail of a first of the at least two hanger brackets and a corresponding minor inner rail of a second of the at least two hanger brackets.

8. The storage system of claim 1, wherein an outer surface of the second major outer rail of the major outer rails and one of the minor outer rails has a plurality of through holes.

9. The storage system of claim 8, wherein at least one item is secured to one or more of the plurality of through holes of the second major outer rail or the one of the minor outer rails, wherein the at least one item is selected from the group consisting of a hook, a bracket, a brace, a clasp, and a clip.

10. A storage system for mounting on a structure, the storage system comprising: at least two hanger brackets, each hanger bracket being generally rectangular in shape and comprising major rails and minor rails, the major rails being mutually parallel and including at least one major inner rail disposed between two major outer rails, the minor rails being mutually parallel and including a plurality of minor inner rails disposed between two minor outer rails; wherein the major rails and minor rails are perpendicular to one another; wherein each of the minor inner rails extend between a first major outer rail from the major outer rails and the at least one major inner rail; wherein one of the major outer rails has a substantially planar outer surface and a plurality of through holes; and wherein the minor inner rails are evenly spaced between; wherein a second major outer rail from the major outer rails and the at least one major inner rail is free from any minor inner rails extending therebetween to define a void that is configured to receive a panel.

11. The storage system of claim 10, wherein a center-to-center spacing of a first major outer rail and an adjacent major inner rail is different than a center-to-center spacing of a second major outer rail and an adjacent major inner rail.

12. The storage system of claim 10, wherein, when the at least two hanger brackets are secured in position, the minor inner rails of a first of the at least two hanger brackets are each parallel and coplanar with a corresponding one of the minor inner rails of a second of the at least two hanger brackets.

13. The storage system of claim 10, further comprising at least one shelf extending from a minor inner rail of a first of the at least two hanger brackets and a corresponding minor inner rail of a second of the at least two hanger brackets.

14. The storage system of claim 10, wherein an outer surface of the second major outer rail of the major outer rails and one of the minor outer rails has a plurality of through holes.

15. The storage system of claim 10, wherein the structure is a generally vertical surface.

16. The storage system of claim 15, wherein the generally vertical surface is selected from the group consisting of a structure wall and a vehicle wall.

* * * * *